United States Patent
Sink et al.

(10) Patent No.: US 10,690,900 B2
(45) Date of Patent: Jun. 23, 2020

(54) DIAGNOSTIC APPARATUS INCLUDING PASSIVE AUTOLOADER

(71) Applicant: Advanced Animal Diagnostics, Inc., Morrisville, NC (US)

(72) Inventors: Rick Sink, Raleigh, NC (US); Jasper N. Pollard, Durham, NC (US); Demetris Young, Durham, NC (US); Jorge Carlos Correa, Raleigh, NC (US); David Newcomb, Morrisville, NC (US); Stefano Bresolin, Garner, NC (US); Tobias M. Heineck, Durham, NC (US); David A. Calderwood, Chapel Hill, NC (US)

(73) Assignee: ADVANCED ANIMAL DIAGNOSTICS, INC., Morrisville, NC (US)

( * ) Notice: Subject to any disclaimer, the term of this patent is extended or adjusted under 35 U.S.C. 154(b) by 393 days.

(21) Appl. No.: 15/023,604

(22) PCT Filed: Sep. 23, 2014

(86) PCT No.: PCT/US2014/056944
§ 371 (c)(1),
(2) Date: Mar. 21, 2016

(87) PCT Pub. No.: WO2015/042571
PCT Pub. Date: Mar. 26, 2015

(65) Prior Publication Data
US 2016/0291308 A1    Oct. 6, 2016

Related U.S. Application Data

(60) Provisional application No. 61/881,222, filed on Sep. 23, 2013.

(51) Int. Cl.
*G02B 21/34* (2006.01)
*G02B 21/26* (2006.01)
(Continued)

(52) U.S. Cl.
CPC .......... *G02B 21/26* (2013.01); *B65G 47/905* (2013.01); *G02B 21/02* (2013.01); *G02B 21/241* (2013.01);
(Continued)

(58) Field of Classification Search
None
See application file for complete search history.

(56) References Cited

U.S. PATENT DOCUMENTS

| 4,248,498 A | 2/1981 | Georges |
| 4,818,169 A | 4/1989 | Schram et al. |

(Continued)

FOREIGN PATENT DOCUMENTS

| DE | 102012007133 A1 | 10/2012 |
| WO | WO 2009/127394 A2 | 10/2009 |
| WO | 2013/034431 | 3/2013 |

OTHER PUBLICATIONS

International Search Report and Written Opinion, PCT/US2014/056944, dated Feb. 26, 2015.
(Continued)

*Primary Examiner* — Kathryn Wright
(74) *Attorney, Agent, or Firm* — Myers Bigel, P.A.

(57) ABSTRACT

A microscope assembly for use in an automated microscope apparatus has a support frame; a cartridge magazine actuator assembly connected to the support frame; a subframe; a plurality of vibration isolators connecting the support frame to the subframe; an XYZ drive connected to the subframe; and an optical stage connected to the subframe. In some embodiments the assembly further includes a cartridge grip-
(Continued)

per connected to said XYZ drive. In some embodiments, the cartridge magazine actuator assembly includes an input element, an output element, and a transfer assembly interconnecting the input element and the output element, with the transfer assembly configured to linearly advance the output element upon linear depression of the input element.

27 Claims, 34 Drawing Sheets

(51) Int. Cl.
      *G02B 21/02*       (2006.01)
      *B65G 47/90*       (2006.01)
      *G02B 21/24*       (2006.01)
      *G01N 35/00*       (2006.01)

(52) U.S. Cl.
    CPC ... *G02B 21/34* (2013.01); *G01N 2035/00039* (2013.01); *G01N 2035/00089* (2013.01)

(56) References Cited

U.S. PATENT DOCUMENTS

| | | | |
|---|---|---|---|
| 6,847,481 B1 * | 1/2005 | Ludl | G01N 35/04 359/368 |
| 2009/0116101 A1 * | 5/2009 | Tafas | G02B 21/24 359/369 |
| 2012/0002277 A1 | 1/2012 | Machida et al. | |
| 2013/0222895 A1 | 8/2013 | Gelbart | |

OTHER PUBLICATIONS

Communication pursuant to Article 94(3) EPC for corresponding EP application No. 14781785.2 dated Apr. 21, 2020, 5 pages.

* cited by examiner

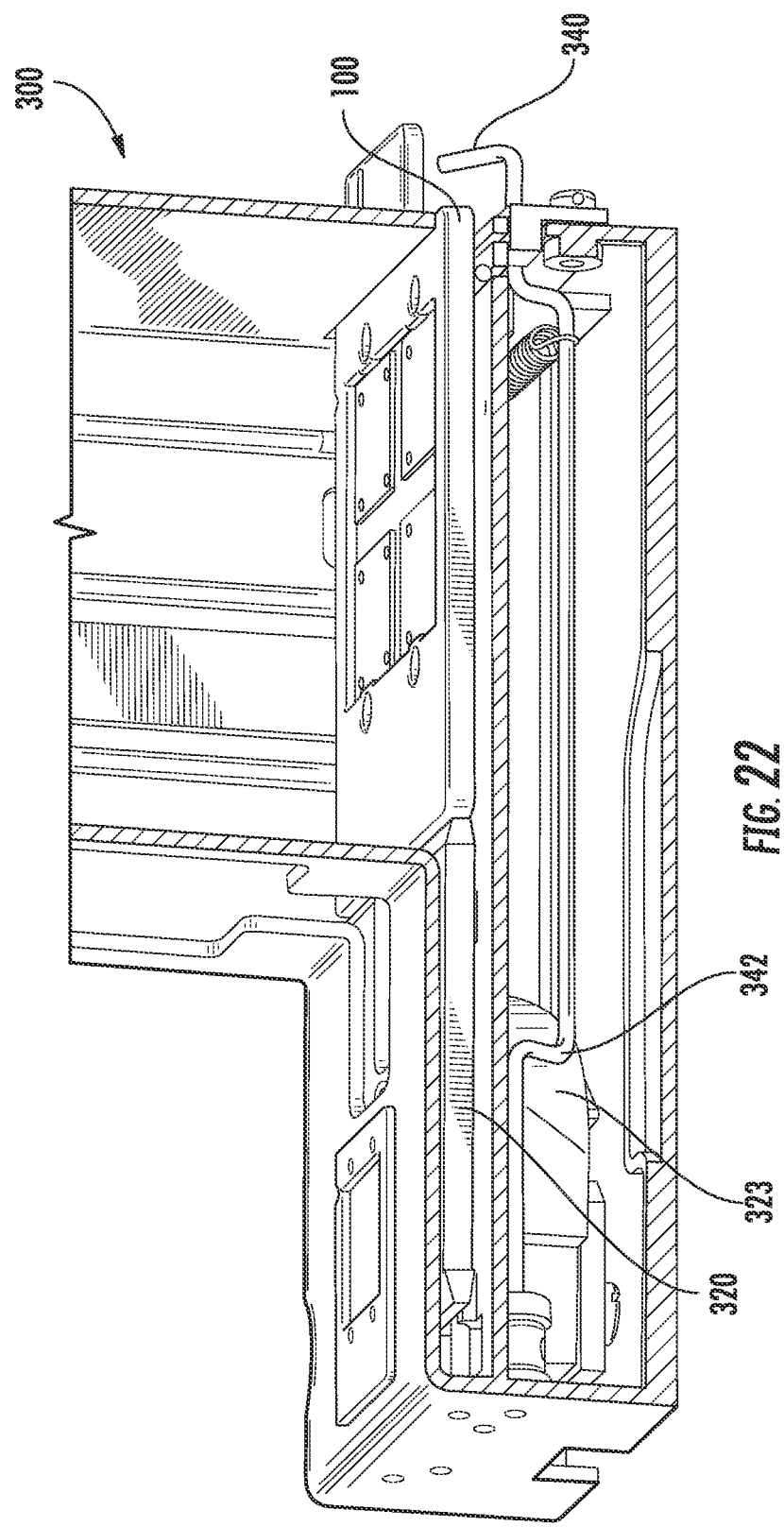

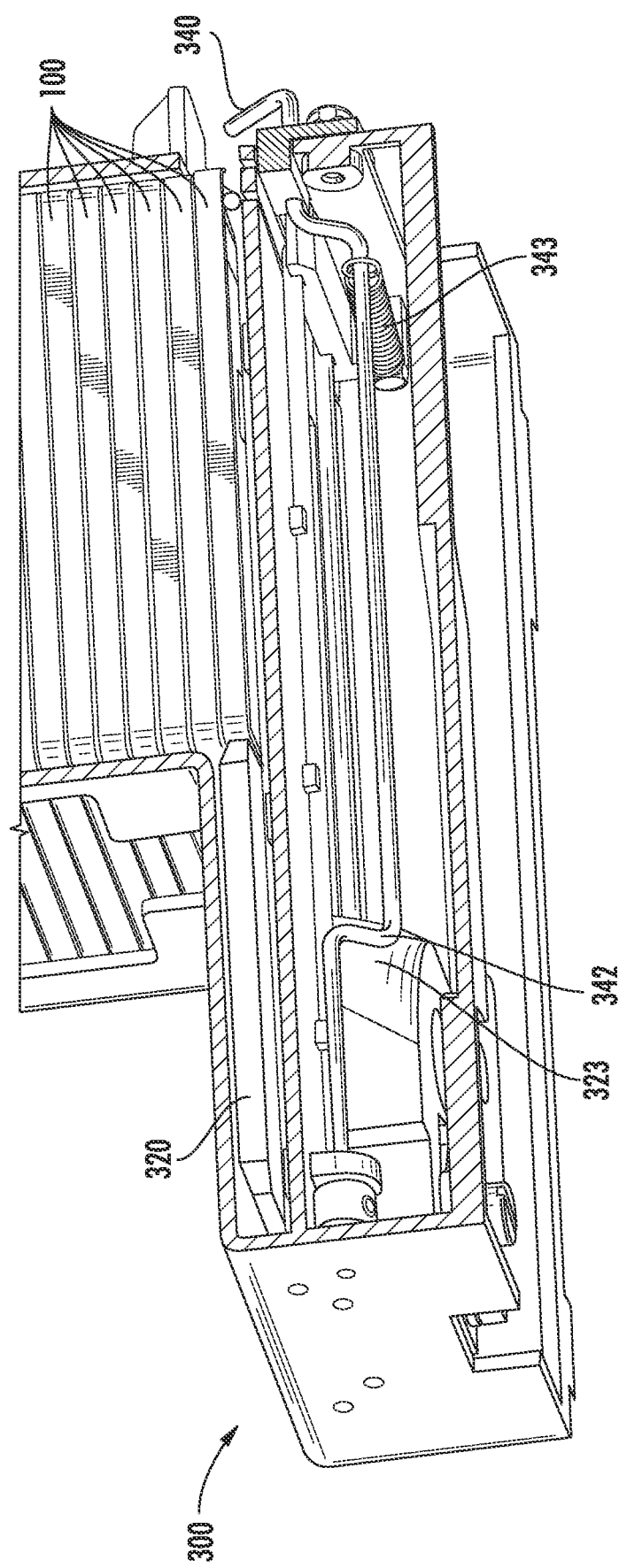

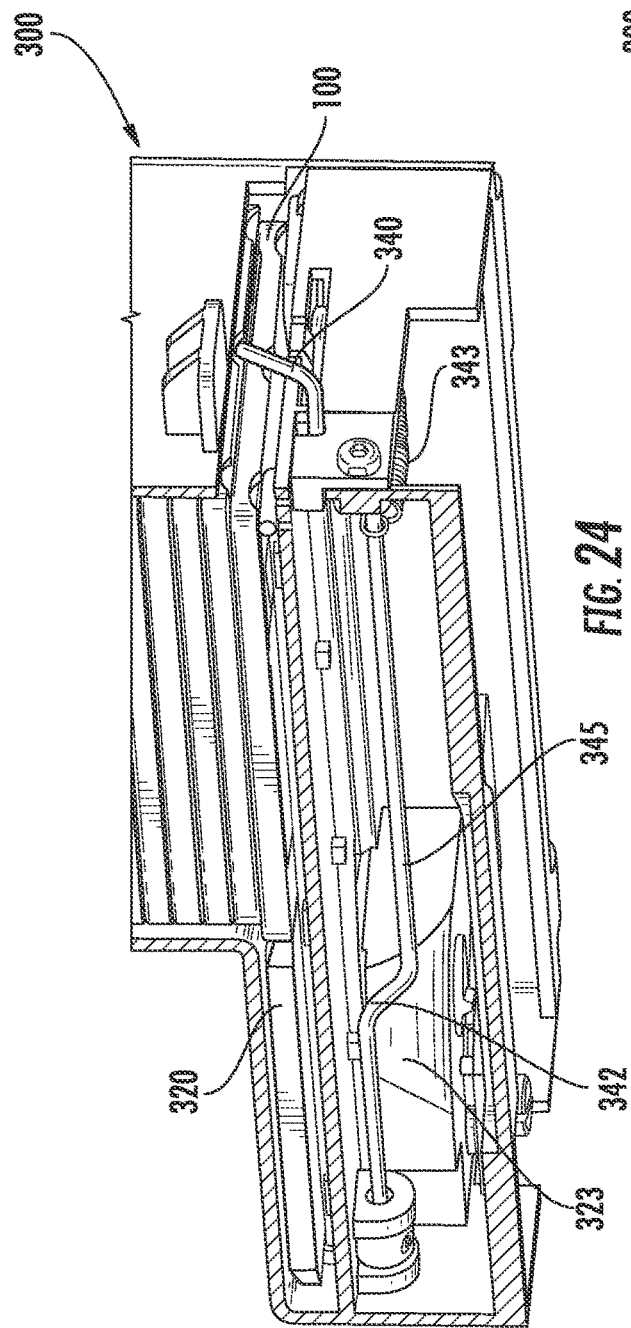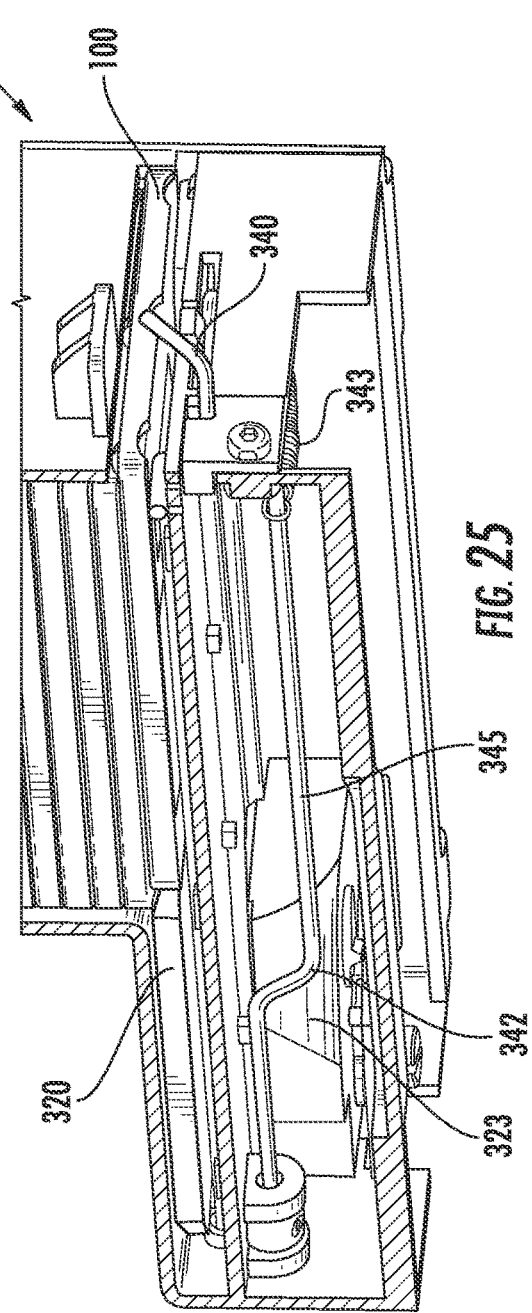

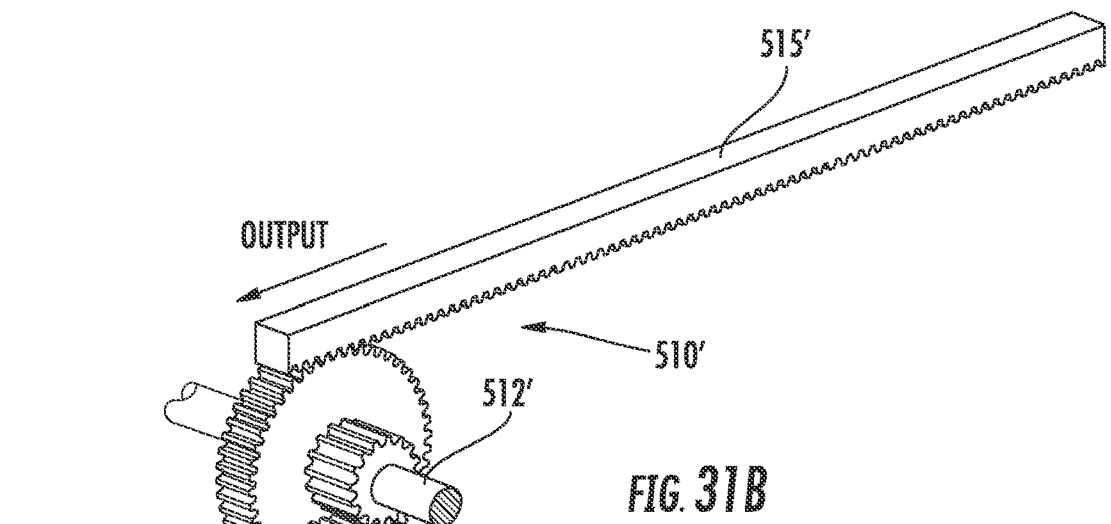
FIG. 31B
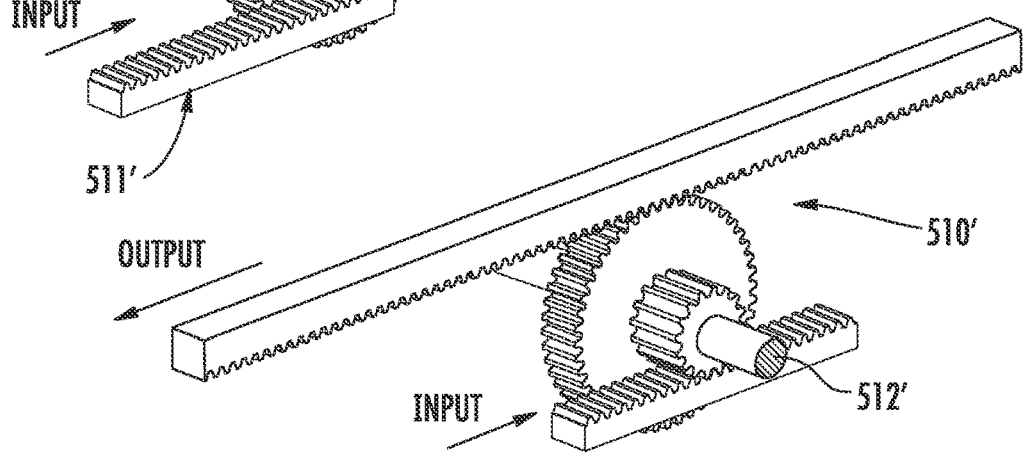
FIG. 32B
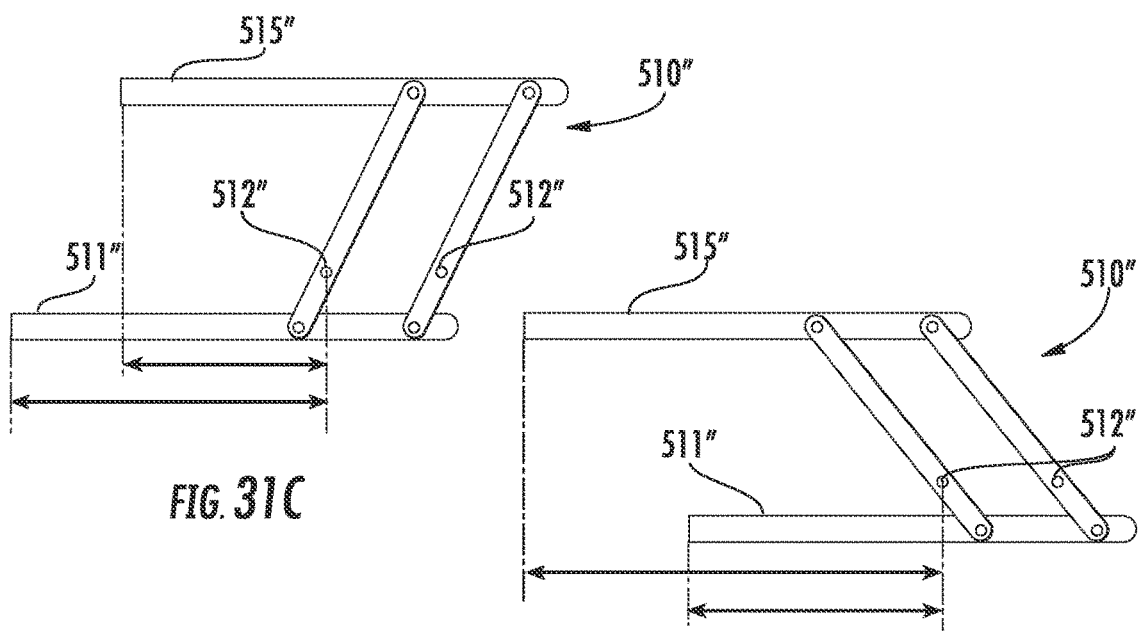
FIG. 31C
FIG. 32C

DIAGNOSTIC APPARATUS INCLUDING PASSIVE AUTOLOADER

RELATED APPLICATIONS

This application is a 35 U.S.C. § 371 national phase entry of PCT Application PCT/US2014/056944, filed Sep. 23, 2014, and published in English on Mar. 26, 2015, as International Publication No. WO 2015/042571, and which claims the benefit of U.S. Provisional Patent Application Ser. No. 61/881,222, filed Sep. 23, 2013, the disclosure of each of which is incorporated by reference herein in its entirety.

FIELD OF THE INVENTION

The present invention concerns diagnostic methods and apparatus, particularly methods and apparatus useful for detecting white bloods cells or analytes in bodily fluids of production animals (for example, bovine mastitis in cattle for milk).

BACKGROUND OF THE INVENTION

Mastitis is the inflammation of the mammary gland caused by microorganisms that invade one or more quadrants of the bovine udder, multiply, and produce toxins that are harmful to the mammary gland. Economic loss to mastitis in the United States is estimated to be over 2 billion dollars. This is approximately 10% of the total value of farm milk sales, and about two-thirds of this loss is due to reduced milk production in subclinically infected cows.

In subclinical mastitis, there may be no visible signs of the disease, and diagnosis of subclinical mastitis may be performed by a somatic cell count (SCC) of the milk. The SCC is the number of leukocytes or white blood cells per volume of milk and is also used as an index of milk quality. It has also been recognized that there are multiple types of leukocytes, each with its own significance. In milk from a healthy animal, the predominant cell types are lymphocytes, followed by much lesser numbers of neutrophils and macrophages. The percentages of each kind of cell rise and fall as part of the immune response to infection. Those percentages, "the differential milk leukocyte count", represent the unique immune status of an individual quarter udder, at a specific point in time for better diagnosis of subclinical mastitis.

One method for detecting the differential milk leukocyte count is using flow-cytometry, which is an expensive, sophisticated tool typically only found in top research laboratories and generally not practical for the farmer. Another method for detecting the differential milk leukocyte count is the "manual milk differential smear" (MMDS), which is a difficult and time consuming procedure, and is subject to great variability, even when performed by highly trained laboratory technologists. Both flow cytometry and MMDS present practical difficulties for field research or a barn environment.

U.S. Patent Application Publication No. 2009/0233329 to Rodriguez discloses a wedge microfluidic cartridge chamber for detecting mastitis or other diseases from a body fluid of a mammal, such as from cow's milk. While manual and automated procedures for carrying out disease detection with the aid of such a sample cartridge are described, again there is not described a system and apparatus useful for implementing such procedures in a field or barn environment.

SUMMARY OF THE INVENTION

A first aspect of the present invention is a microscope assembly for use in an automated microscope apparatus, comprising: a support frame; a cartridge magazine actuator assembly connected to the support frame; a subframe; a plurality of vibration isolators connecting the support frame to the subframe; an XYZ drive (or robot) connected to the subframe; and an optical stage (or imaging system) connected to the subframe. Some embodiments further comprise a cartridge gripper connected to the XYZ drive.

Another aspect of the invention is an automated microscope system, comprising: an XYZ drive; a cartridge gripper connected to the XYZ drive; the gripper configured to secure a sample cartridge; the sample cartridge comprising at least one chamber, an imaging system operatively associated with the cartridge gripper and configured to image a sample in at least one chamber; optionally but in some embodiments preferably an autofocusing system operatively associated with the imaging system and the XYZ drive and configured to focus the imaging system on at least one chamber; a cartridge magazine configured to contain a plurality of the cartridges; a magazine actuator assembly operatively associated with the cartridge magazine, the actuator assembly configured with the magazine to load a cartridge from the magazine to the cartridge gripper; and a controller operatively associated with the XYZ drive and configured to activate the cartridge magazine actuator assembly by motion of the XYZ drive.

Also described herein is a cartridge magazine comprising: an upper magazine body portion having a cartridge insertion opening and a cartridge ejection opening formed therein, the upper magazine body configured to receive a plurality of cartridges therein; optionally but preferably a raised polarizing rib in the upper magazine body portion; the polarizing rib configured to engage a cartridge notch formed in a cartridge inserted through the insertion opening and into the upper magazine body portion; with the polarizing rib having an escape notch formed therein, and with the escape notch aligned with the cartridge ejection opening; a lower magazine body portion; and a cartridge stripper slidably received in the lower magazine body portion and configured to engage the magazine actuator and eject a cartridge through the ejection opening and into the cartridge gripper when activated by the magazine actuator.

Also described herein is a cartridge magazine actuator assembly, comprising: an input element, an output element, and a transfer assembly (such as a scissor assembly) interconnecting the input element and the output element, the transfer assembly configured to linearly advance the output element upon linear depression of the input element. A cartridge magazine may be operatively associated with the actuator assembly.

In some embodiments, the cartridge magazine is removably engaged to the cartridge magazine actuator; and the cartridge magazine further comprises a latch element operatively associated with the cartridge stripper, the latch element configured to releasably engage the magazine actuator (e.g., releasably engage the actuator assembly output element).

Some embodiments of the foregoing may further comprise a magnetic catch operatively associating the actuator assembly input element and the cartridge gripper and configured to impart at least a partial pulling force from the gripper to the input element to aid in resetting the actuator and magazine to a home position.

Some embodiments of the foregoing may further comprise a gripper support (e.g., a roller) connected to the actuator assembly and configured to reduce deflection of the gripper upon the gripper contacting the input element.

Some embodiments of the foregoing may further comprise a cartridge kicker rigidly connected to either the support frame or the subframe, and optionally a chute operatively associated with the cartridge kicker for receiving a cartridge ejected by the kicker from the gripper.

Some embodiments of the foregoing may further comprise a humidification element in the upper magazine body portion.

In some embodiments of the foregoing, the cartridge stripper is slidably translatable between a retracted position and a forward position, the cartridge magazine further comprising a gate element operably associated with the cartridge stripper (e.g., a cam surface thereon), the gate element configured to block ejection of a cartridge from the ejection opening when the cartridge stripper is in the retracted position and permit ejection of a cartridge from the ejection opening when the cartridge stripper is in the forward position.

The apparatus may be used in a method useful for sequentially loading a plurality of sample cartridges on an automated microscope, each of the sample cartridges comprising at least one chamber, each of the at least one chambers containing a biological sample; the method comprising the steps of: (a) providing an automated microscope comprising (i) an XYZ drive; (ii) a cartridge gripper connected to the XYZ drive and configured to secure a sample cartridge; and (iii) an imaging system operatively associated with the cartridge gripper and configured to image the sample; (b) providing (i) a cartridge magazine containing a plurality of the cartridges and (ii) a cartridge magazine actuator assembly operatively associated with the cartridge magazine and the cartridge gripper; the cartridge magazine actuator assembly comprising an input element, a output element, and a transfer assembly interconnecting the input element and the output element, the transfer assembly configured to linearly advance the output element upon linear depression of the input element; (c) advancing the cartridge gripper into the input element so that force therefrom is transferred from the input element through the transfer assembly to the output element and a cartridge is ejected from the magazine into the gripper; and (d) imaging a sample in at least one chamber of the cartridge with the imaging system; and (e) optionally repeating the imaging step for at least one additional chamber in the cartridge (e.g., all four chambers of a four-chamber cartridge). The method may further comprise the steps of: (f) retracting the cartridge gripper against a kicker element so that the cartridge is ejected therefrom; and (g) sequentially repeating steps (e) through (f) for a plurality of cartridges in the magazine.

In some embodiments of the foregoing, the cartridge gripper is configured to receive a sample cartridge having a leading end portion and a pair of generally parallel opposing side edge portions; the cartridge gripper comprising: a base member having a planar stage surface portion, the surface portion including a forward surface portion and a rear surface portion; and optionally but preferably an optical alignment detection element on the stage rear portion, the detection element configured to at least partially underly the leading end portion of a cartridge inserted therein. Such a gripper may be used in a method useful for positioning a sample cartridge on an automated microscope, comprising: securing a sample cartridge to a stage of an automated microscope at one of a plurality of available secure positions; the sample cartridge comprising at least one chamber and a leading edge, the leading edge optically distinguishable from the stage, with each of the at least one chamber containing a sample to be imaged (e.g. a biological sample collected from a subject, and optionally exogeneous targets); then determining the position of the sample cartridge on the stage by optically detecting the position of the leading edge with the microscope; then optionally but preferably autofocusing the microscope on the at least one chamber; then detecting or imaging the sample in the chamber (e.g., imaging selected cells in the sample, the selected cells including at least neutrophils; and generating a count of at least neutrophils in the sample as an aid to detecting a disorder in the subject); and then optionally but preferably repeating at least the detecting or imaging step for at least one additional chamber on the cartridge.

The foregoing and other objects and aspects of the present invention are described in greater detail below. The disclosures of all US Patent references cited herein are to be incorporated herein by reference.

BRIEF DESCRIPTION OF THE DRAWINGS

FIG. 22 is a partial perspective cutaway view of a cartridge magazine like that of FIG. 19, and showing the magazine ejector and actuator latch assembly in greater enlargement, and in fully retracted position.

FIG. 23, is a partial, lower, perspective cutaway view of a cartridge magazine like that of FIG. 22, again showing the ejector and latch assembly in fully retracted position.

FIG. 24, is a partial, lower, perspective cutaway view of a cartridge magazine like that of FIG. 22, showing the ejector and latch assembly as they begin advancing.

FIG. 25, is a partial, lower, perspective cutaway view of a cartridge magazine like that of FIG. 22, showing the ejector and latch assembly further advanced.

FIG. 31B is a perspective view of an actuator assembly rack-and-pinion element extended.

FIG. 32B is a perspective view of an actuator assembly rack-and-pinion element retracted.

FIG. 31C is a side view of an actuator assembly lever element extended.

FIG. 32C is a side view of an actuator assembly lever element retracted.

DETAILED DESCRIPTION OF ILLUSTRATIVE EMBODIMENTS

Figure 1:
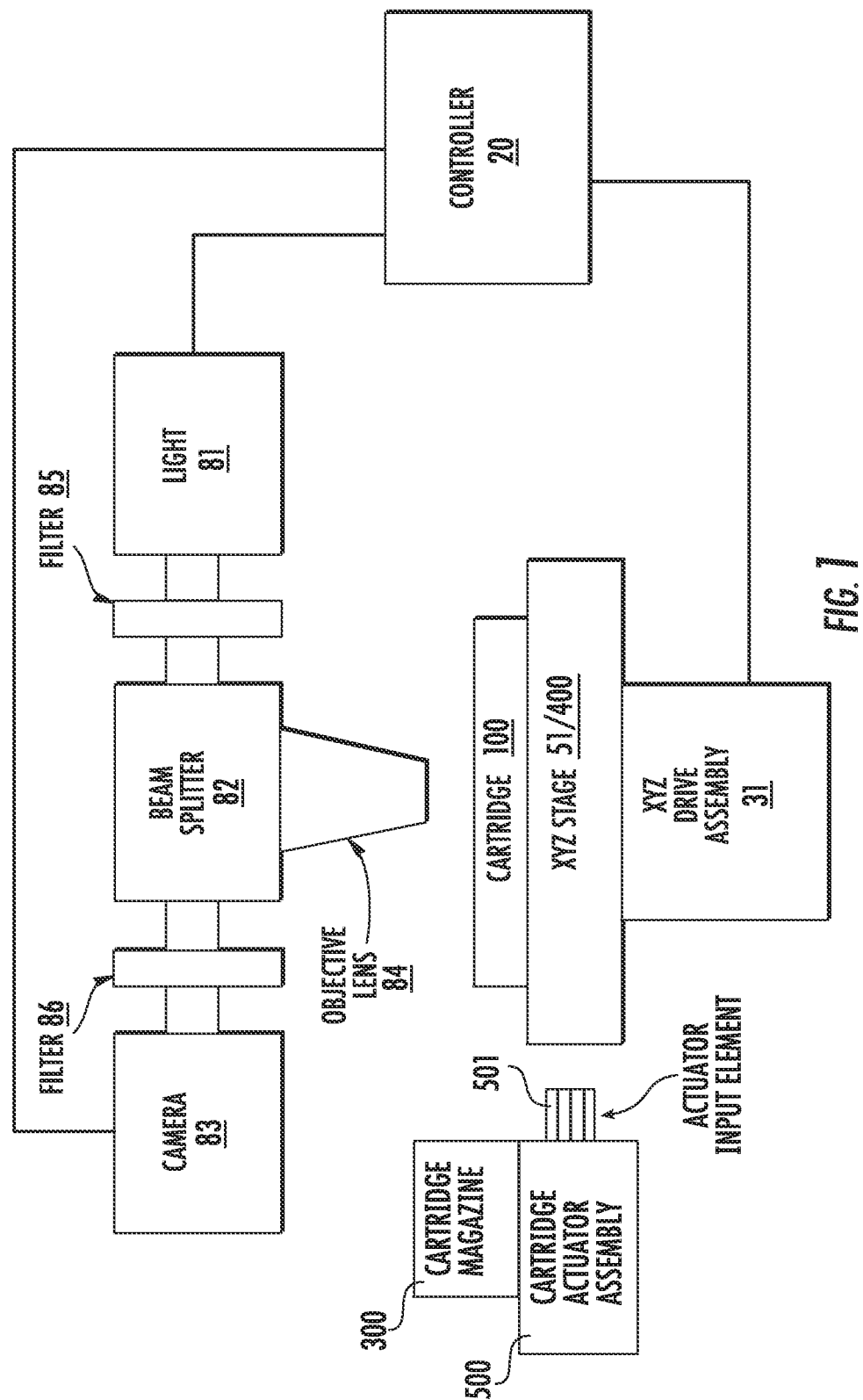
FIG. 1 is a partial schematic diagram of an apparatus of the present invention, including a passive autoloader.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" "horizontal", "vertical", "left", "right", and the like, may be used herein for ease of description to describe one element or feature's relationship to another elements) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Likewise, a change in perspective of an observer of a specific device (in contrast to a device fixed and displayed in the Figures) may reverse the meaning of terms "left" and "right," Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

"Subject" as used herein includes both human and animal subjects for veterinary purposes, as well as plants for agricultural purposes. Examples of animal subjects include, but are not limited to, mammalian subjects such as dog, cat, cow, sheep, goat, horse, and pig subjects, fish such as salmon, trout, and tilapia, and avian subjects such as chicken, turkey, duck, geese, quail, and pheasant.

"Liquid sample" as used herein may be any liquid suspected of containing one or more analytes. The liquid sample is typically an aqueous sample, and may be provided as a single phase or multi-phase sample (e.g., an emulsion, dispersion, or suspension of solid or liquid particles in a (typically aqueous) continuous phase). For example: plant or animal tissue, or a solid food sample, may be homogenized in an aqueous solution to provide a liquid sample; a solid sample such as a soil sample may be rinsed in an aqueous rinse or wash solution such as water or buffer solution, and the rinse or wash solution used as the aqueous sample. A water sample may be taken from a pond, ocean, stream, river or the like, optionally diluted, and used as the liquid sample. In some embodiments, the liquid sample is a biological fluid. In some embodiments the liquid sample is a growth media such as cell or tissue culture media.

"Biological fluid" as used herein refers to a liquid solution or suspension comprising material collected from or excreted by a subject. Examples include, but are not limited to, milk, colostrum, secretions, whole blood, blood plasma, urine, mucus, lymph, throat and nasal swabs, sputum, bronchial lavage fluid, etc., from human and animal subjects; sap, nectar or juice from plants, tissue homogenates of any thereof, and fractions of any thereof such as blood plasma. The fluid may be taken from a vector such as an insect that carries the pathogen, or may comprise a tissue homogenate of such vector. The biological fluid may further comprise or contain one or more additives such as washes, rinses, and/or other diluents (e.g., aqueous diluents such as saline solutions) in any suitable volume ratio of diluents to biological fluid (e.g., from 4:1, 3:1, 2:1, or 1:1 to 1:2, 1:2, 1:3, 1:4, etc.), along with other additives such as anticoagulants, preservative, salts, buffers, etc. The biological fluid is in some embodiments complete or whole (e.g., whole milk or whole colostrum), which has not been subjected to separation steps such as filtering, fractioning, centrifuging, chromatography, etc.

"Milk" as used herein generally refers to mammalian milk of any species (e.g., cow, goat, human, etc.). The milk may be raw or pasteurized, depending upon the particular purpose of the test. Milk may be whole milk, low-fat or reduced fat milk, or skim milk. Milk may optionally be diluted (typically with an aqueous diluent such as distilled water, saline solution, or buffer solution), as discussed above.

"Colostrum" as used herein is a form of milk produced by mammals in the first few days after birth that may be higher in antibodies (for imparting passive immunity to offspring). The term "colostrum" as used herein includes "secretions" as described below.

"Secretions" (or "mammary gland secretions") as used herein is a form of milk produced by mammals just prior to giving birth. Such secretions are sometimes also referred to as "colostrum" but in the present application "secretions" refers to the type of milk produced prior to the subject giving birth, while colostrum refers to the type of milk produced just after the subject giving birth.

"Analyte" (also referred to as "measurands") as used herein includes any suitable target of analysis or target of measurement. Such analytes, measurands, or targets as used herein may be any suitable compound or cell to which an antibody will bind, including but not limited to proteins, peptides, nucleic acids, toxins, and pathogens. "Toxin" as used herein includes, but is not limited to, mycotoxins and bacterial toxins (e.g., exotoxins, enterotoxins, and/or endotoxins).

"Mycotoxin" as used herein includes, but is not limited to, aflatoxins (e.g., aflatoxin B1, B2, G1, and G2), vomitoxin, ochratoxins (e.g., ochratoxin A, B, and C), citrinin, ergot alkaloids, and fusarium toxins (e.g., famonisins, and trichothecenes).

"Enterotoxin" as used herein includes, but is not limited to, *Staphylococcus aureus* enterotoxin and *Escherichia coli* enterotoxin.

"Pathogen" as used herein may be any pathogen, including viral, fungal (including yeast), bacterial (including Gram negative and Gram positive bacteria), and protozoan pathogens. In some embodiments, the pathogen is a mollicute such as a *Mycoplasma*.

"Mollicute" as used herein refers to a class of bacteria characterized by the absence of a cell wall. Orders within the class Molicutes include Acholeplasmatales, Anaeroplasmatales, Entomoplasmatales, Haloplasmatales, and Mycoplasmatales. Examples include, but are not limited to *Mycoplasma, Ureaplasma, Acholeplasma, Spiroplasma*, and *Phytoplasma*.

"Slow growing pathogen," as used herein, refers to microbial pathogens that require more than 10, 24 or in some embodiments 48 hours to double in population when grown in culture (as compared to, for example, bacteria such as *E. coli*, which can double in population in 2 to 3 hours). Examples of slow growing pathogens include, but are not limited to, *Borrelia, Pediococcus, Mycoplasma*, and *Mycobacteria*, See, e.g., PCT Application No. WO2002074991.

"*Mycoplasma*" as used herein refers to a genera of bacteria within the order Mycoplasmatales that lack a cell wall. Examples include, but are not limited to, *Mycoplasma bovis, Mycoplasma genitalium, Mycoplasma hominis, Mycoplasma hyopneumoniae, Mycoplasma laboratorium, Mycoplasma ovipneumoniae, Mycoplasma pneumonia, Mycoplasma haemofelis, Mycoplasma californicum*, etc.

"*Mycobacteria*" as used herein includes, but is not limited to, *Mycobacterium simiae, Mycobacterium bovis, Mycobacterium szulgai, Mycobacterium malmoense, Mycobacterium intracellulare, Mycobacterium avium, Mycobacterium gor-*

*donae, Mycobacterium africanum, Mycobacterium tuberculosis, Mycobacterium gastri, Mycobacterium marinum, Mycobacterium microti, Mycobacterium asiaticum, Mycobacterium scrofulaceum, Mycobacterium branderi, Mycobacterium paratuberculosis,* and *Mycobacterium kansasii.* See, e.g., European Patent Application No. EP1098003.

"*Borrelia*" as used herein includes, but is not limited to, *B. burgdorferi, B. afzelii,* and *B. garinii* (the major species causing Lyme disease), along with other species such as *B. recurrentis, B. hermsii, B. parkeri, B. miyamotoi,* etc., which may cause borreliosis or relapsing fever borreliosis.

"Sample cartridge" or "diagnostic cartridge" as used herein may be any suitable cartridge for containing a liquid sample, biological fluid or cell sample, including but are not limited to cartridges suitable for differential leukocyte analysis as described In R. Rodriguez and C. Galanaugh, U.S. Patent Application Publication No. 2009/0233329 (published Sep. 17, 2009), the disclosure of which is incorporated herein by reference in its entirety, and optionally incorporating the modifications or features discussed further below. In general, and as illustrated further below, such as cartridge includes at least one (e.g., two, four) sample chambers (e.g., a microfluidic chamber), which chamber or chambers may contain suitable cell or leukocyte observation colorants, stains, or reagents (e.g., reagents suitable for visualizing the cells under epifluorescent microscopy). The sample chambers are preferably aligned with one another on the cartridge (that is, on substantially the same Z plane as one another on the cartridge). In a preferred embodiment, each chamber contains reagents for separately and distinctly imaging or detecting neutrophils (or "polymorphonuclear leukocytes" (PMN)), lymphocytes, and macrophages, for differential leukocyte count diagnosis of infections such as bovine mastitis, in accordance with procedures known in the art, or which will be apparent to those skilled in the art based upon the instant disclosure, as discussed further below.

Overview of illustrative embodiments. FIGS. 1-4 provide a general overview of one embodiment of an automated microscope with passive autoloader. FIGS. 5-10 provide details of an embodiment of the automated microscope portions thereof, and FIGS. 11-51 provide details of embodiments of a passive autoloader portion thereof. Finally, FIG. 52 provides details of a non-limiting manner of operation of these two components in combination with one another.

More specifically, a partial schematic diagram of on embodiment of an apparatus of the present invention is given as an overview in FIG. 1. The apparatus comprises an XYZ stage (51) (which may comprise a cartridge gripper as more fully described below) mounted on an XYZ drive assembly (31). A sample cartridge (100) is removably inserted into or engaged by the XYZ stage. The optical components for carrying out epifluorescent microscopy include a light or light source (81), a beam splitter (82), a camera (83), and an objective lens (84), all configured so that light from the source is directed onto the sample cartridge, and light emitted or fluoresced from the sample cartridge is directed to the camera. Filters (85, 86) are provided between the camera and beam splitter, and between the light source and beam splitter, so that the appropriate wavelengths of light are directed onto the sample cartridge, and the appropriate wavelengths of light are directed onto the camera. All components including the camera, light, and XYZ drive assembly, are controlled by any suitable controller (20), which may comprise a computer or microprocessor with associated memory units, power, and additional control boards (not always shown) such as an XYZ controller board. A cartridge magazine 300 is operatively associated with a magazine actuator assembly 500, which actuator assembly is activated by motion of the XYZ stage through actuator input element 501 as discussed further below.

Other individual components of the methods and apparatus described herein may be as known in the art, or variations thereof that will be apparent to those skilled in the art based on the instant disclosure and prior automated microscopy apparatus such as described in U.S. Pat. No. 4,998,284 to Bacus; U.S. Pat. No. 5,548,661 to Price; U.S. Pat. No. 5,790,710 to Price; U.S. Pat. No. 6,381,058 to Ramm; U.S. Pat. No. 6,929,953 to Wardlaw; U.S. Pat. No. 6,927,903 to Stuckey; U.S. Pat. No. 8,000,511 to Perz; U.S. Pat. No. 8,045,165 to Wardlaw; U.S. Pat. No. 8,081,303 to Levine; or U.S. Patent Application No. 2001/0041347 to Sammak.

Figure 2:
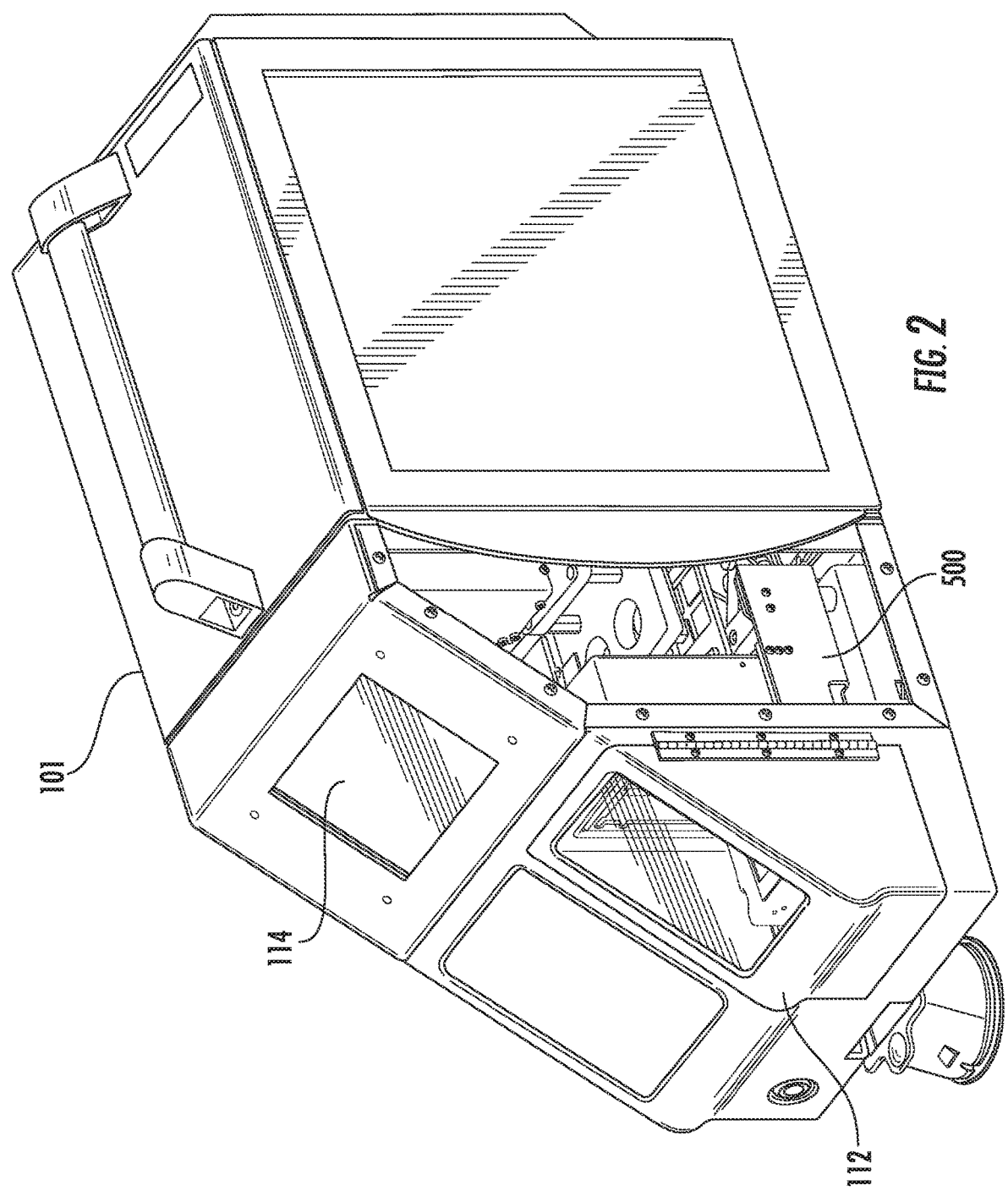
FIG. 2 is a perspective view of an apparatus of the present invention, with a port or opening for sample cartridge insertion and a touch screen user interface for input of information and display of results.

FIG. 2 is a perspective view of an apparatus (101) of the present invention, as constructed for portability and use in a dusty or otherwise harsh environment such as a barn or farm, or out-of-doors where animals to be diagnosed are found. All components of FIG. 1 above (and FIG. 3 below) are contained within the housing, except for the sample cartridges, which are removably inserted through a suitable opening (112) in the housing into the cartridge magazine (note that the cartridge magazine may be pre-loaded with cartridges and removably inserted into the housing, as well). A touch screen display (114) on the front of the device (e.g., an ESTECOM 6.5 inch intelligent panel LCD display/monitor) is provided to both display results and control the apparatus through its operational steps, as discussed further below.

Figure 3:
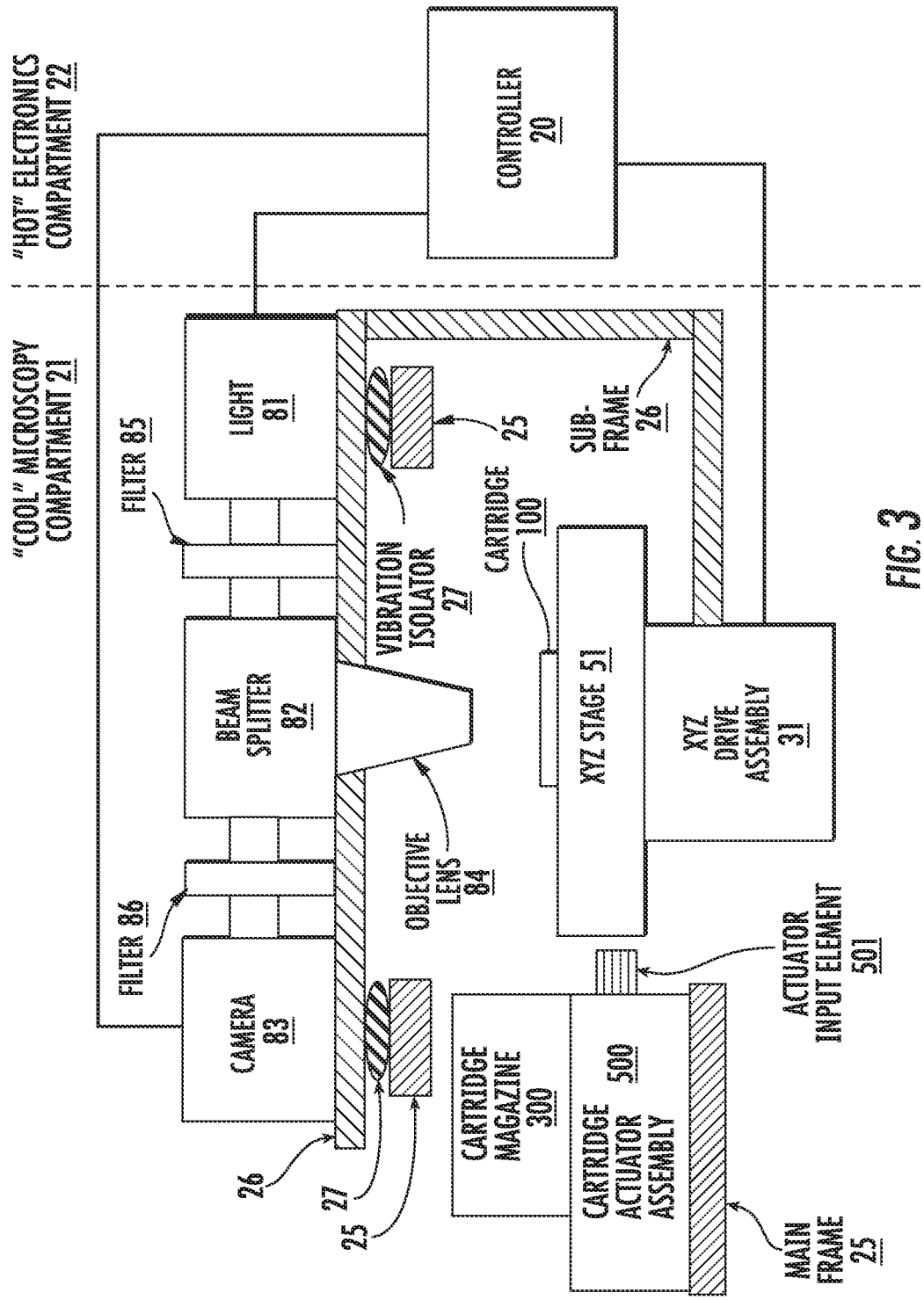
FIG. 3 is a schematic diagram of an apparatus of the present invention, showing vibration damping components, chamber separation, and a passive autoloader.

FIG. 3 is a schematic diagram of an apparatus of the present invention similar to FIG. 1 above. In addition to the components shown in FIG. 1, additional features are now shown. The optical components (50) are shown as mounted on a subframe (26), which subframe is in turn mounted on a main frame (25) through vibration isolators (27). Note that the magazine actuator assembly 500 is optionally, but in the illustrated embodiment preferably, mounted on the main frame (25) (or in other words is separated from the XYZ stage/gripper, XYZ drive assembly, and various optical components by the vibration isolators). This serves to separate the optical components from mechanical jolts, vibrations and the like should a user or operator choose to add additional cartridges to the magazine during operation, or perform other manipulations of the magazine.

In addition, the microscopy components in the non-limiting example of the automated microscope portion thereof are shown as being contained within a separate, relatively cool, compartment (21) from the controller, which is in a relatively hot or warm compartment (22) (as compared to the microscopy compartment). The apparatus of FIG. 2 above incorporates these additional features, as discussed further below.

Figure 4:
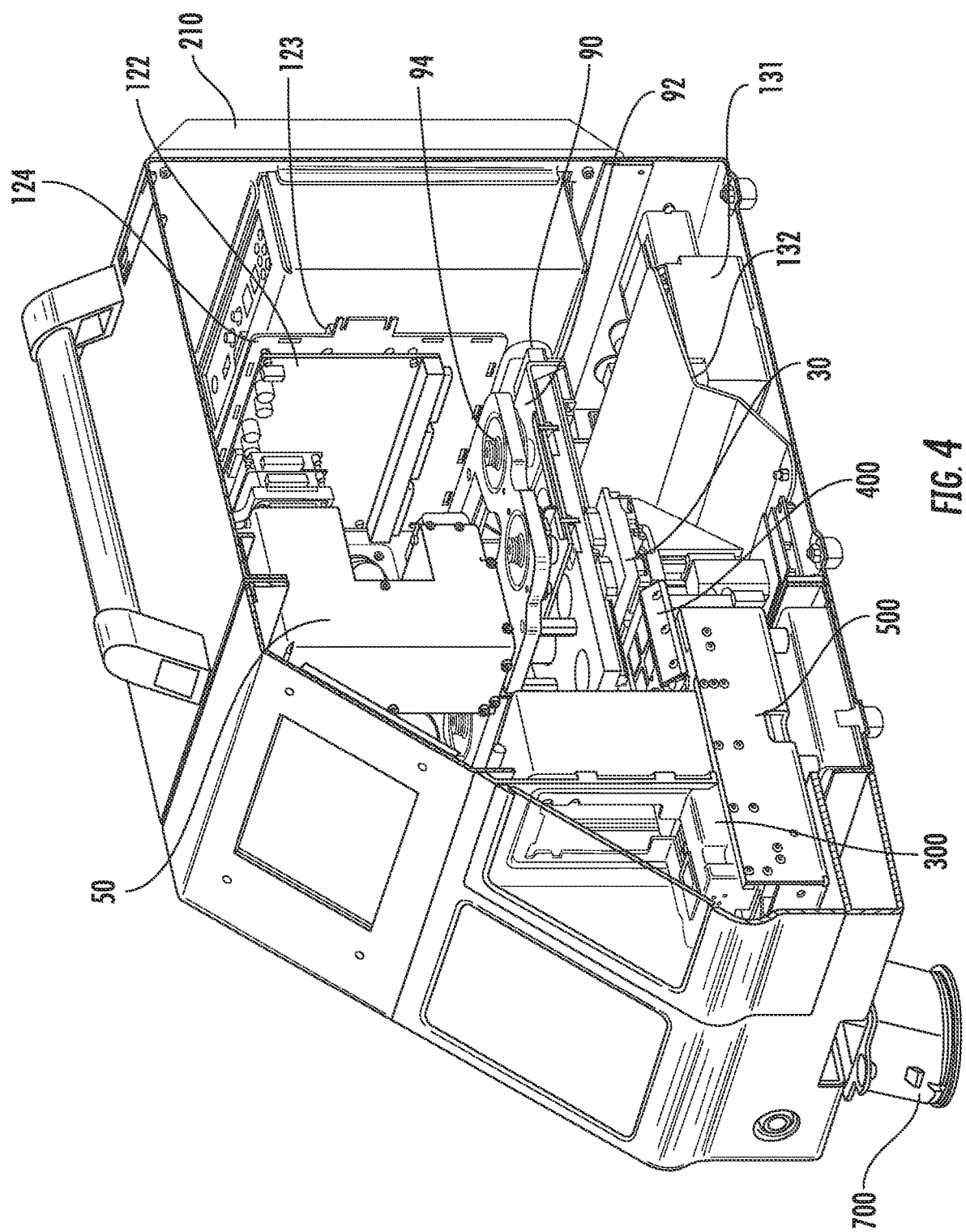
FIG. 4 is a cut-away perspective view of the apparatus of FIG. 2.

A partial cut-away perspective view of the apparatus of FIG. 2 is given in FIG. 4. A baseplate (90) serves a subframe for both the optical stage (50) and the XYZ drive assembly (30), which baseplate is in turn mounted through vibration dampening mounts (94) to the support frame (92). Any suitable active or passive vibration mount may be used, such as polymeric vibration mounts (e.g., those available from Stock Drive Products/Sterling Instruments, or any other suitable source).

An XYZ controller board (122) and a power distribution board (123) are conveniently located on a support bracket (124), which support bracket is mounted on the support frame (92), to facilitate assembly and testing of the microscopy compartment elements before they are placed into the housing, though numerous other configurations will be apparent to those skilled in the art.

A suitable power supply (131) (e.g., a fanless power supply such as MEAN WELL USP-350-12 350 W power supply) is positioned in the bottom of the unit and covered by a shield or cable tray (132) (cables not shown for clarity) to prevent tangling of cables associated with the XYZ drive assembly, image sensor, and/or light, though numerous other configurations will be apparent, including location of the power supply external to the main housing.

A heat sink (210) is mounted on the back of the apparatus to cool the electronics compartment, as discussed further below.

The cartridge magazine 300 and cartridge magazine assembly 500 are shown within the housing, with the cartridge magazine removably insertable through a door and opening, and a chute 700 is provided to direct ejected cartridges after their having been examined or imaged under the automated microscope.

Figure 5:
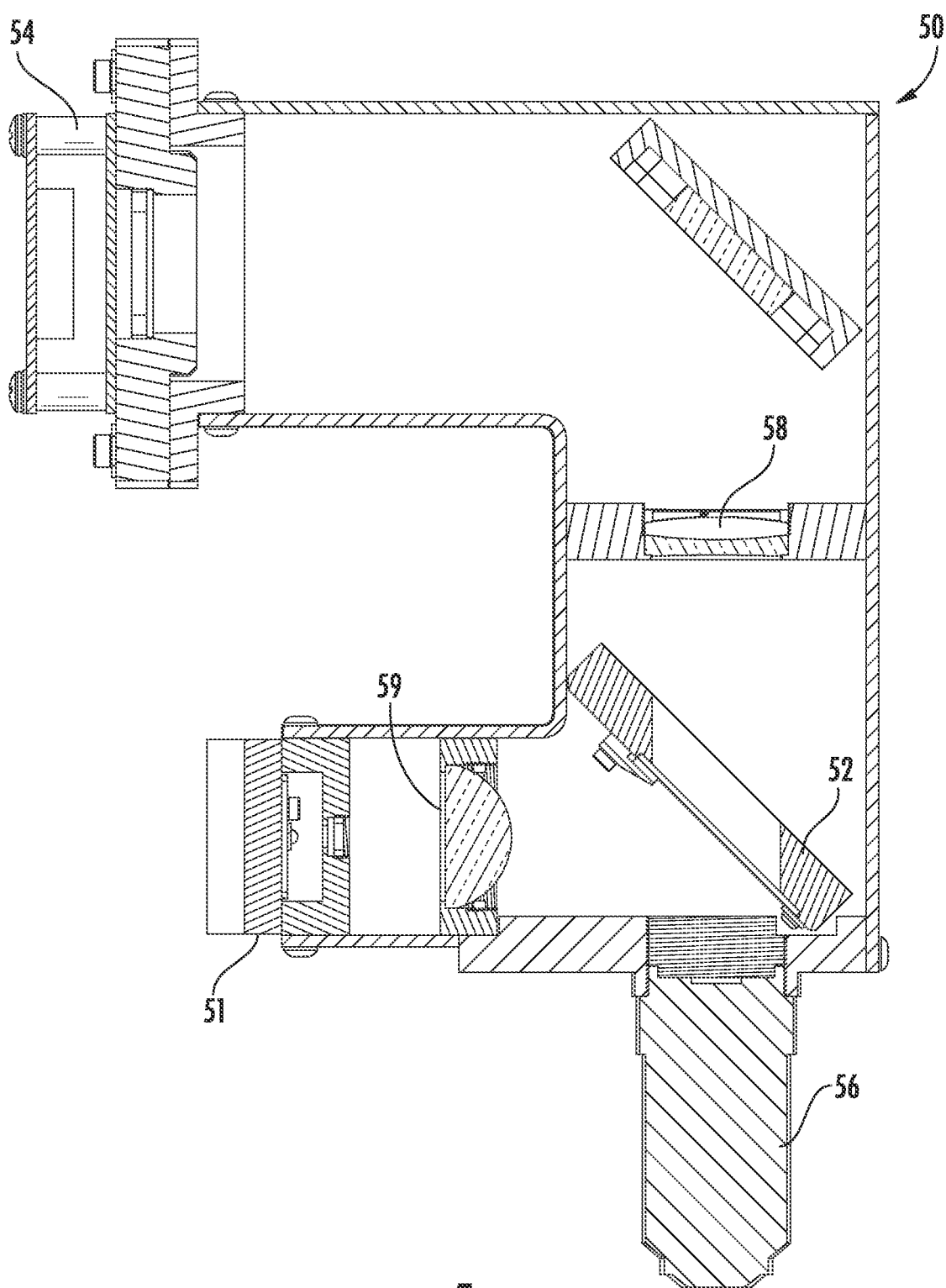
FIG. 5 is a side sectional view of an optical stage of the apparatus of FIG. 2, showing the light source, objective lens, filters, dichroic mirror and camera.

FIG. 5 is a side sectional view of an optical stage of the apparatus of FIG. 2, showing the light source, objective lens, filters including emission filters and excitation filters, dichroic mirror and image sensor (sometimes also referred to as "camera" herein), all contained within or connected to a common housing. Any suitable image sensor may be used, including CMOS image sensors, CCD image sensors, and hybrids thereof, typically 1 or 2 megapixel up to 10 or 20 megapixel, or more in resolution (e.g., a 5.0 megapixel OPTIC ANGLE image sensor). Any suitable light source may be used, including LED light (e.g. a CREE LED). Any suitable objective lens may be used, such as a 5× to 50× or 100× magnification objective lens (e.g., a NIKON MRL 00102 10× objective lens). In some embodiments, the light source is a 480 nm light source or LED; the emission filter is a dual pass filter with the center wavelength of 530 nm and 700 nm; the excitation filter has a center wave length of 470 nm, the dichroic mirror reflects 470 nm light and transmits light greater than 490 nm).

Figure 6:
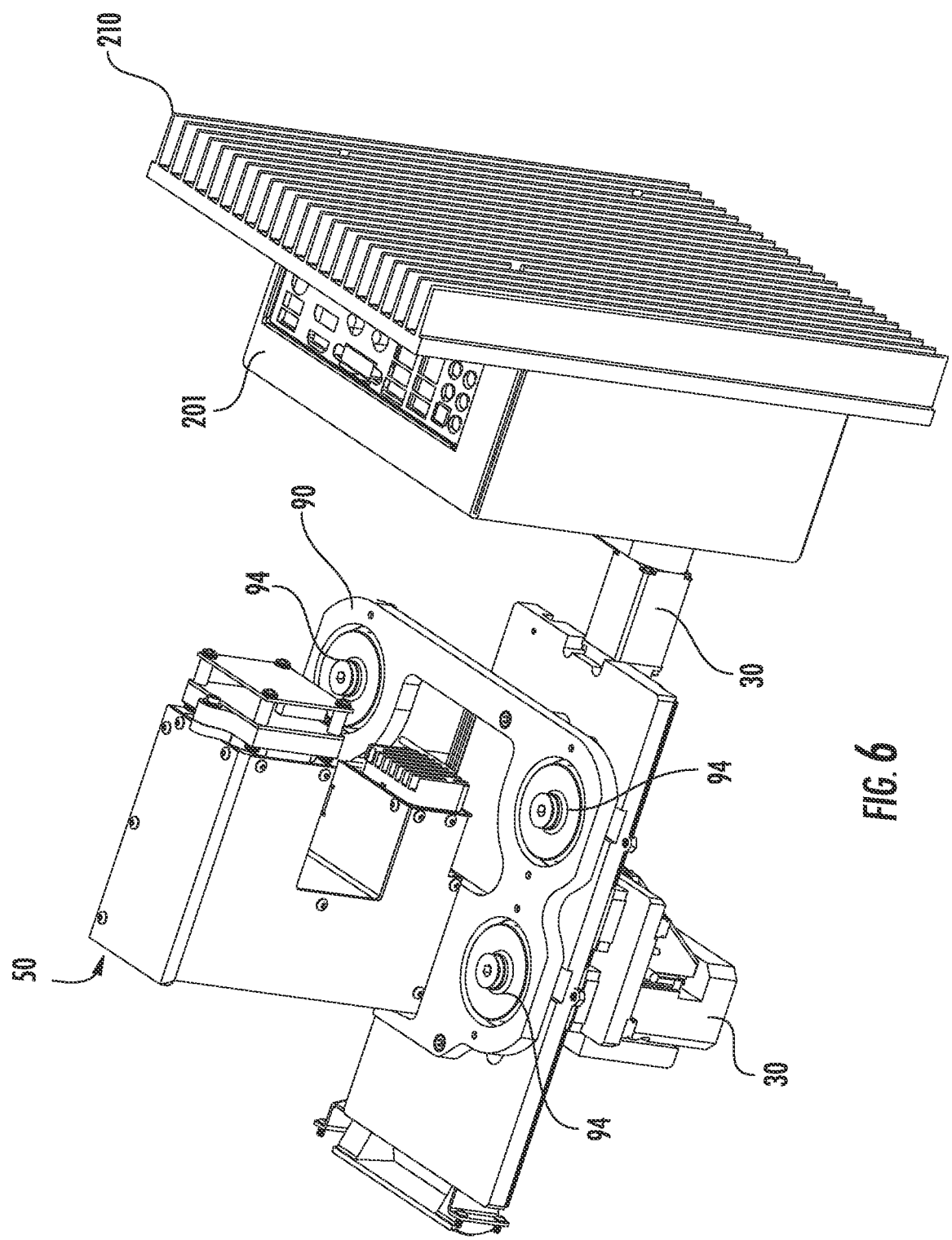
FIG. 6 is a perspective view of a microscope assembly and passively cooled microprocessor assembly of the apparatus of FIG. 2 with the cover removed and support frames removed.

The relationship of the major components of the microscopy compartment to the separate electronics compartment is shown in FIG. 6, which is a perspective view of a microscope assembly and passively cooled microprocessor assembly of the apparatus of FIG. 2 with the cover removed and support frame removed, showing the housing (201) surrounding the microprocessor board contained within the passively cooled electronics compartment. A solid state hard drive (not shown) may be conveniently mounted on the external surface of the electronics compartment housing to provide memory and storage, if desired, though again numerous other configurations will be readily apparent.

Figure 7:
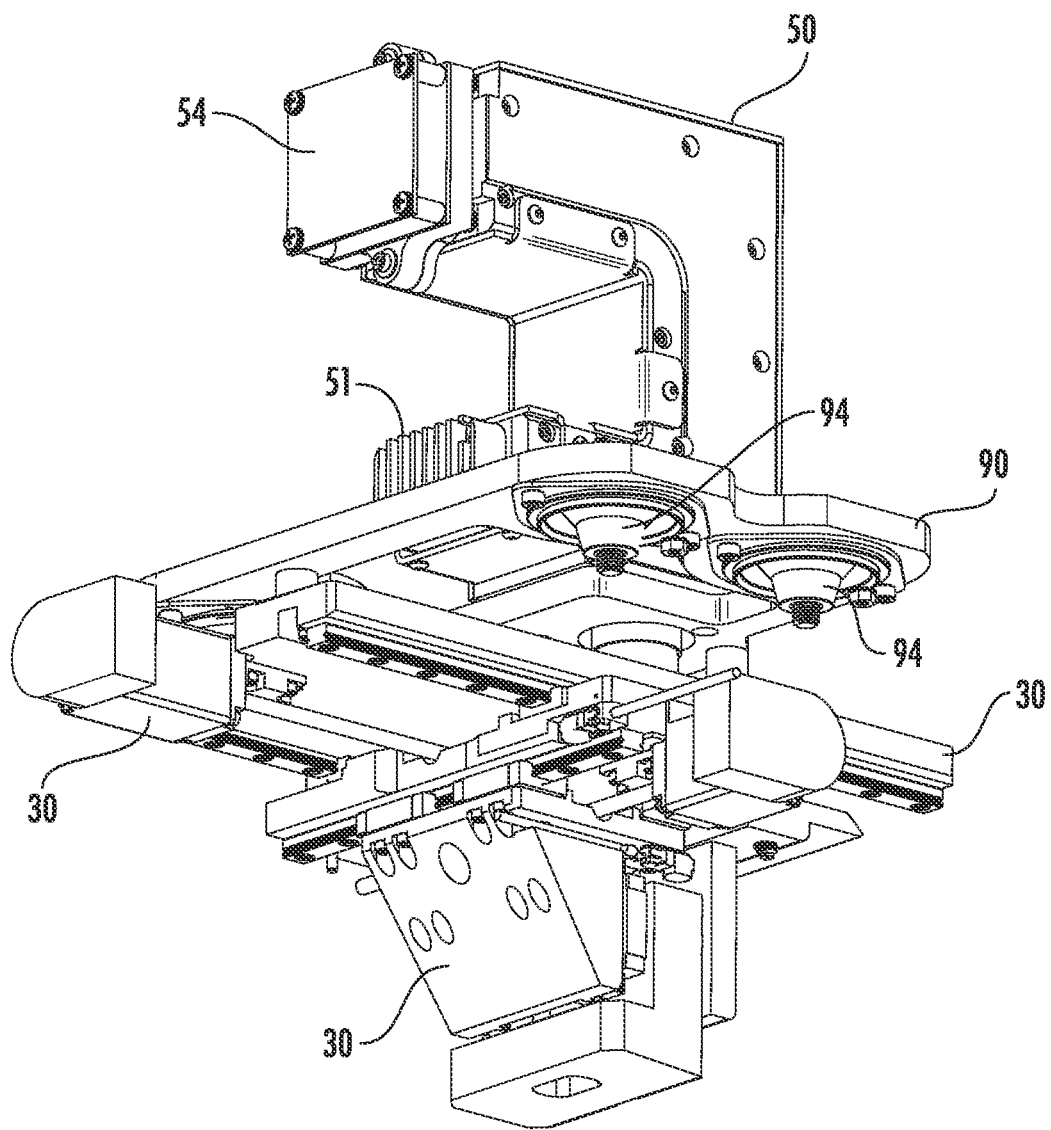
FIG. 7 is a perspective view of a microscope assembly of the apparatus of FIG. 2, with the support frame removed, showing the XYZ drive.
Figure 8:
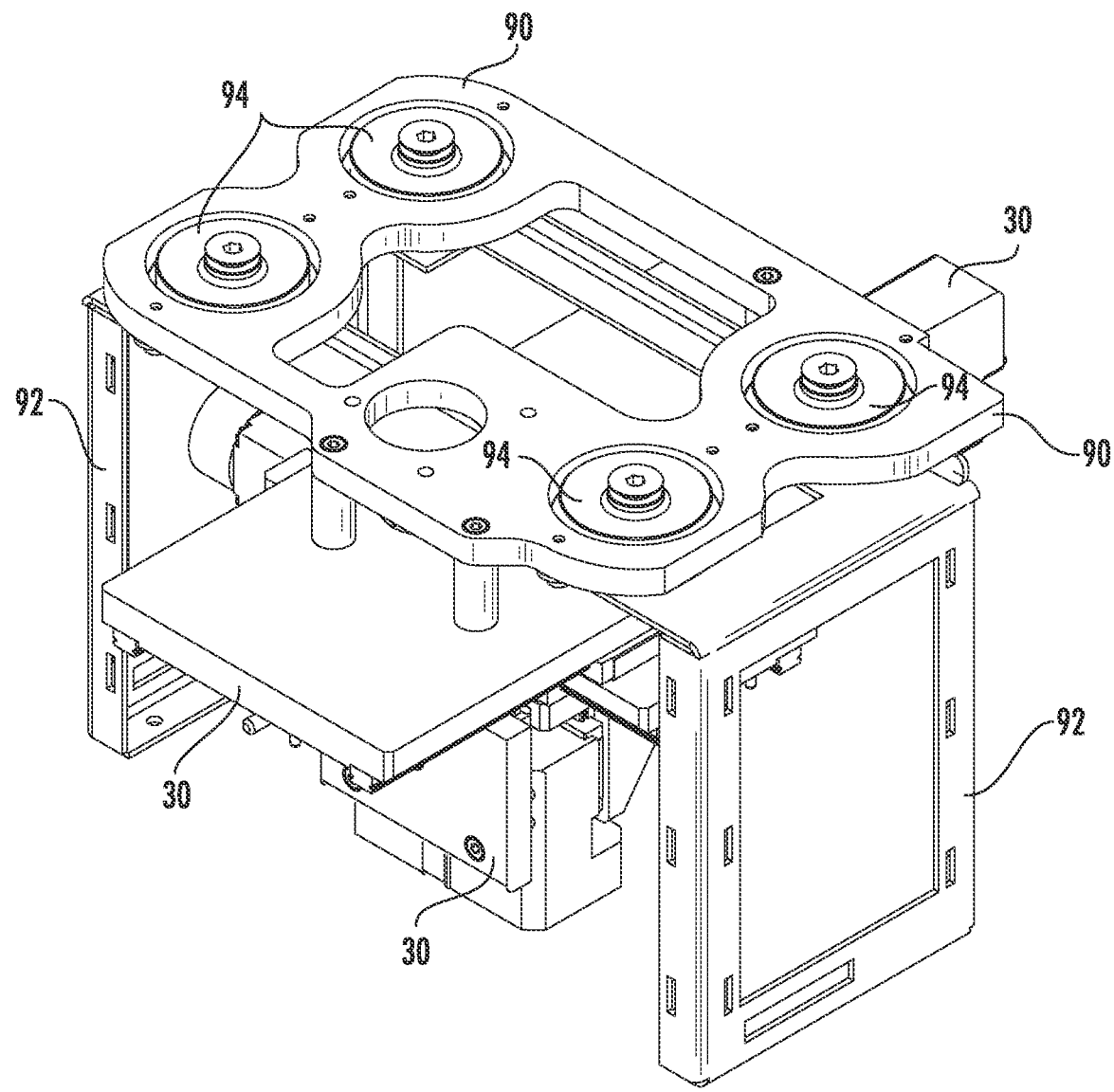
FIG. 8 is a perspective view of the mount, vibration dampers, and support frame of a microscope assembly of FIG. 2, upon which the optical stage of FIG. 5 is to be mounted.

The various components of the microscopy compartment are further illustrated in FIGS. 7-8. FIG. 7 is a lower perspective view of a microscope assembly of the apparatus of FIG. 2, showing the XYZ drive assembly mounted to the base plate (subframe), the optical stage mounted to the subframe, and the vibration isolation bushings, but with the support frame removed. Similarly, FIG. 8 is an upper perspective view of the base plate (subfame), XYZ drive assembly mounted on the base plate, mount, support frame upon which the base plate (subframe) is mounted through the vibration isolation bushings, but now with the optical stage removed.

Figure 9:
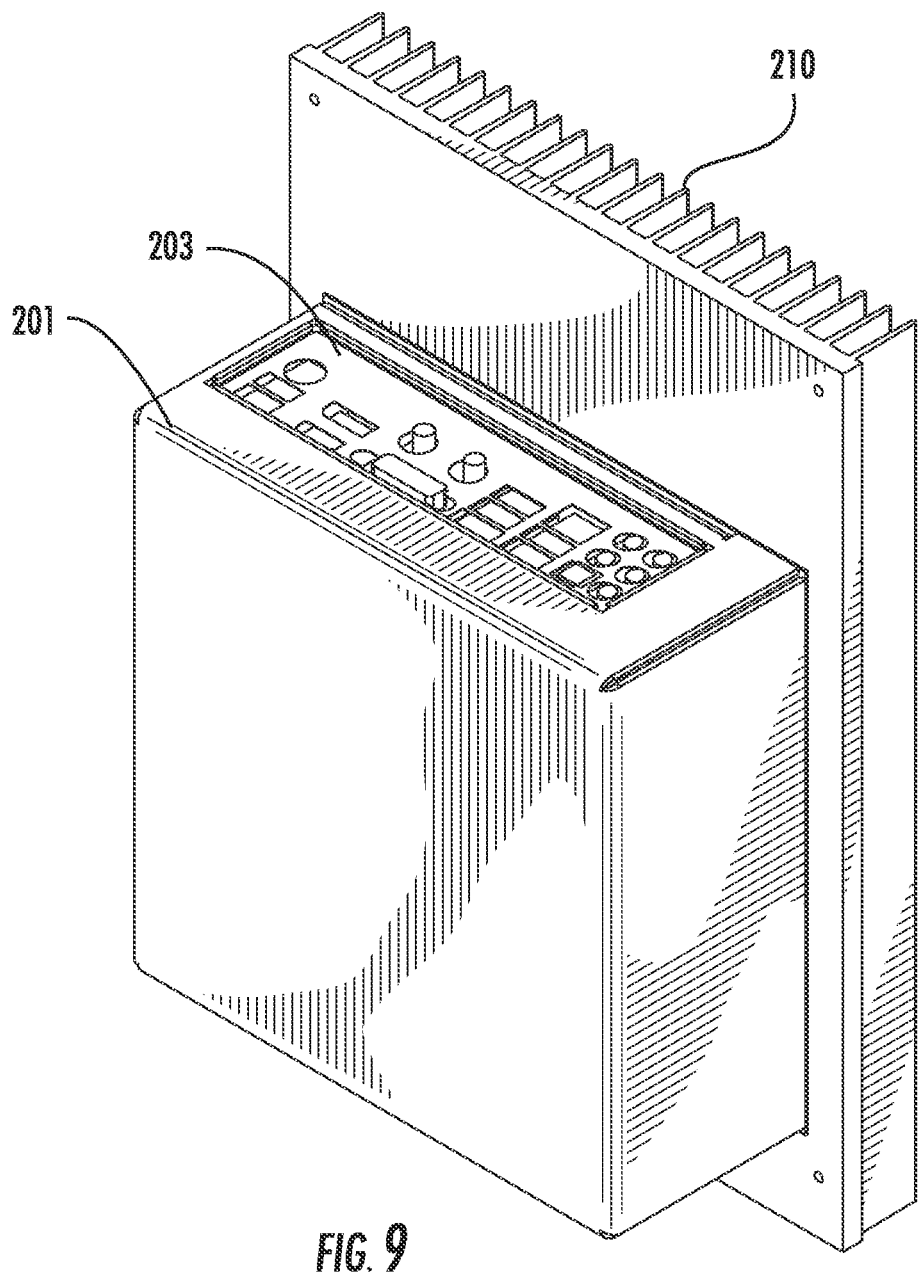
FIG. 9 is a perspective view of a passively cooled microprocessor assembly of the apparatus of FIG. 2.
Figure 10:
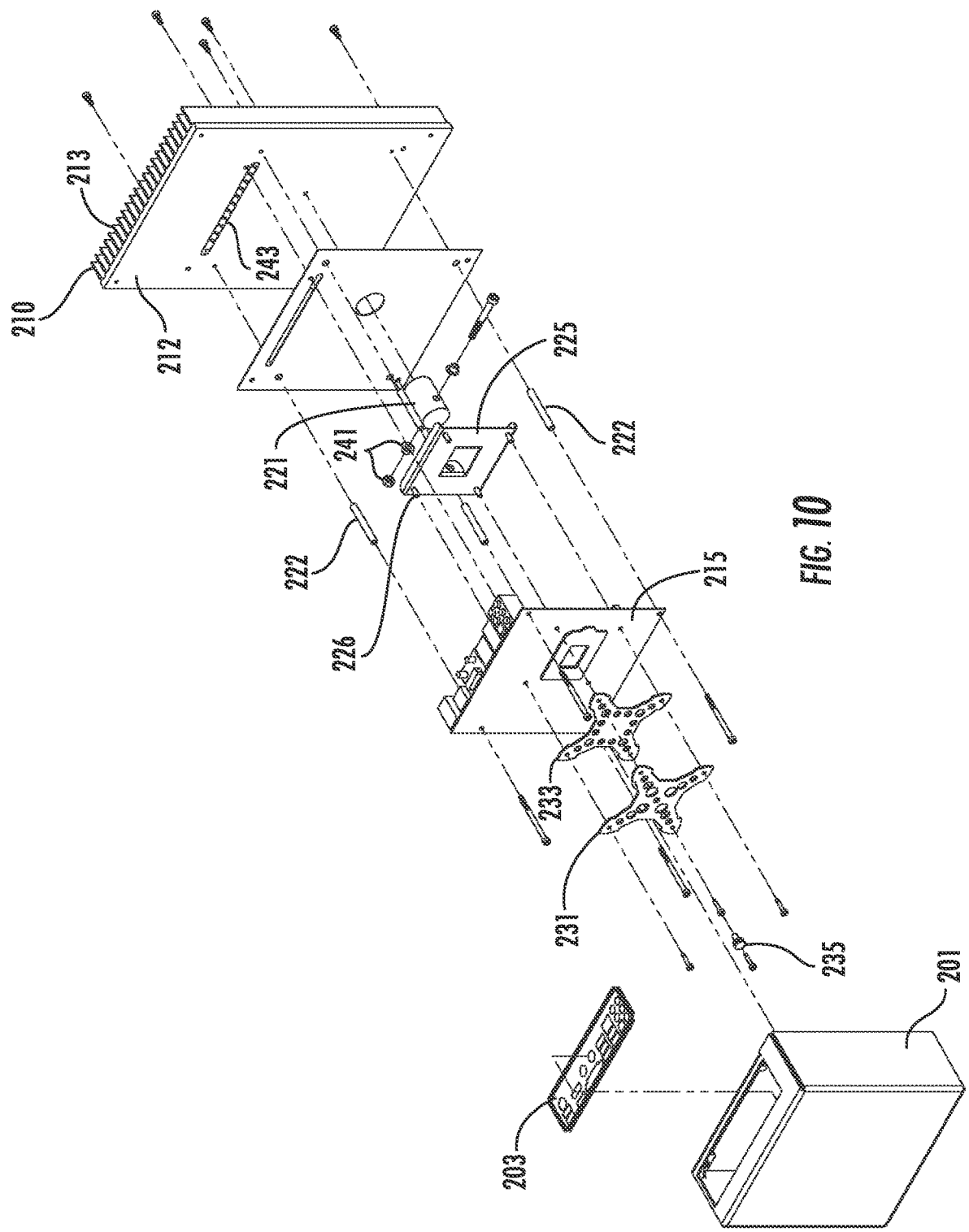
FIG. 10 is an exploded view of the microprocessor assembly of FIG. 9.

FIG. 9 is a perspective view of a passively cooled electronics compartment of the apparatus of FIG. 2, showing the electronics compartment housing (in which the microprocessor assembly is contained) mounted on the heat sink. An exploded view of this electronics compartment and microprocessor assembly is shown in FIG. 10. A mother board (e.g., a ZOTAC H67ITX-CE motherboard) is provided that carries a suitable microprocessor. Suitable microprocessors will generally be those having a thermal design power (or "TDP", sometimes also called "thermal design point") of at least 40, 50, or 60 Watts, up to 120, 140, or 160 Watts, or more. Suitable examples include, but are not limited to, Intel i7, Intel i5, and Intel i3 microprocessors.

As will be seen from FIGS. 9-10, a passively cooled microprocessor assembly includes a heat sink (210) having a front surface and back surface (212), the heat sink having cooling posts, fins or other suitable projections (213) formed on the front surface. A circuit board (215) or "mother board" having a front surface and back surface is included, with a microprocessor mounted on the circuit board front surface. A thermal coupler (221) (e.g., a copper slug or member; a heat pipe; etc.) is positioned between the microprocessor and said heat sink back surface, with the thermal coupler fixed to and in thermal contact with said heat sink back surface. A plurality of legs (222) are mounted on the heat sink back surface, with the circuit board mounted on the legs, and with the circuit board front surface spaced from and facing said heat sink back surface.

An anchor plate (225) is positioned around the microprocessor between the heat sink back surface and the circuit board front surface, with the anchor plate connected to the thermal coupler. A plurality of posts (226) are connected to the anchor plate and project through the circuit board, with a primary plate (231) connected to the posts opposite the anchor plate with the circuit board therebetween. A secondary plate (233) is slideably received on the plurality of posts and contacts said circuit board back surface. A screw (235) is threaded through the primary plate and contacts the secondary plate, so that tightening of the screw pushes the secondary plate against the circuit board back surface and clamps said microprocessor to said heat sink (optionally but preferably with a thermal grease sandwiched in between), thereby fixing the microprocessor, the thermal coupler, and the heat sink in thermal contact with one another. A housing (201) (e.g., a metal or aluminum) with an associated bezel (203) is provided around the assembly to form an electronics compartment (98) in the device separate from the microscopy compartment, as noted above. There is preferably included at least one thermal isolator (241) formed from a relatively thermally nonconductive material (e.g., an organic polymer), with the thermal coupler and the anchor plate are connected to one another through the at least one thermal isolator.

A ventilation opening (243) such as an elongated slot may optionally be formed in the heat sink to further facilitate cooling of the electronics chamber. Such an opening or port is preferably configured to inhibit or slow the progression of liquid or solid particles from outside the apparatus entering into the electronics chamber, such as by configuring the slot at a downward angle.

All of the foregoing may also be as described in commonly owned, copending International Application Nos. PCT/US2013/049112, PCT/US2013/049247, and U.S. Patent Application Publication Nos. US 2014/0233098, and US 2014/0009596, the disclosures of which are incorporated herein by reference in their entirety.

Figure 11:
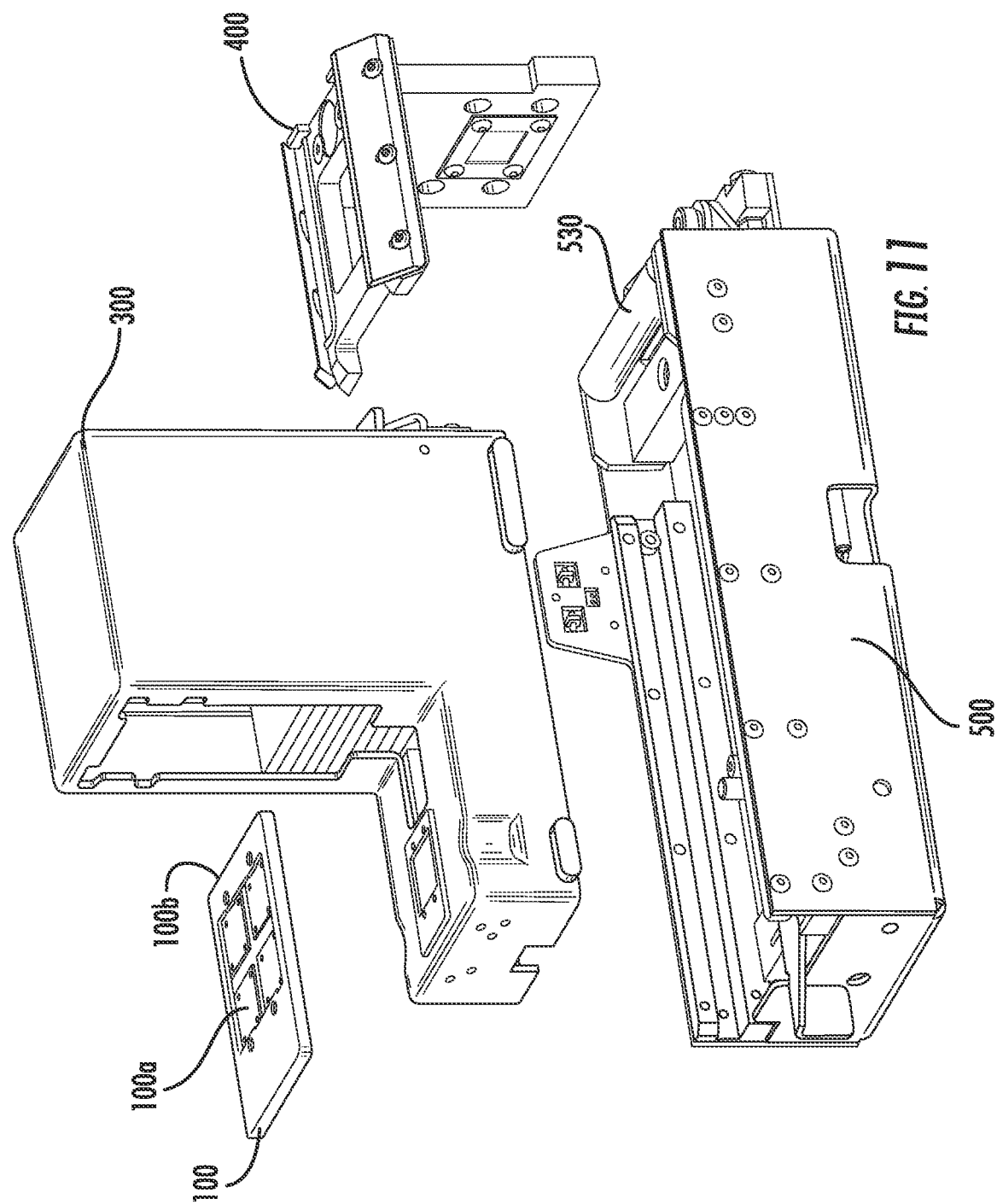
FIG. 11 is an upper perspective view of a cartridge, cartridge magazine, magazine actuator, and cartridge gripper exploded apart from one another.
Figure 12:
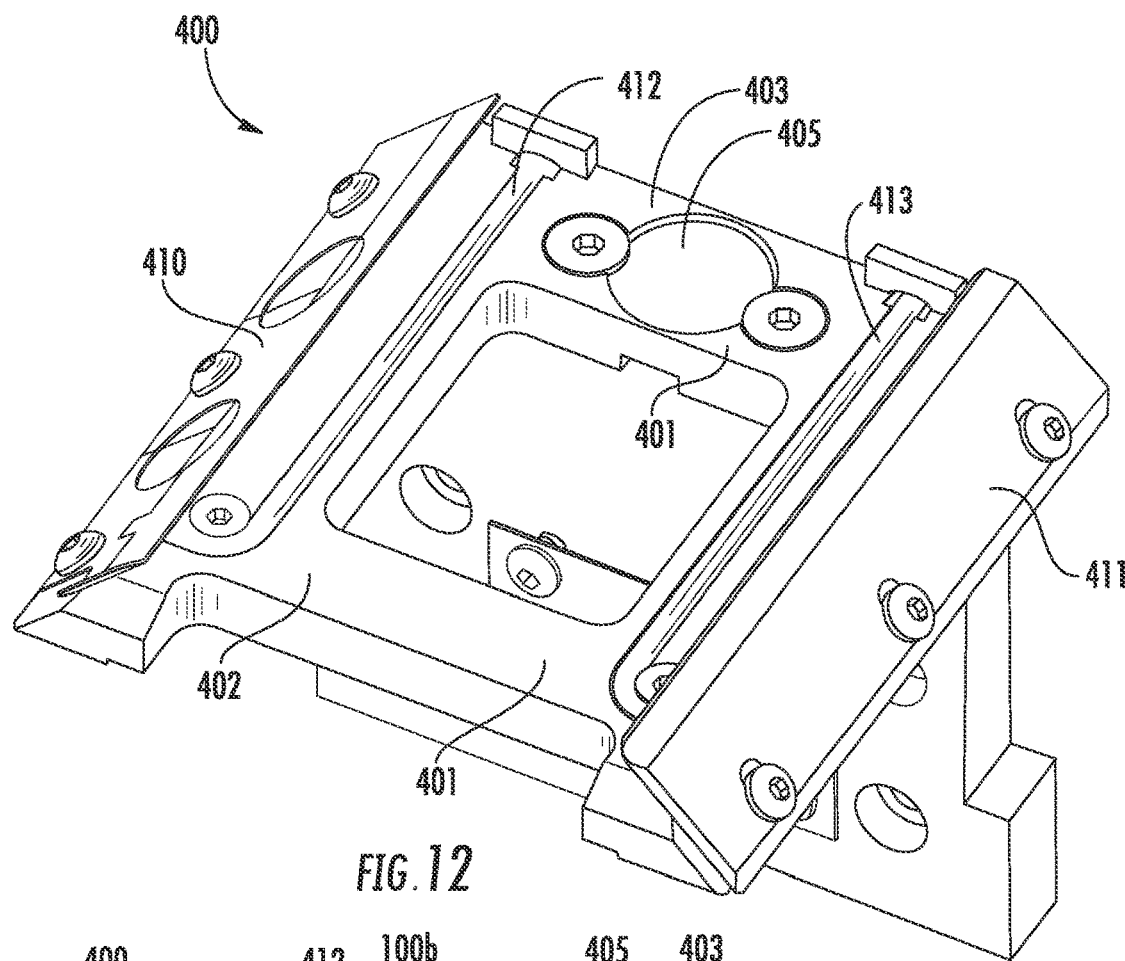
FIG. 12 is a perspective view of a cartridge gripper.

FIG. 11 shows an illustrative cartridge 100 (which contains four separate sample chambers 100a, each of which may be separately imaged), a cartridge magazine 300, a cartridge magazine actuator assembly 500, and cartridge gripper 400 components, all separated from one another. The details of each and their manner of operation together are explained further below. It will be appreciated, however, that the automated microscope components described above can be easily converted into a single use or manual feed device by elimination of the passive autoloader features described below, and appropriate programming of the device controller.

A. Cartridge Gripper.

Figure 13:
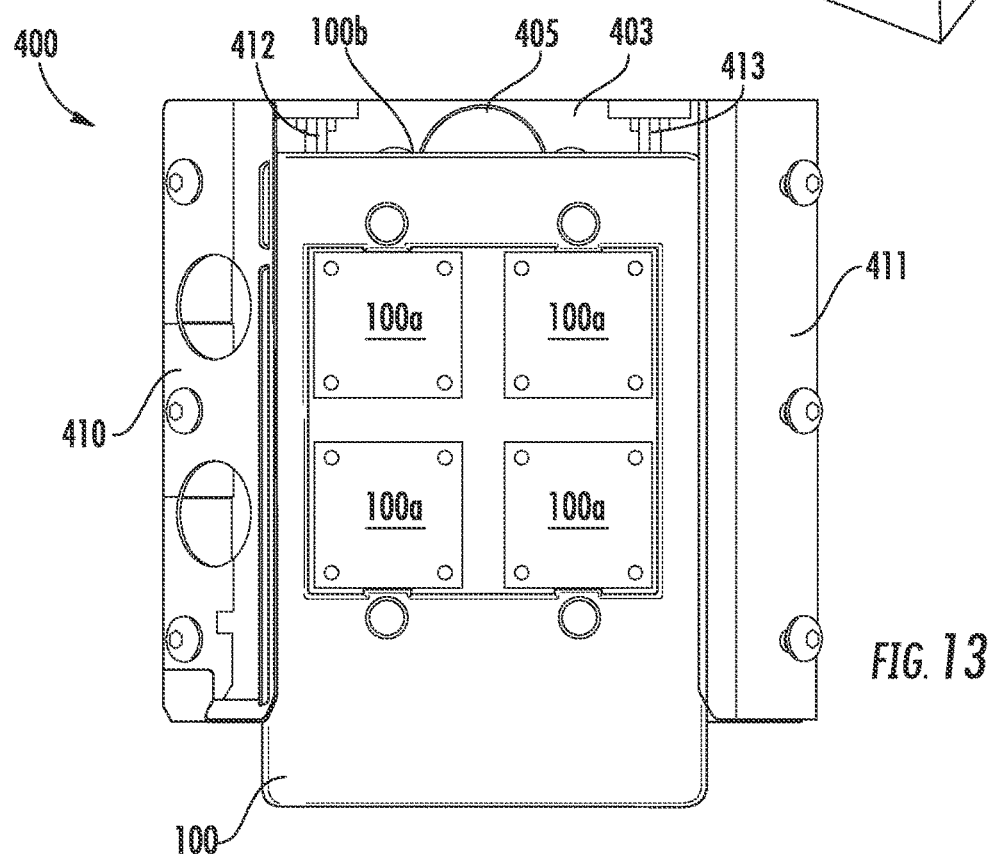
FIG. 13 is a top view of the cartridge gripper of FIG. 12, with a cartridge inserted.
Figure 14:
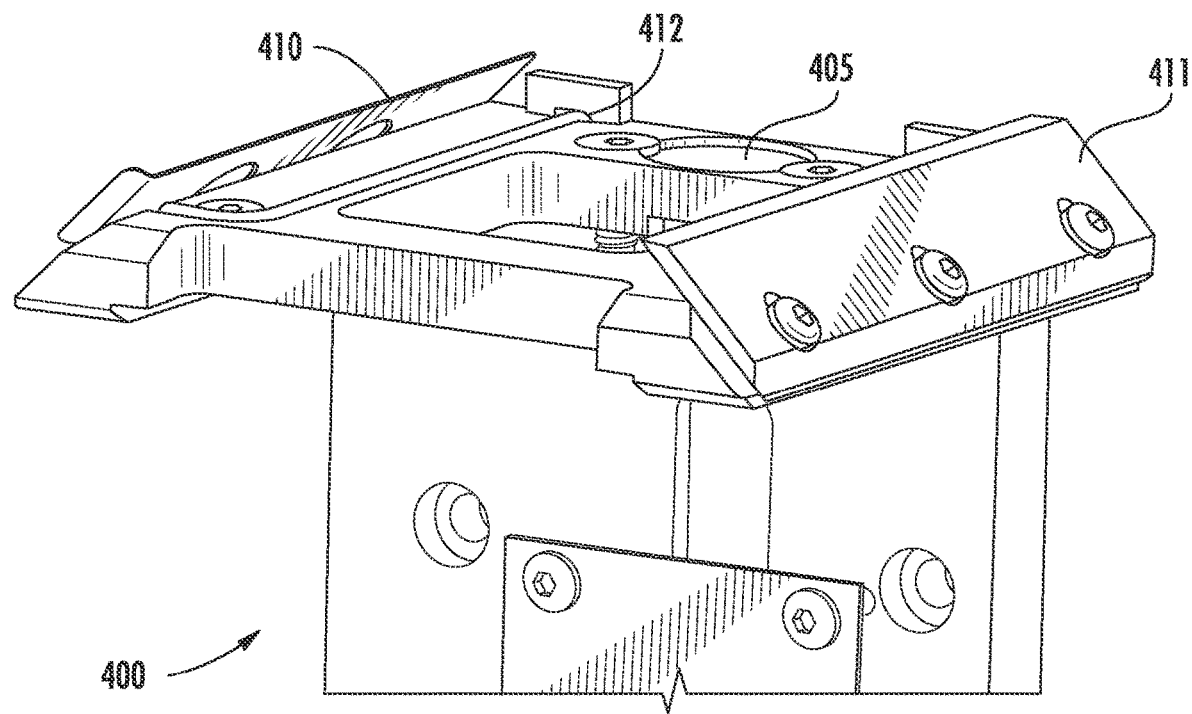
FIG. 14 is a lower perspective view of a cartridge gripper of FIGS. 12-13.
Figure 15:
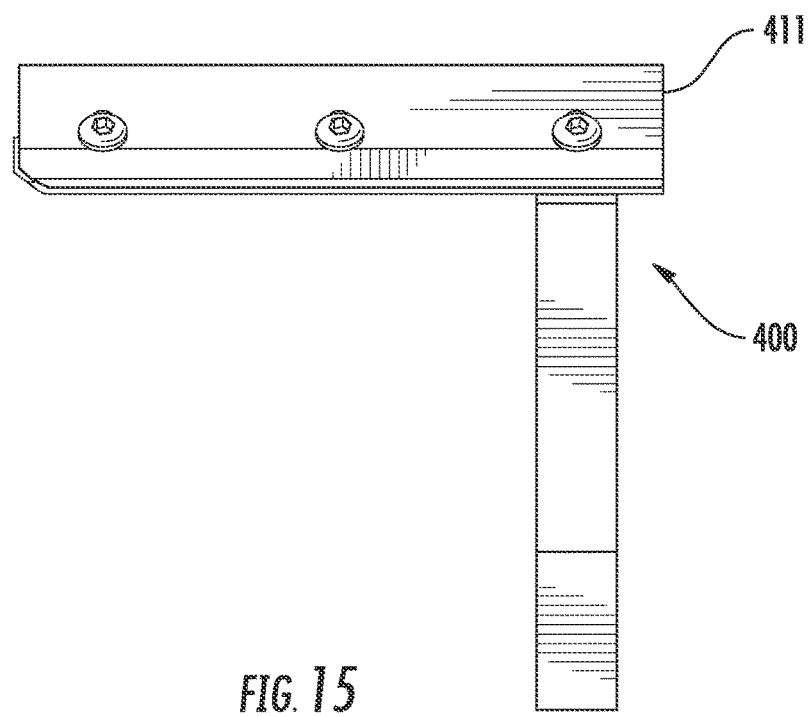
FIG. 15 is a side view of a cartridge gripper of FIGS. 12-14.

FIGS. 12-15 provide various views of an illustrative cartridge gripper 400 of the present invention, with the cartridge (shown separately in FIG. 11 and FIG. 17) shown inserted into the gripper FIG. 13.

The cartridge gripper includes a base member having a planar stage surface portion 401 (having a substantial portion thereof cut away), with the surface portion including a forward surface portion 402 and a rear surface portion 403. In the illustrative embodiment, an optical alignment detection element 405 is included on the rear surface portion, with the detection element configured to at least partially underlie a leading edge portion 100b of the cartridge once inserted (as shown in FIG. 13), so that an inserted cartridge, rather than be inserted all the way into the gripper until it encounters a fixed or hard stop (as may be preferred for a single use or manual feed automated microscope), can come to a final position in the gripper in a variety of alternate locations in the "Y" dimension (the advantages of which are discussed below). As illustrated the detection element is a disk of fluorescent material, which can be fastened by any suitable technique. The element is in some embodiments recessed beneath the rear surface portion sufficiently so that it is not subject to wear caused by the repeated insertion and ejection of cartridges. The detection element 405 is utilized to provide contrast between the leading edge portion 100b of the cartridge so that the position of the cartridge 100 can be detected by imaging through the microscope and the controller then configured to properly align the objective lens for the various chambers in the cartridge.

The gripper includes a pair of parallel engagement elements 410, 411 configured to secure said sample cartridge side edge portions. One or both of the engagement elements can be angled or "dove-tailed" in configuration. The engagement elements can be formed of any suitable material and can be rigid or resilient (e.g., formed of a flat spring, or assembled from a rigid element that is in turn allowed to float and biased into place by springs). In some embodiments, at least one of the engagement elements is rigid, and in the illustrative embodiment the left element 410 is resilient, and the right element 411 is rigid.

One or both of the engagement elements are preferably elongate, that is extend along at least a major portion of the gripper surface and/or along the major length of the cartridge to be inserted, to allow for substantial positional variance in the "Y" dimension for the cartridge being inserted.

In addition, the gripper may include a pair (or more) of rails 412, 413 connected to and positioned on the gripper surface portion to reduce friction between the cartridge and the gripper, and facilitate the sliding of a cartridge into and out of place.

As noted above, by providing a position detection element, which can be used to aid the detection of the cartridge by the controller, the need for a hard stop to mechanically force each cartridge into a pre-determined position is obviated. Such a hard stop may disadvantageously lead to voltage and/or current peaks or "spikes" in drives or actuators such as the robot, which may in turn disrupt the controller or microscope through shared circuitry (e.g., causing a software failure and forcing a re-boot of the controller), and cause the sequential processing of multiple slides through the apparatus to be disrupted.

While a linear edge for the cartridge and a circular fluorescent marker is shown, it will be appreciated that additional geometries can be employed on each thereof. Also, if the leading edge of the cartridge itself is fluorescent, the alignment detection element can be non-fluorescent. Also note that "leading edge" is with reference to the detection element, and can in fact be recessed from other forward edge portions of the cartridge itself. Finally, while optical contrast is achieved through fluorescence/nonfluorescence in the illustrative embodiment, any other means of optical contrast can be used, alone or in combination with fluorescence and one another, such as pattern detection, color detection, reflectance, etc. or any other high contrast element or surface portion therein, depending on the choice of materials and surface for the cartridge leading edge portion.

B. Cartridge Magazine.

FIGS. 16-28 illustrate a cartridge magazine of the present invention (with a cartridge configured for insertion therein shown individually in FIG. 17) and a plurality of cartridges 100 within the magazine inner chamber forming a "cartridge stack" therein. As illustrated, the cartridge magazine provides the cartridges to the automated microscope in a first-in/first-out (FIFO) manner, to aid in rapid through-put, capability for concurrent loading and unloading operations to facilitate rapid through-put, facilitate correct cartridge orientation, help prevent accidental cartridge ejection during manual loading, and provide a reasonably compact, simple linear bearing system to eject the cartridges from the magazine accurately and consistently, all by passive operation of the moving components (that is, without additional actuator elements).

Figure 16:
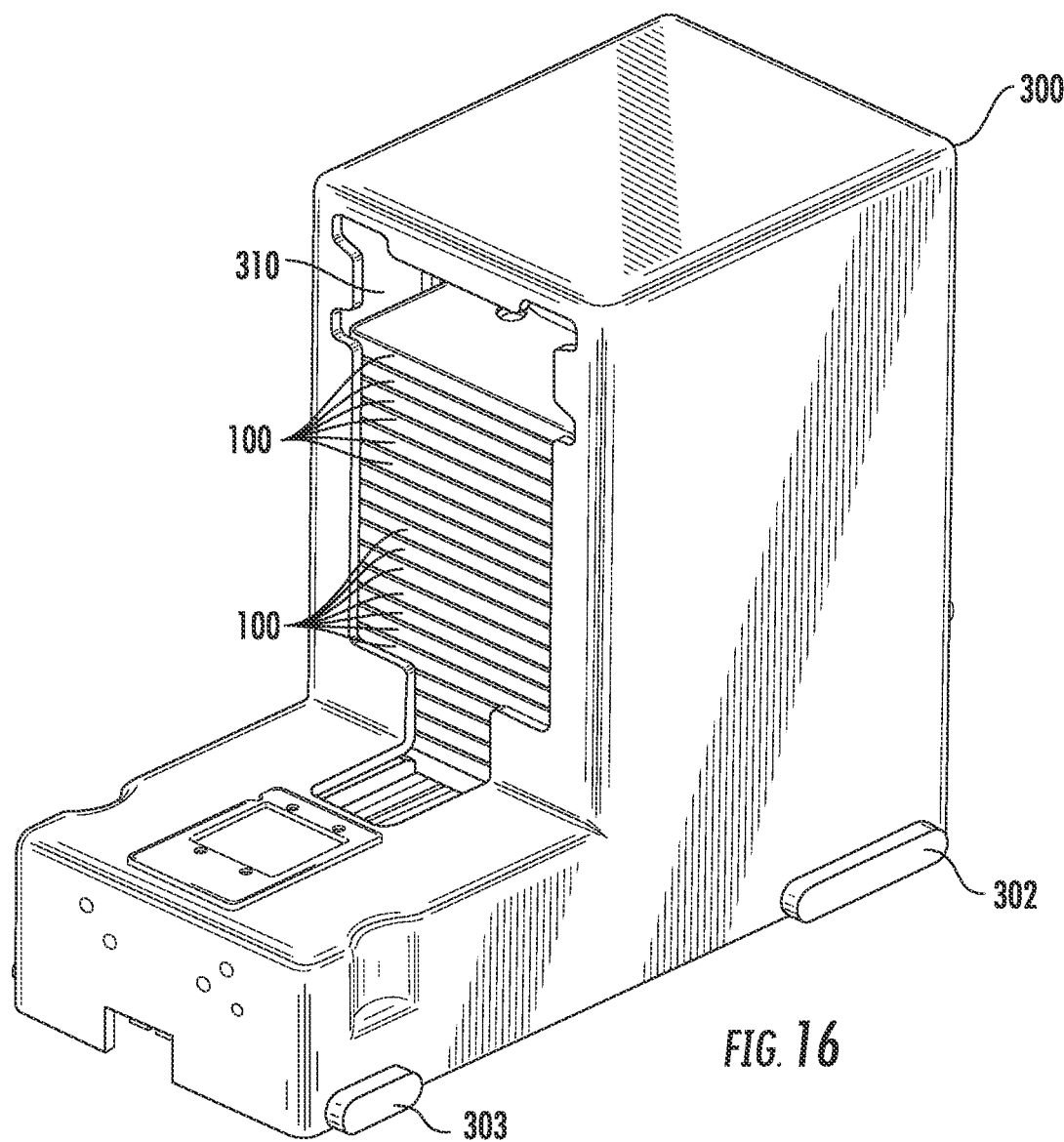
FIG. 16 is a perspective view of a cartridge magazine, fully loaded with cartridges.
Figure 17:
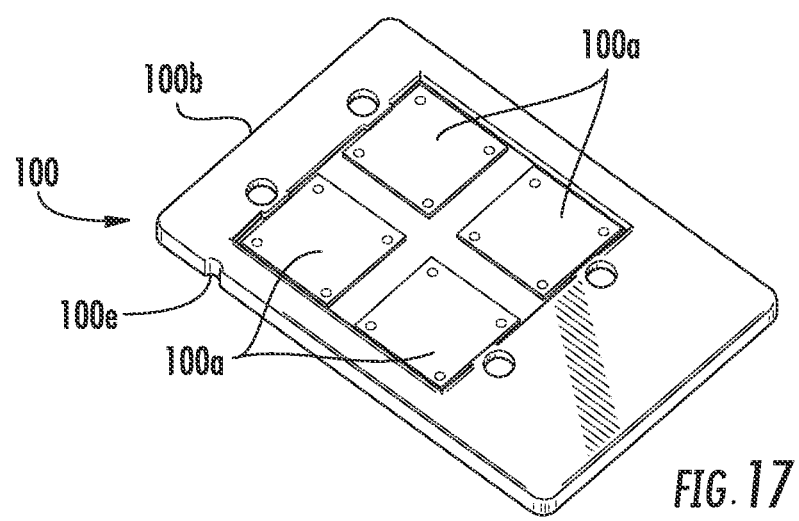
FIG. 17 is a perspective view of a cartridge for loading into a magazine of FIG. 16.
Figure 18:
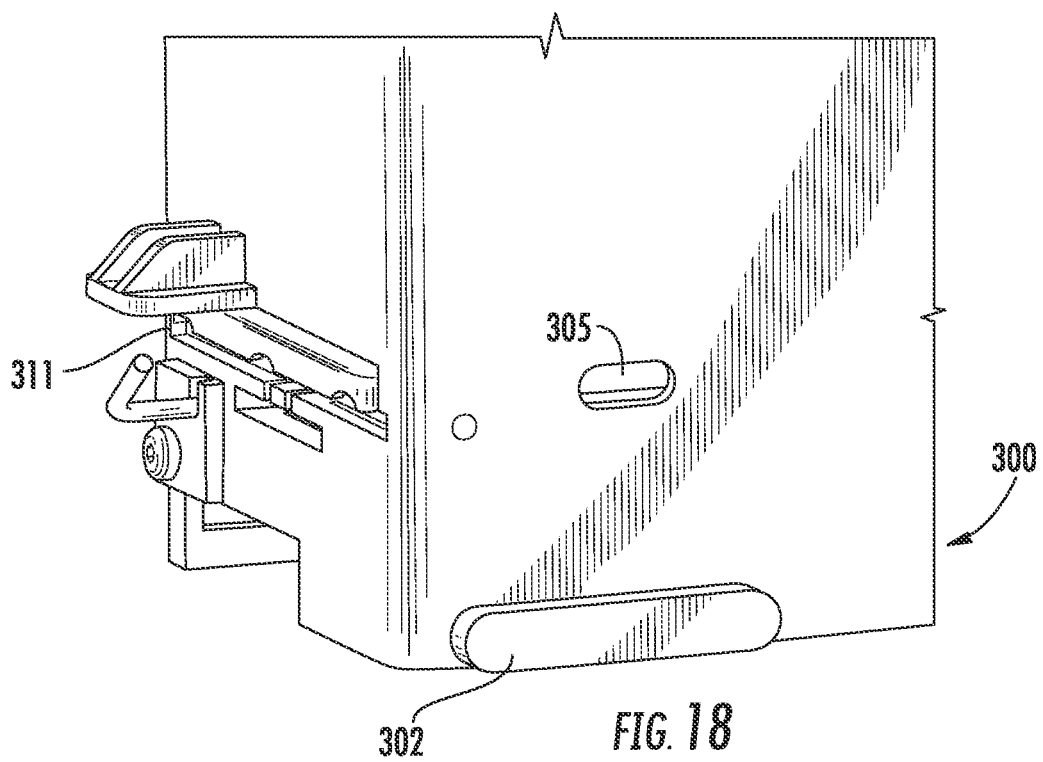
FIG. 18 is a partial perspective view of a cartridge magazine showing the loading gate.
Figure 19:
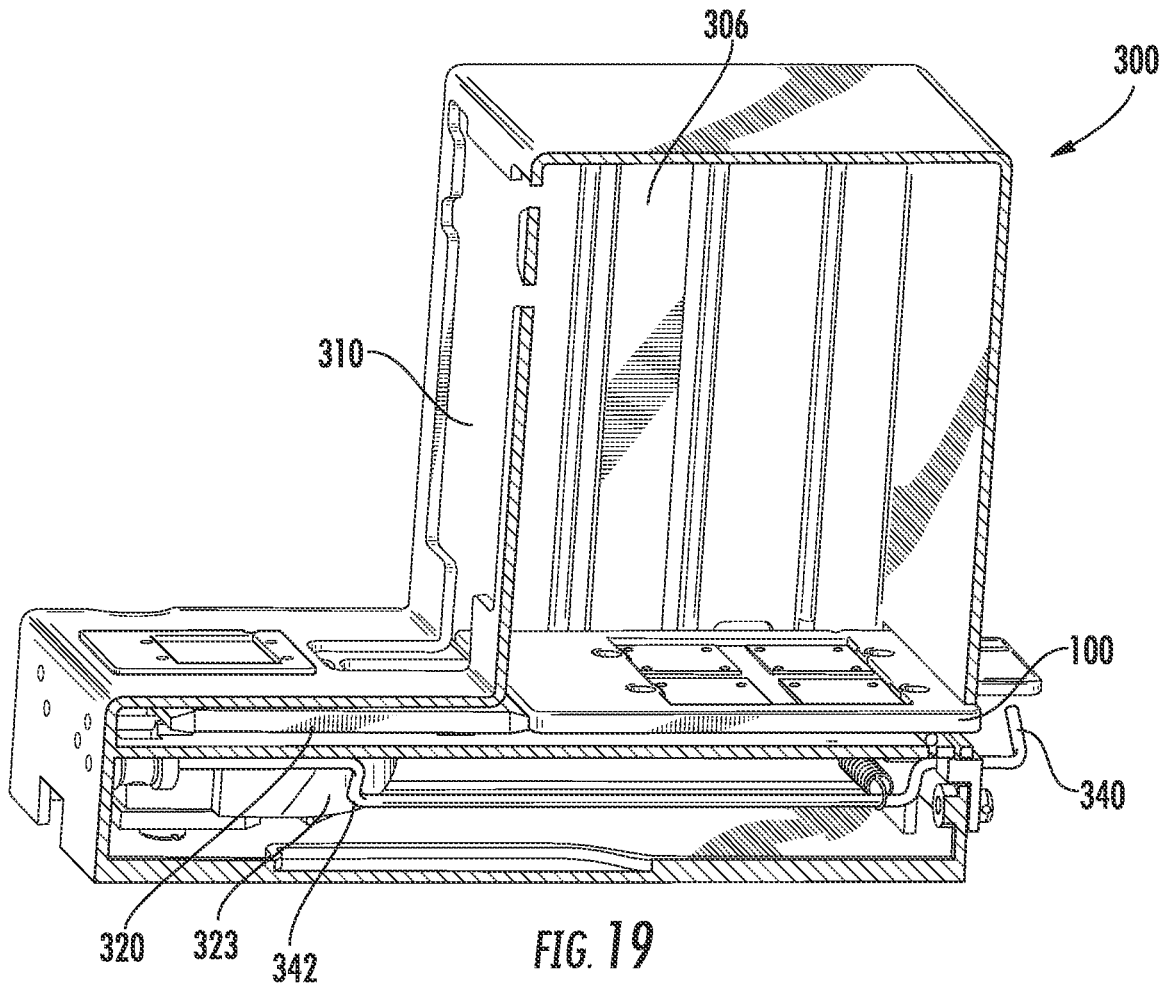
FIG. 19 is a cut-away perspective view of a cartridge magazine of FIG. 16, with a single cartridge therein.

The general form of the cartridge magazine is shown in FIG. 16, where is seen an opening through which cartridges are manually inserted. In general, the cartridges are wider than the opening and are angled for insertion. Once inside the magazine cavity, gravity settles each cartridge horizontally on a stack of cartridges and moves each cartridge down as cartridges are sequentially ejected from the bottom of the cartridge stack.

When the magazine is inserted into grooved rails in the actuator assembly of an automated microscope apparatus (as discussed below), it is located by boss projections 302, 303, on both sides of the device. Cartridges 100 can be loaded manually into the magazine through an input opening 310 and the magazine can be pre-loaded with cartridges before installing the magazine into the apparatus, or cartridges can be loaded after the magazine is installed in the apparatus. The design thus permits the user to pre-stage large numbers of cartridges by filling several magazines 300 in advance prior to insertion into the apparatus. Conversely, if the biological characteristics of a given cartridge degrade with time and limit the amount of time prepared cartridges can be staged in advance, the magazine may be loaded into the apparatus and individual cartridges inserted therein as they are prepared.

When the magazine is inserted in the apparatus, a sensor (not shown) such as an optical sensor operatively associated with the controller may be positioned to detect the presence of the magazine, and a second sensor (not shown) such as an optical sensor operatively associated with the controller may be positioned to sense through a sensor opening 305 in the side of the magazine (or both sides of the magazine, when the detector comprises a light emitter and a light detector), where the bottom (first) cartridge can be sensed, and the apparatus controller can be configured to immediately commence acquisition and analysis of the cartridge. Since the magazine can always be open and ready to receive cartridges, the next cartridge can be inserted into the top of the magazine as soon as it is prepared, and while the system is in operation with cartridges being dispensed from the bottom of the magazine (e.g., the magazine can be "topped off"), thus maximizing through-put, eliminating wait time for the operator, and minimizing the processing time for cartridges subject to degradation. It will also be appreciated that since cartridges are loaded on top of the "stack" (of a plurality of cartridges) and removed from the bottom, this constitutes a FIFO system which can further reduce the processing time of each cartridge, and maintain the identity of each cartridge.

One problem associated with microscope cartridges that are prepared with stains or reagents for live cells is that they are viable for a limited time period due to evaporation of fluids from the cartridge. Viability can be extended by humidifying the ambient environment around the cartridge. Accordingly, this design incorporates one or more humidification strips (306) or elements inside the magazine cavity as shown in the FIG. 19. The strips are made from an absorbent material, such as felt or other hydrophilic material, and can run some, most of, or substantially all of the entire height of the magazine. They may be permanently mounted inside the magazine or they may be designed to be removable. In either event, when saturated with water in the confines of the enclosure, evaporation from the strips serves to raise the humidity level around the cartridges and retard drying and degradation of liquid or fluid stain or other liquid/aqueous sample therein.

Figure 20:
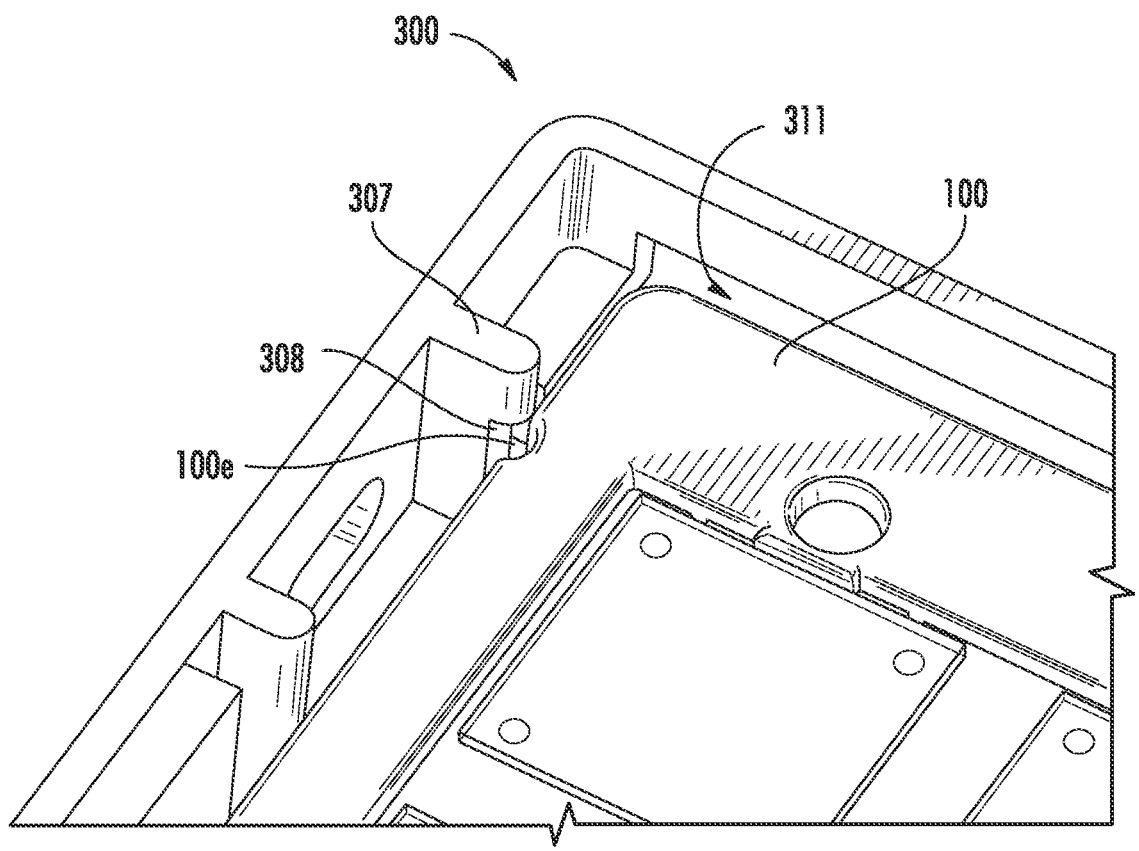
FIG. 20 is a partial perspective view of a cartridge magazine and cartridge, showing the cartridge alignment with an exit notch in the lower portion of an internal side rail.

Another requirement for accurate and orderly processing of cartridges is that they must be properly oriented with respect to the microscope system inside the apparatus. In one embodiment, the cartridges used in this device contain 4 "quarters" or individual chambers which are filled from the four udders of a cow. These quarters must be presented to the apparatus in a consistent manner in order to preserve data integrity, which tracks infection of individual udders. If the cartridge is swapped end for end, or turned over, invalid readings will be made. Accordingly, an off-center orientation notch 100e in one side of the cartridge (see FIG. 17) is used to require the operator to insert the cartridge correctly into the magazine. This is accomplished by including an elongate polarizing rib 307 inside the magazine, along with an escape notch 308 in that rib which permits ejection of the bottom or lowermost cartridge 100 through the ejection opening 311, as shown in FIG. 20. Attempts to insert a cartridge into the magazine in other than the proper orientation will cause the cartridge to jam against either the polarizing rib, or any of the locating/guiding ribs (if included) inside the magazine, thereby giving the operator tactile feedback that the cartridge is not installed in the proper orientation. The cartridge may then be removed, re-oriented, and re-inserted into the magazine.

Figure 21:
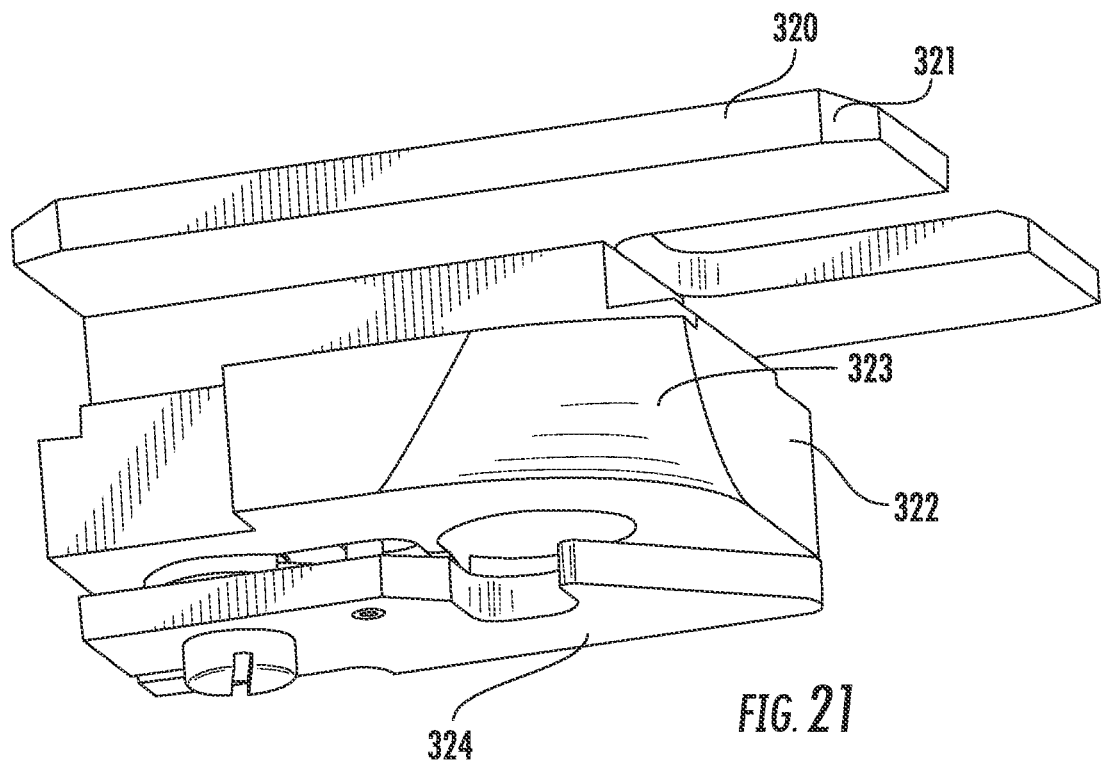
FIG. 21 is a perspective view of a cartridge magazine ejector and actuator latch assembly.
Figure 26:
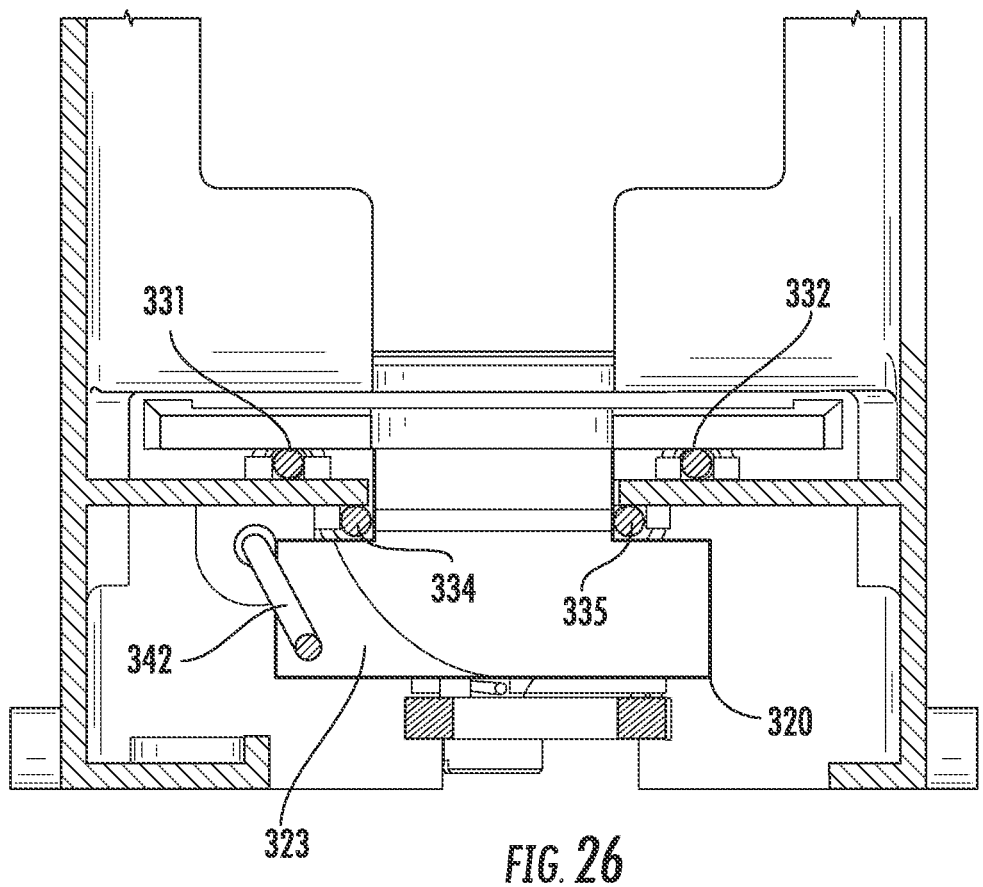
FIG. 26 is a front end view of a cartridge magazine.
Figure 27:
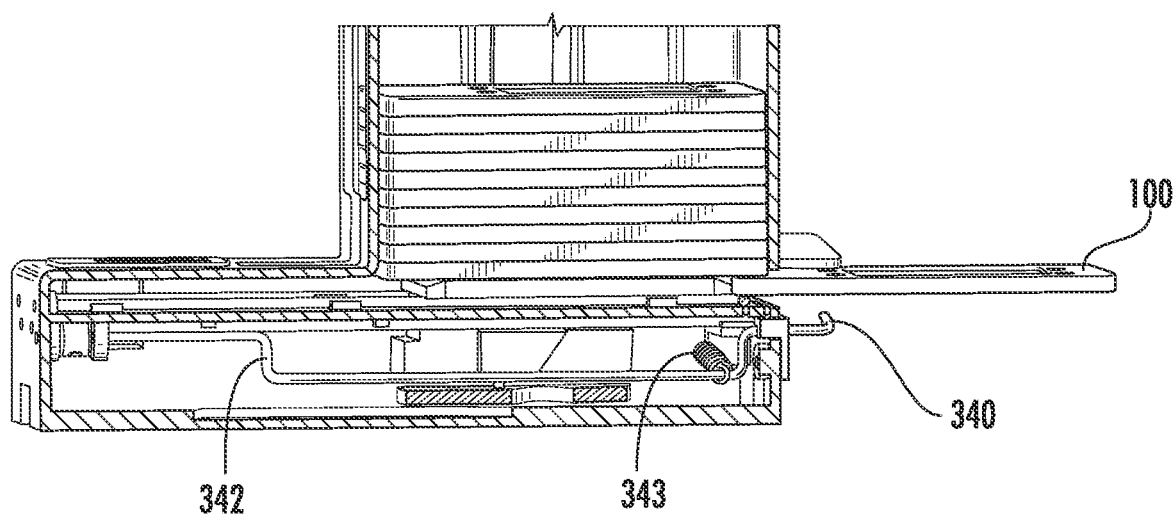
FIG. 27 is a partial, cutaway, perspective view of a cartridge magazine, with a cartridge near full ejection.
Figure 28:
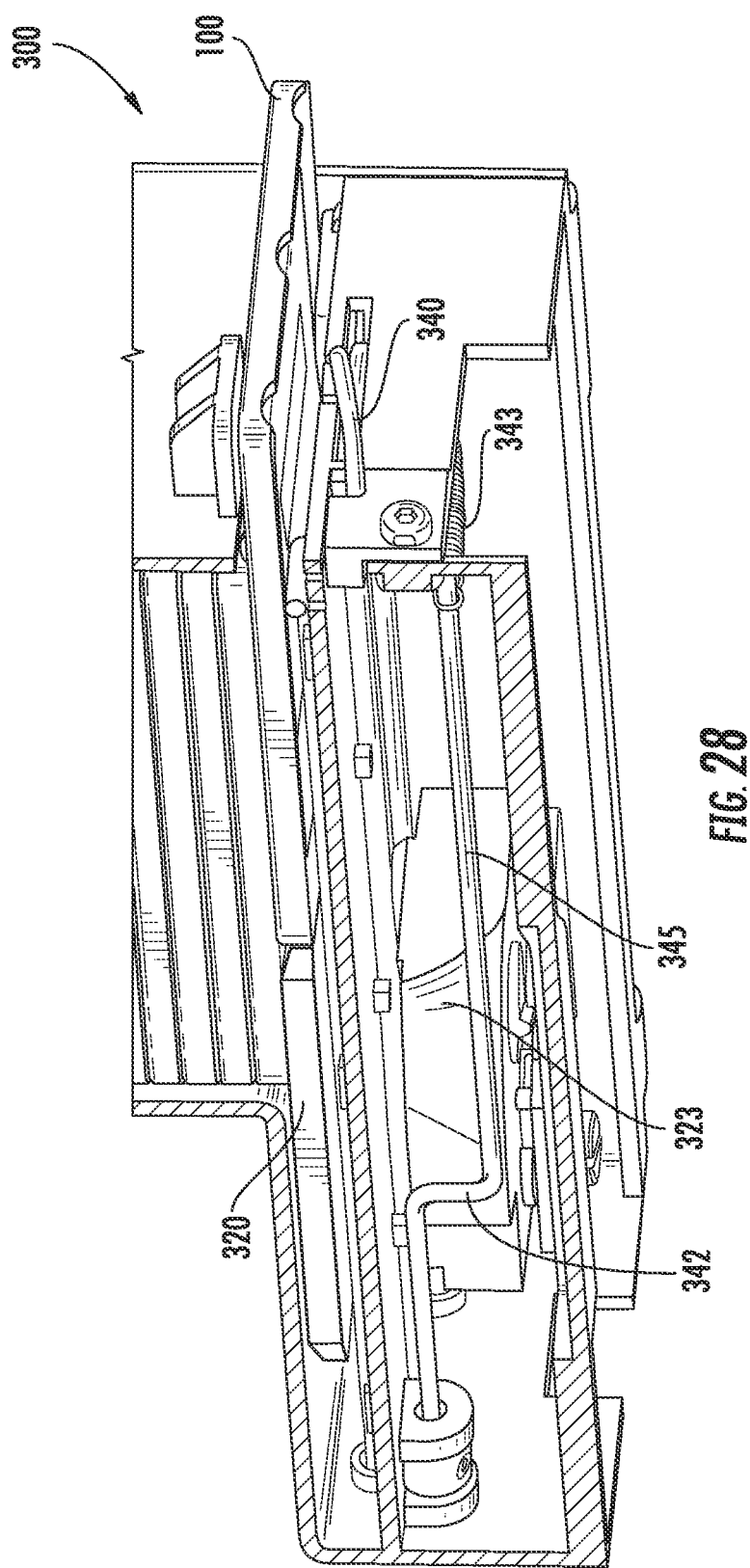
FIG. 28 is a lower, cutaway perspective view of a cartridge magazine, with a cartridge partially ejected.

As shown in FIG. 21, the magazine includes a cartridge stripper 320 or ejector, which is operatively associated with the actuator assembly output element (as discussed below) when the magazine and actuator assembly are connected to one another. The stripper serves to remove or eject cartridges from the bottom of the cartridge stack within the magazine and push them through ejection opening into a waiting gripper. Note the stripper includes an upper plate 321, a lower guide block 322 having a cam surface portion 323, and a magazine engagement catch 324 that is biased into position by a spring (not shown).

The orientation and operation of the cartridge stripper 320 is shown in greater detail in FIGS. 22-28. In the illustrative embodiment, the cartridge stripper is mounted on rails, specifically two upper (331, 332) and two lower (334, 335) rails (See FIG. 26). The rails may be fabricated of any suitable material, such as polished stainless steel, and the stripper itself fabricated from a lubricious polymer such as DELRIN™ polymer, so the entire assembly is vertically compact and forms a linear bearing assembly which generates little friction during operation. As discussed further below, the stripper is passively moved horizontally back and forth, via connection at the engagement catch 324, by an external mechanism (the actuator output element, discussed below). The vertical separation between the upper and lower rail pairs matches the notch formed by the upper stripping plate and the lower guide block, which are fixed together by screws. The side-to-side movement of the device is maintained by the lower rails, which captivate the lower guide block. Thus, the device is free to travel back and forth along the length of the magazine, and travels only under the cartridge stack. As it travels from the far left "home" position to the right under the cartridge stack, it pushes the bottom cartridge out of the ejection slot or port, while simultaneously supporting the remaining cartridges in the stack. When the device retracts to its leftmost (home) position, the stack falls down the thickness of one cartridge, and the magazine is ready to eject another cartridge.

As illustrated above, cartridges are inserted through a large opening 310 on one end of the magazine and exit from a narrow cartridge ejection slot 311 at the other end, on substantially the same elevation as the bottom (first inserted) cartridge. If the operator loads the first cartridge and pushes it in too far, it might prematurely exit the magazine through the ejection opening, absent some feature to prevent this event. Therefore, the magazine is equipped with a gate mechanism (as shown a rotatable wire-form gate mechanism) 340 which serves to prevent the bottom cartridge from being inadvertently ejected when first inserted by the operator. This gate is passively activated by the horizontal action of the cartridge stripper, via the cam surface 323 on the lower guide block which bears against an offset segment 342 of the rotatable wire-formed gate element, as illustrated in FIGS. 22-28.

Note that, as the cartridge stripper is moved forward, the cam surface acts against the offset segment 345 of the wire-form, causing the entire wire-form to rotate in its front and rear bearings, which in turn rotates the gate segment of the wire-form down and away from the cartridge ejection opening in the magazine, permitting the cartridge to exit the magazine. This rotation of the wire-form is against the tension of a return spring 343, so that when the stripper is retracted, the wire-form rotates in the opposite direction and brings the gate up to the closed position. Thus the gate is always substantially closed as long as no cartridge is in the process of being ejected.

C. Magazine Actuator Assembly

Figure 29:
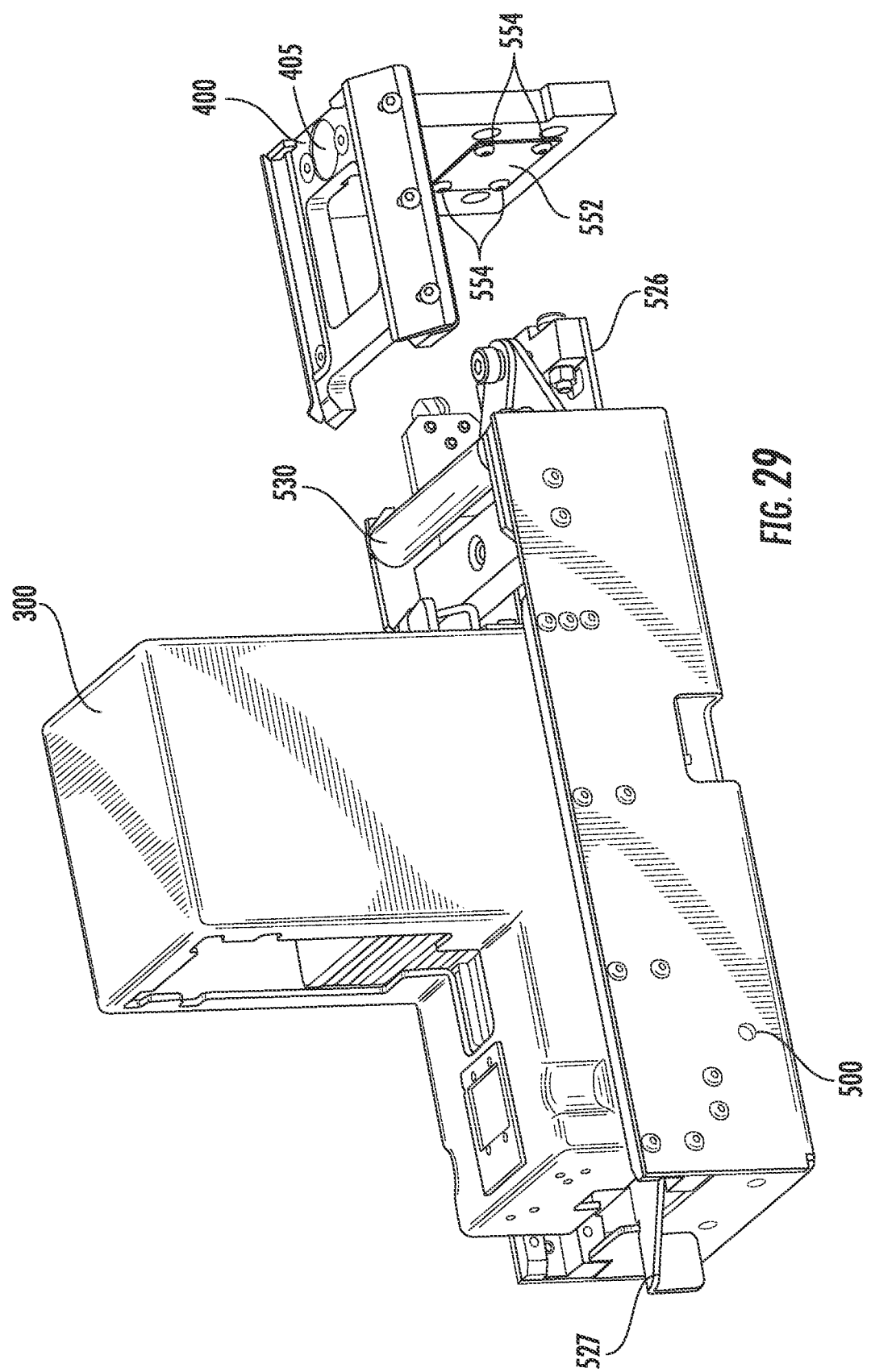
FIG. 29 is a perspective view of a cartridge magazine, magazine actuator, and cartridge gripper, with the magazine and actuator assembled.

FIG. 29 is a perspective view of a cartridge magazine 300, magazine actuator 500, and cartridge gripper 400, with the magazine and actuator assembly connected to one another in their cooperating and operative position. Details of one embodiment of a magazine actuator assembly, along with certain alternative embodiments, are illustrated further in FIGS. 30-39. The illustrative embodiments facilitate the automated dispensing of cartridges and serves to overcome several problems associated with indexing cartridges from a stacked magazine into a robot (XYZ drive) mounted gripper, including: the need for active power to operate the mechanism, the need for an intermediate cartridge transfer mechanism to transport the cartridge from the storage magazine into the gripper, and/or the need for a complex latch mechanism to couple the robot gripper to the actuator during cartridge acquisition and actuator re-setting.

The actuator assembly is best understood by examining its operation in the context of the cartridge which is transported and the two other devices it serves: the cartridge magazine and the gripper. All three devices and a cartridge stack within the magazine are shown in the overview of FIG. 29.

The overall objective of all components, operating in concert, is to move an individual cartridge from the bottom of the cartridge stack inside the magazine into locating features in the gripper (explained above), where it is retained. Once gripped, the cartridge is moved into proximity of the microscope (discussed above) by a robot or XYZ drive (described above) where its contents can be observed and analyzed. The magazine (described above) is equipped with a cartridge stripper which receives its motive force from the magazine actuator in a manner to be described below. Motive force is imparted to the magazine actuator itself by the contact of, and external motion of, the gripper (directly, or indirectly through other mounting elements of the robot or XYZ drive) in a manner described below. The gripper is moved about by the robot (not shown) to which it is mounted, and therefore the consequent operation of the magazine actuator is passive (in the sense that no other motors need be provided).

During the normal mode of operation, the magazine is mounted directly on top of the actuator and locked in place so that the magazine does not move, even though the stripper inside the magazine moves back and forth under operation by the actuator assembly (specifically the output element thereof). FIG. 29 shows the three major components in positions relative to their normal mode of operation.

The actuator assembly itself is a mechanism which translates, reverses and ratios (or provides mechanical advantage to) linear motion. In this application, the mechanism is used to transform the linear motion of the approaching robot mounted gripper into an opposing (reversed) linear motion which passively powers the connected stripper to eject and insert a cartridge into the approaching gripper.

An important aspect of the illustrative actuator shown is to provide motion which will allow the magazine to eject cartridges directly into the gripper without need for an intermediate transfer device for the cartridge. After the gripper has acquired an ejected cartridge, it reverses direction through the robot (under control of a suitably configured or programmed controller) and conveys the cartridge to an automated microscope system for observation and/or analysis.

Figure 30:
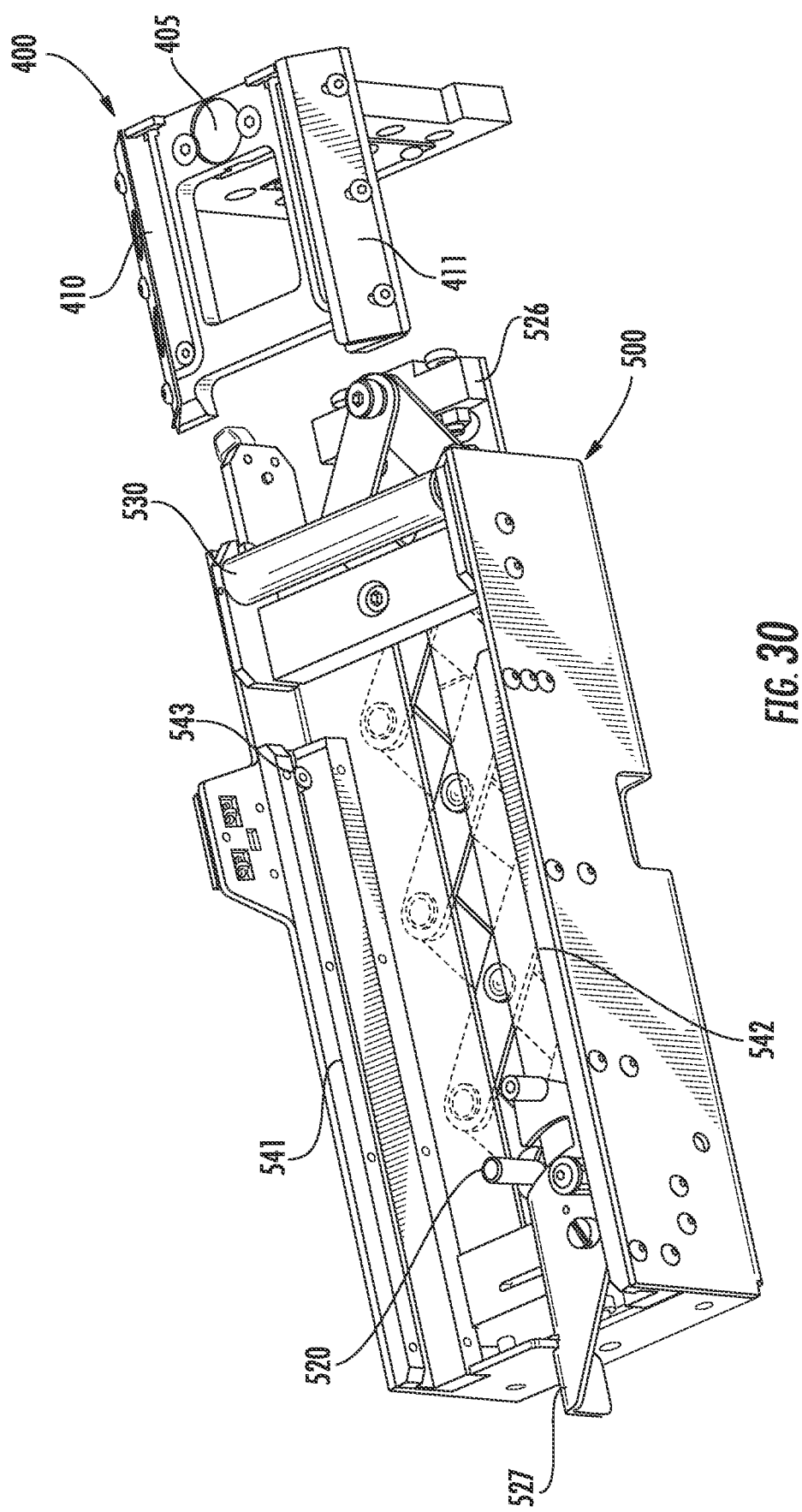
FIG. 30 is an upper view of an actuator assembly and cartridge gripper, with the scissor mechanism partially shown.
Figure 31A:
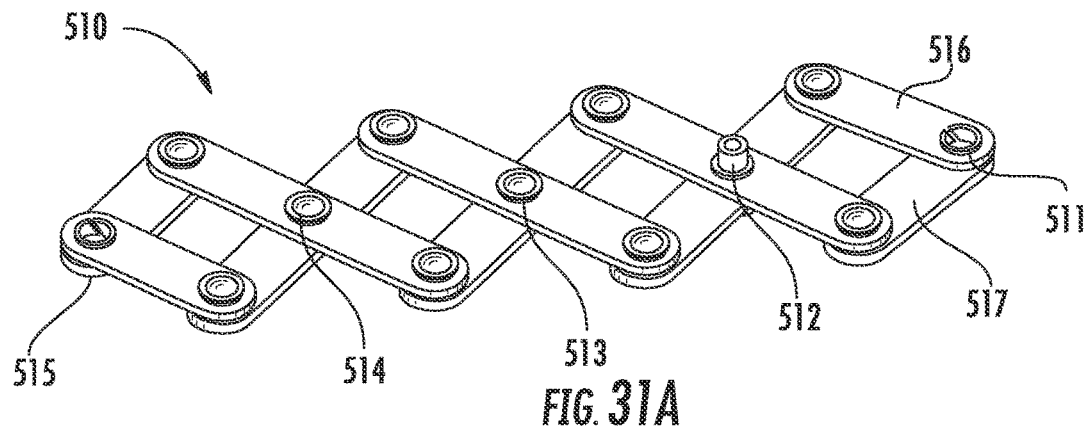
FIG. 31A is a perspective view of an actuator assembly scissor element extended.

Before considering how the cartridge is ejected and inserted into the gripper, it is useful to examine the behavior of the scissor linkage assembly (a specific embodiment of a transfer assembly), which is shown in the section view of FIG. 30 mounted inside the overall actuator assembly. For additional clarity, the isolated scissor linkage is shown below in FIGS. 31A-32A, removed from the actuator assembly.

The scissor linkage 510 operates on the basic principal of a group of 4 bar linkages arranged in series. in this embodiment, attachment to the linkage is made at 3 of its 5 center pivot joints designated pivot 1 (511), pivot 2 (512), pivot 3 (513), pivot 4 (514), and pivot 5 (515) herein, one at each end (pivot 1 & pivot 5) and one at an intermediate pivot (pivot 2). By choosing the mount, fixed, or fulcrum position of the intermediate pivot, and the number of linkages in the mechanism, it is possible to control the nominal output/input motion ratio of the device. Pivot 1 may be operably associated with an input element, and pivot 5 may be operatively associated with an actuator output element, as described further below.

The output/input motion ratio is defined as the length of travel of pivot 5/length of travel of pivot 1, assuming the pivot 2 is fixed in space.

For the embodiment illustrated, the nominal motion output/input ratio of the scissor linkage is about 3:1. For example, with pivot 2 fixed, moving pivot 1 1 inch toward pivot 2 will result in pivot 5 moving toward pivot 2 by 3 inches.

Note that 3:1 is the nominal ratio of the scissor linkage if the pivot-to-pivot distances of all links in the system are of equal length. For the application described here, it was discovered that a slightly higher motion ratio was preferred in some embodiments to accommodate the ejection distance of the cartridge and the nesting geometry of the gripper.

Several approaches were identified and examined to achieve a ratio increase. One way to change the ratio is simply to choose another fixed pivot location. For example, moving the fixed pivot from the pivot 2 position to the pivot 3 position in the above scissor linkage would change its nominal ratio to 1:1. But this method, for this scissor linkage configuration, results in a reduction of the ratio, which is the opposite of what was desired.

Another approach to additional unitary adjustments in the ratio can be achieved by adding more pairs of links and, hence, more intermediate pivot points to choose from for the fixed pivot. For example, adding a pair of links and its associated pivot (for a total of 6 pivots) and placing the intermediate pivot at the second position would result in a nominal ratio of 4:1. But in the case of one embodiment, a ratio between 3:1 and 4:1 was desired, so this technique was still not suitable. Moving the fixed pivot to the pivot 3 position on a 6 pivot assembly would give a ratio of 3:2, still not suitable for our application. Adding more links and pivot points could possibly have achieved our desired ratio, but at the considerable disadvantage of more parts, complexity, cost and assembly tolerances.

We found a third technique which was suitable for achieving the desired ratio. This was accomplished by adjusting the lengths of the pivot distances in the first two links 516, 517, referred to herein as the "ratio fine-tune links." By increasing or decreasing the length of these links, it is possible to obtain a ratio slightly above, or below, the nominal 3:1 ratio that would be produced if the pivot-to-pivot distances were all equal. In an embodiment, we elected to retain the 5 pivots of a nominal 3:1 layout, and obtain a slight increase in ratio by lengthening the pivot distances in the first two fine tune-links. This allowed us to choose a ratio between 3:1 and 4:1 that was suitable to the cartridge and the gripper geometry of one embodiment.

When links of un-even pivot length are used, as the previous technique requires, the motion ratio of the scissor linkage is no longer a constant. The ratio will vary a little throughout the range of motion of the mechanism. For the embodiment described here, the motion ratio varies between approximately 3.19:1 at full scissor linkage extension up to 3.77:1 at full scissor linkage contraction. This variation in motion ratio does not substantially adversely affect the performance of the mechanism.

Figure 32A:
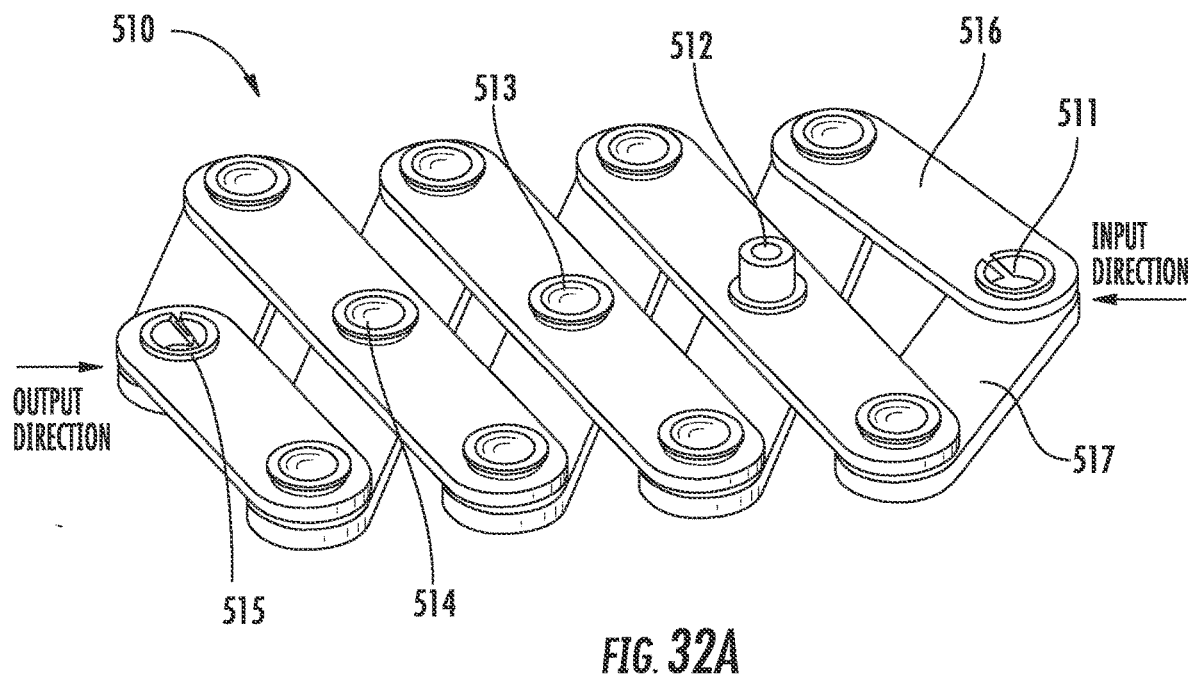
FIG. 32A is a perspective view of an actuator assembly scissor element retracted.

In addition to the scissor linkage mechanism providing a means to achieve a specified output/input ratio, note that the previously described mounting arrangement allows the scissor linkage to reverse the direction of any motion applied to its input pivot, as shown in FIG. 32A.

The output/input ratio and the reversal of motion direction are characteristics of the Scissor which are important to the function of the actuator and its interaction with the cartridge, the cartridge magazine and the cartridge gripper. This interaction will now be described.

Figure 33:
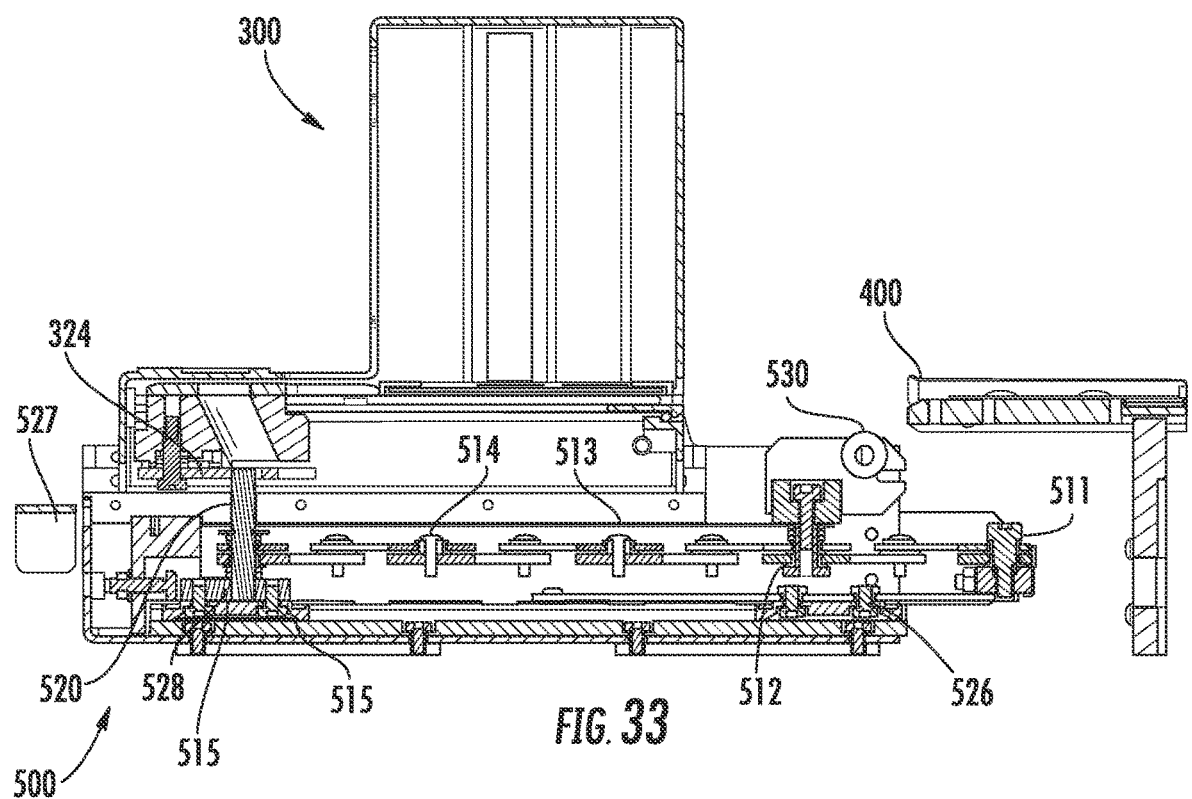
FIG. 33 is a side sectional view of an actuator assembly, cartridge magazine, and cartridge gripper, with the magazine actuator scissor element fully extended.

The section view of FIG. 33 shows the various components arranged in their respective operational positions, including the stripper latch 324, output post 520, output carriage, output pivot 5 (515), fixed pivot 2 (512), the input carriage 526, the input pivot 1 (511), a gripper support roller 530, and a fixed pivot support beam. Further, this view shows the magazine and actuator mechanisms at their home position, which is defined to be ready to eject a cartridge.

The following general relationships and interactions among the illustrated components are as follows. The actuator assembly is fixed inside the apparatus (preferably to the main frame as discussed above) and is substantially immobile. The magazine is removable from the actuator, but when in operation is latched or fixed to the actuator assembly, and does not move relative thereto. Cartridges are loaded into the magazine in a vertical stack on the right side (as depicted) of the magazine in the view of FIGS. 33 (and 34-37 hereafter). In this view, one cartridge is loaded and rests at the lowest position in the magazine, poised for ejection. To the cartridge's immediate left is a cartridge stripper, contained within the magazine, which is constrained to move horizontally. The stripper is shown in its leftmost (home) position. When it moves horizontally to the right, it pushes the bottom cartridge to the right, out the ejection slot or opening, and into the gripper, which is approaching from the opposite direction. The stripper is attached to the output post (or actuator assembly output element) by action of the stripper latch, which is described further below. In turn, the output post and associated sleeve bearings in the actuator, form the output pivot 5. Thus, when the output pivot of the scissor linkage moves right, it also moves the cartridge stripper and its adjacent cartridge in the eject direction. The scissor linkage is supported at the fixed pivot by attachment to its support beam which is attached to the frame of the assembly. The pivot ends of the scissor linkage are attached to input and output carriages which ride on a linear bearing assembly. Thus, as the scissor linkage is operated it is supported and constrained to follow a singular linear path.

Figure 34:
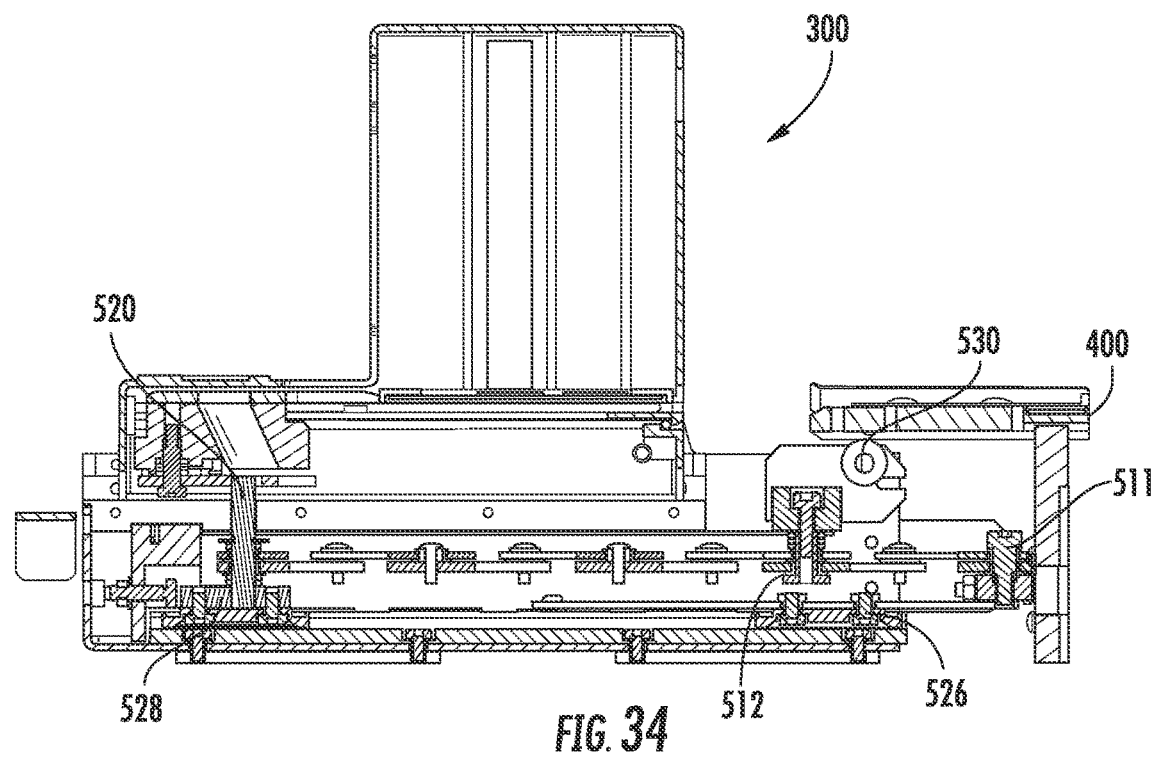
FIG. 34 is a side sectional view of an actuator assembly, cartridge magazine, and cartridge gripper, with the cartridge gripper making initial contact with the actuator input element, but with the magazine actuator scissor element still fully extended.

FIG. 33 shows the gripper moving right to left, approaching the actuator assembly, but not yet in contact. FIG. 34 shows the gripper as it just makes contact with the input carriage 526 (input element). Note that in FIG. 34 only the gripper has moved. No movement of either the scissor linkage, or the cartridge or cartridge stripper, has occurred.

Figure 35:
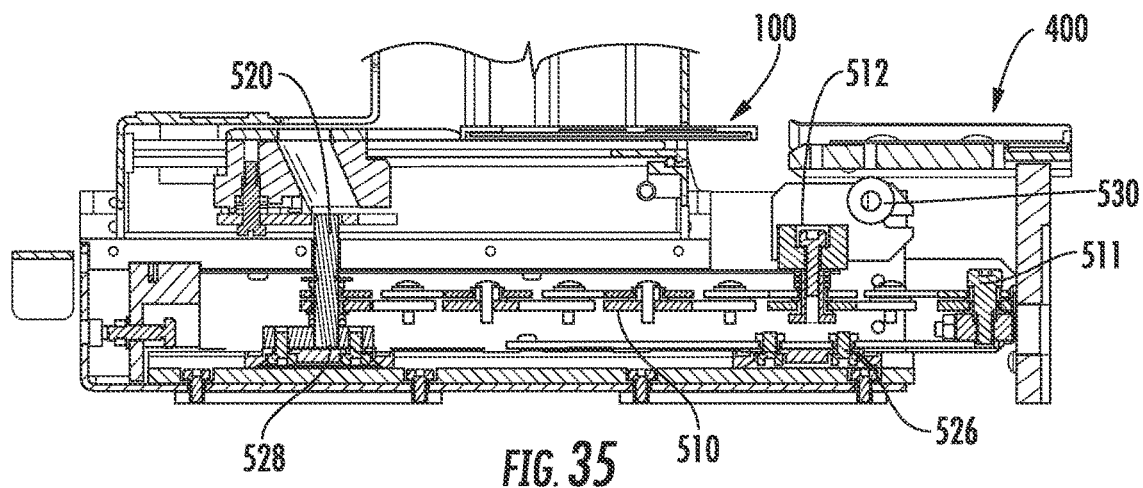
FIG. 35 is a side sectional view of an actuator assembly, cartridge magazine, and cartridge gripper, with the magazine actuator scissor element partially extended.

FIG. 35 shows the cartridge gripper after it has continued its leftward movement upon contact with the actuator assembly and actually started to push on the input carriage 526 which drives the scissor linkage. Note that the movement of the gripper is imparting its motion to the input carriage 526 and scissor linkage inside the actuator assembly. Thus the internal action of the assembly and magazine are both passively activated by the gripper (directly, or through other elements also mounted to the robot), which derives its motion and power from the robot (not shown) to which it is mounted. Note further that the reversing feature of the scissor linkage enables the cartridge to exit the magazine in the proper direction for insertion into the gripper.

Comparing the views of FIG. 34 and FIG. 35, it will be further noticed that the Gripper has moved a significantly shorter distance than the Cartridge. This difference in relative motion is directly attributable to the output/input ratio of the scissor linkage previously discussed.

The enhanced ratio or mechanical advantage serves to avoid two problems which could be encountered when ejecting the cartridge. In the first case, if the ratio were too large, a relatively small movement of the gripper could cause the cartridge to be ejected more than half its length from the magazine, before the gripper arrived to provide support for the emerging segment. In this scenario, the cartridge would go past its fulcrum and simply fall out of the magazine where the gripper could not acquire it. In the second case, if the ratio were too small, the movement of the gripper would not fully eject the cartridge from the magazine before the gripper itself came into contact with the case of the magazine and could travel no further. In this scenario, either the cartridge would remain stuck in the magazine, or if the gripper were able to remove it, the cartridge would be only partially inserted into the gripper, causing problems with its transport to the microscope system and/or difficulty in viewing and analyzing the cartridge.

The preferred ratio of output to input motion in the actuator, as provided by the linkage assembly in any particular embodiment, will depend on overall operating speeds, cartridge and gripper geometries, etc., but in general, a ratio or mechanical advantage of at least 2:1 is suitable, up to a ratio of 5:1 or 10:1 or more.

Figure 36:
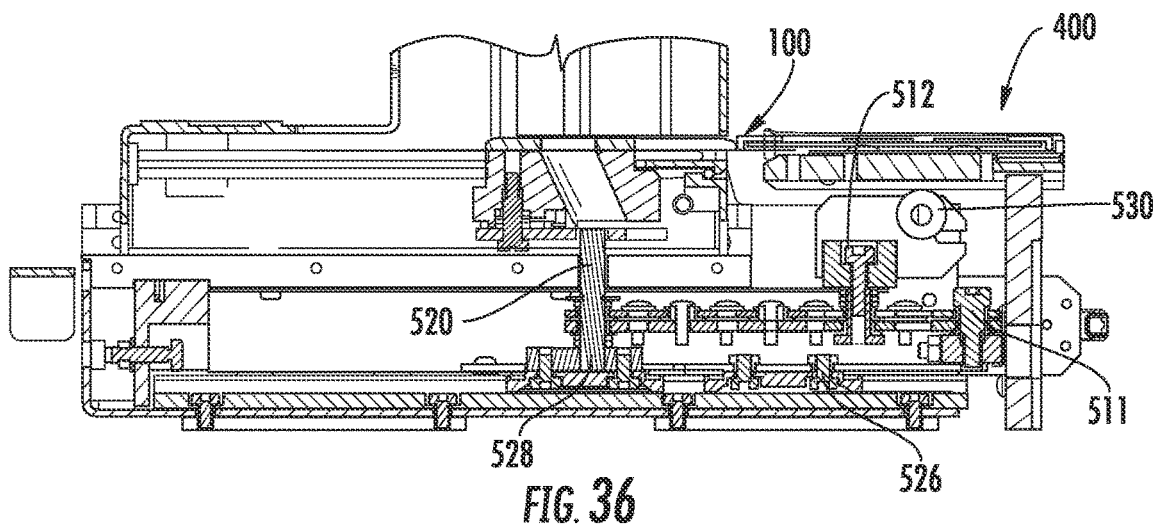
FIG. 36 is a side sectional view of an actuator assembly, cartridge magazine, and cartridge gripper, with the magazine actuator scissor element fully retracted.

A proper choice of the output/input ratio results in a process which fully ejects the cartridge into the gripper when the gripper is advanced to near-contact with the side of the magazine case. Note further that this arrangement brings the gripper close enough to support the cartridge as it exits the magazine that it never approaches its own fulcrum (tipping point) and therefore eliminates any additional mechanism which would otherwise be required to transport the cartridge across the gap between the magazine and the Gripper. FIG. 36 shows a fully ejected cartridge (100), properly captivated in the gripper (400).

Those skilled in the art will appreciate that numerous alternative mechanical structures can be utilized as the transfer assembly in the actuator between the input element and output element, and which will achieve the desired output-to-input ratio or mechanical advantage. For example, a gear set 510' or "rack-and-pinion" set (511', 512', 515') can be utilized, as schematically illustrated in FIGS. 31B, 32B. In another example, a lever or lever set (510"), with offset pivot point or fulcrum (511", 512", 515"), can be utilized, as illustrated in FIGS. 31C, 32C. In still another example (not illustrated) a pulley, pulley system, or "block and tackle" system can be utilized to achieve the desired output to input ratio. The various alternatives can be used individually or in combination with one another.

Once the cartridge has been ejected and acquired by the gripper, the gripper direction can be reversed and the cartridge transported to the microscope for analysis. (The cartridge will stay within the gripper during transport because it is retained in a friction nest, described above).

As noted, the right to left motion of the gripper drives the internal motion of the actuator, which in turn drives the eject operation of the magazine. But as the gripper leaves with its cartridge payload, the actuator and magazine must be re-set to home position in order to be ready to eject the next cartridge. In the illustrated embodiment, and as shown in greater detail in FIGS. 37-39, this re-setting is accomplished by a pair of extension springs 529 in the actuator and supplemented by a magnetic catch between the gripper and the input carriage 526. The mechanism operation is described below.

Figure 37:
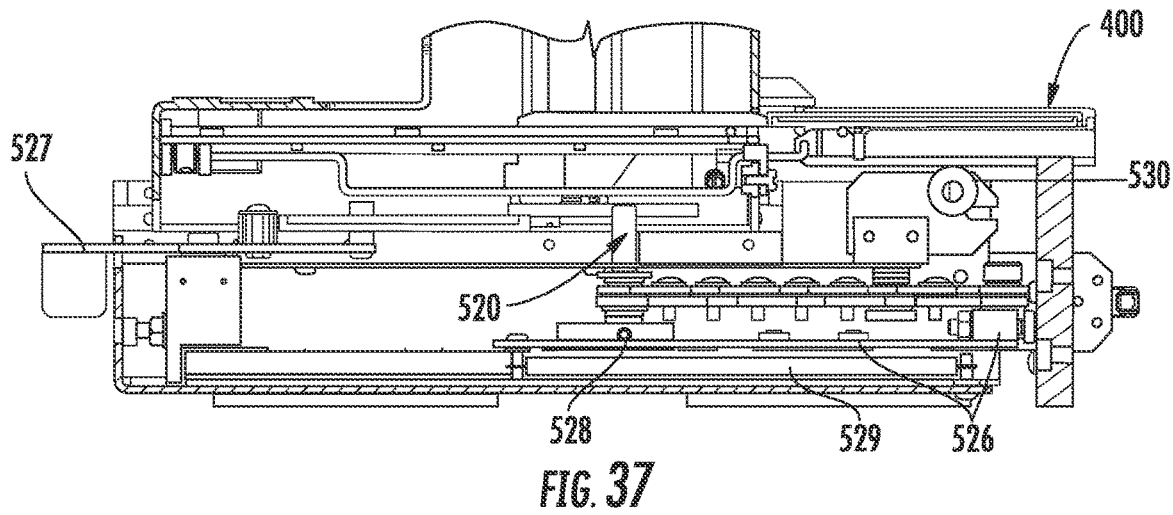
FIG. 37 is a side sectional view of an actuator assembly, cartridge magazine, and cartridge gripper, with the magazine actuator scissor element fully retracted like that of FIG. 36, with the section depth slightly different.

Referring to FIG. 37, note that the extension spring 529 is mounted to the indexer frame and the leftmost end of the input carriage assembly (there are actually two such extension springs, symmetrically located about the central plane of the actuator, mounted in the same fashion). This view shows the input carriage 526 moved to its left at the maximum position to eject a cartridge. Thus, the spring has been stretched to its maximum tension. When the gripper retreats (or is re-positioned by the controller) to the right with its cartridge, the extension springs will retract, pulling the input carriage 526 to the right as well. This motion will tend to reset both the indexer and (via the linkage assembly the magazine), and the stripper to their home positions in preparation for ejecting the next cartridge.

Note that if sufficiently strong springs are chosen, it can reasonably be expected that their force can fully reset the entire mechanism to its home position. However, the force required to reset all mechanisms is not trivial and in some embodiments may vary significantly with the number of cartridges present in the Magazine. A full magazine may require more force to reset the ejection components than a nearly empty magazine, due to the increased friction of operation created by the weight of a full load of cartridges. Thus, the springs must be chosen to overcome all mechanism friction associated with a full magazine.

Note further that, even though stronger springs could be used to fully reset all mechanisms, they would add to the force of operation required from the gripper motion. As the gripper moves to the left and moves all mechanisms through the ejection cycle, the springs are stretched. Thus, the gripper movement must generate enough force to move all components and stretch the springs fully. All of this force is directly reflected back to the robot mechanism which is moving the gripper.

Unfortunately, the force capacity and cost of any robotic device are directly related, with the cost increasing as the force requirement is increased. Thus, if the spring force could be reduced, without affecting the resetting capability of all mechanisms, it would be possible to reduce the capacity and cost of the robot.

Note that the gripper movement described thus far imparts a pushing force on the actuator input element or carriage only when the gripper is traveling to the left and forcing all mechanisms through an ejection cycle as previously described. Once the cartridge is acquired in the gripper, and the gripper is withdrawn to the right, the springs immediately start applying the restoring force to all mechanisms and the gripper no longer applies an activating force in the reset (right) direction. If the gripper could also impart a pulling force on the actuator input element or carriage to the right, it could exert a resetting force on the actuator mechanism that would directly reduce the resetting force required of the extension springs, and consequently reduce the force capacity and cost of the robot.

Figure 38:
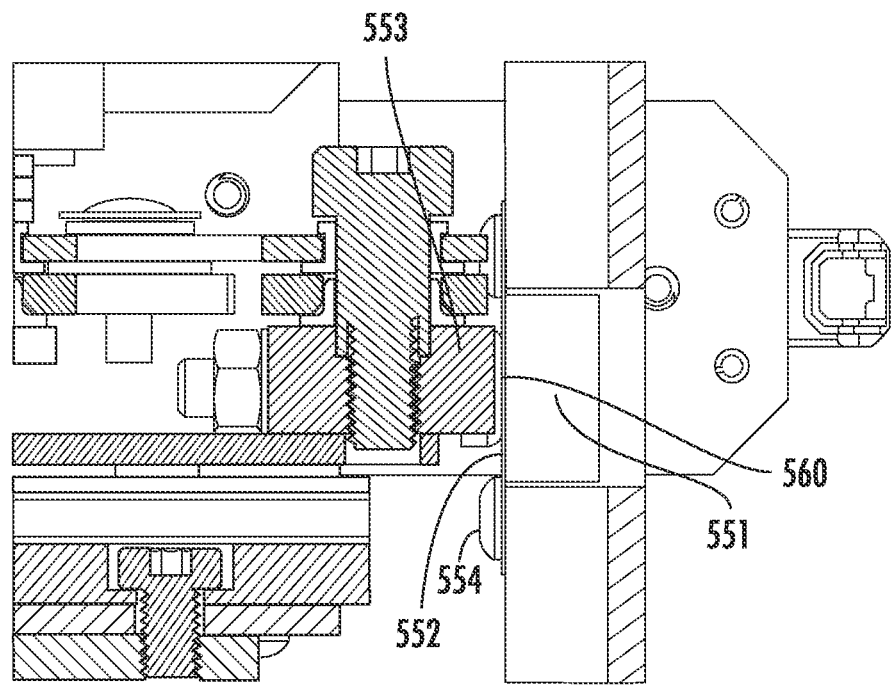
FIG. 38 is a partial side cutaway view of an actuator assembly.

Referring to FIG. 38, a solution is to provide a magnetic catch which couples the gripper (here, through the lower gripper member) with the actuator input element (here, the input carriage block component). In the specific embodiment shown, a magnet 551 is attached to the lower gripper member by magnetic adherence to a magnet cover 552 which is affixed to the lower gripper member by screws 554. This arrangement presents a magnetic field in the immediate vicinity of the input carriage block 553 which is fabricated from magnetic material, such as mild steel. When these components are brought into close proximity a sufficiently strong magnetic attraction is created, thereby effectively coupling the gripper to the input carriage 526 of the actuator.

Thus, if the gripper moves to the right as it conveys the cartridge away from the magazine, it exerts a leftward pulling force on the input carriage 526, which aids in resetting the actuator (and attached magazine stripper) and reduces the resetting force contribution required of the extension springs. This arrangement effectively trades a strong ejection force requirement from the robot (and zero resetting force) for a moderate ejection force and a moderate resetting force in the robot. The net effect is an appreciable reduction in the maximum force required from the robot, lowering the expense of (and/or wear on) the robot.

As the gripper continues to move further right when it withdraws and conveys the cartridge for analysis, at some point the linkage reaches the end of its travel and further movement right of the input carriage itself is halted. The gripper continues rightward movement and the magnetic connection with the input carriage is simply broken. Thus, with relatively simple modifications to the gripper and input carriage, a catch is created which acts passively, contains no moving parts, and permits a reduction in spring force and associated robot cost, and/or wear on the robot.

Those skilled in the art will appreciate numerous alternate configurations of the magnetic catch. For example, the location of the magnet can be changed from the gripper side to the input element side. A pair of magnets could be utilized. Instead of a permanent magnet, an electromagnet can be used.

One final refinement of the magnetic catch of the illustrated embodiment is also of note; the magnetic force generated by the magnetic catch is adjustable when the mechanism is assembled. Referring to FIG. 38, it can be seen there is actually a small air gap between the magnet cover and the input carriage block, which are the magnetic elements of the catch. Actual contact with the magnet cover occurs only on the face of the magnet gap adjuster 560, a plastic faced (non-magnetic) component. This adjuster is screwed into the input carriage block and its position can be varied (and locked) to change the width of the magnet gap. Since the force a magnet can exert varies with (at least) the inverse cube of the distance to its target, a relatively small adjustment of the magnet gap can achieve a wide range of coupling force between the gripper body and the input carriage. This capability for adjustment of the coupling force has the following advantages: a. the ability to use an off-the-shelf commercial magnet and avoid the design of a unique magnet with a force specified for this application, b. the ability to easily balance the force of the extension spring (also an off-the-shelf, rather than custom, component) with the magnet force, and finally, c. the ability to make an appropriate adjustment at assembly to compensate for the natural tolerances of the components involved, including the expected variation in spring constants and field strength of the magnet.

Figure 39:
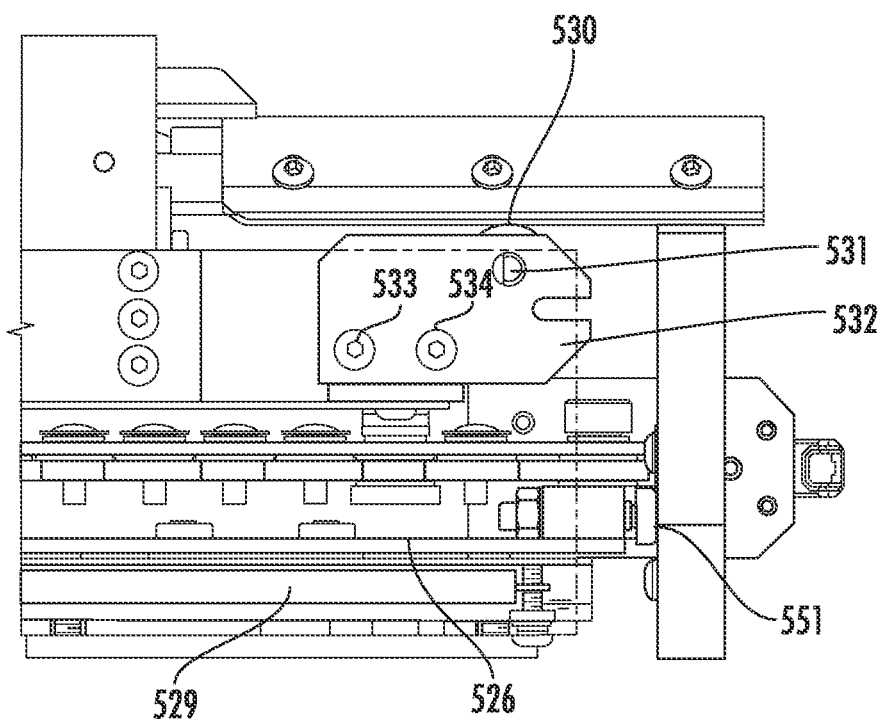
FIG. 39 is a partial side sectional view of an actuator assembly and cartridge gripper.

As shown in FIG. 39, a final functional capability of the magazine actuator is its ability to provide vertical location stability of the gripper as the Gripper approaches the actuator and through the entire leftward motion of the gripper as it acquires the ejected cartridge.

As previously noted, the gripper is mounted on and moved by a robot device (not shown), which, as also noted above, is suspended on vibration isolators or dampers. Hence, it is NOT rigidly mounted with respect to the actuator described herein. The gripper, however, is rigidly mounted to the robot.

As previously noted, the activation of the described devices depends on the motion and force from this robot, acting directly or indirectly through the gripper. Those skilled in the art will appreciate that any force the gripper imposes on the actuator will simultaneously be reflected back in the opposite direction through the gripper and into the robot. Thus, if the gripper pushes left against the actuator during cartridge ejection, the actuator will simultaneously push right against the gripper, and hence, the robot. Since the robot is not rigidly mounted, it will tend to move under this reflected force, carrying the gripper with it, and potentially misaligning the gripper with respect to the magazine and the emerging cartridge. Any such misalignment between the gripper and the cartridge could result in the cartridge not being properly acquired by the gripper. Thus, it will be advantageous to provide for some method of limiting (non-linear) deflection of the gripper as it advances on the actuator.

Accordingly, the actuator is equipped with a passively acting gripper support, specifically a support roller 530. This roller is rigidly mounted to the actuator frame and provides rolling surface contact with the underside of the gripper as it advances, thus preventing downward motion of the gripper as it approaches the magazine and the ejecting cartridge.

Fine vertical height adjustment for the support roller, during initial assembly, is provided by captivating the roller axle 531 in holes between two roller adjustment plates 532, each of which are mounted to the sides of the actuator frame. Each of these plates is provided with screws 533, 534 located in a round pivot hole and in an adjustment slot in the plate. Rotating these plates and tightening the screws permits setting the vertical position of the roller to an elevation that will align the cartridge nest in the gripper to the exit position of the cartridge as it emerges from the magazine.

Those skilled in the art will appreciate that numerous alternate configurations of the gripper support can be envisioned. For example, slides or glides could be used in place of, or in addition to, a roller. In addition, the roller can be relocated to the gripper itself, and tracks or roller guides connected to the actuator. Numerous additional variations can be readily envisioned that will function to reduce or inhibit deflection of the gripper's position as it contacts the actuator input element.

D. Cartridge Ejection Components.

Figure 40:
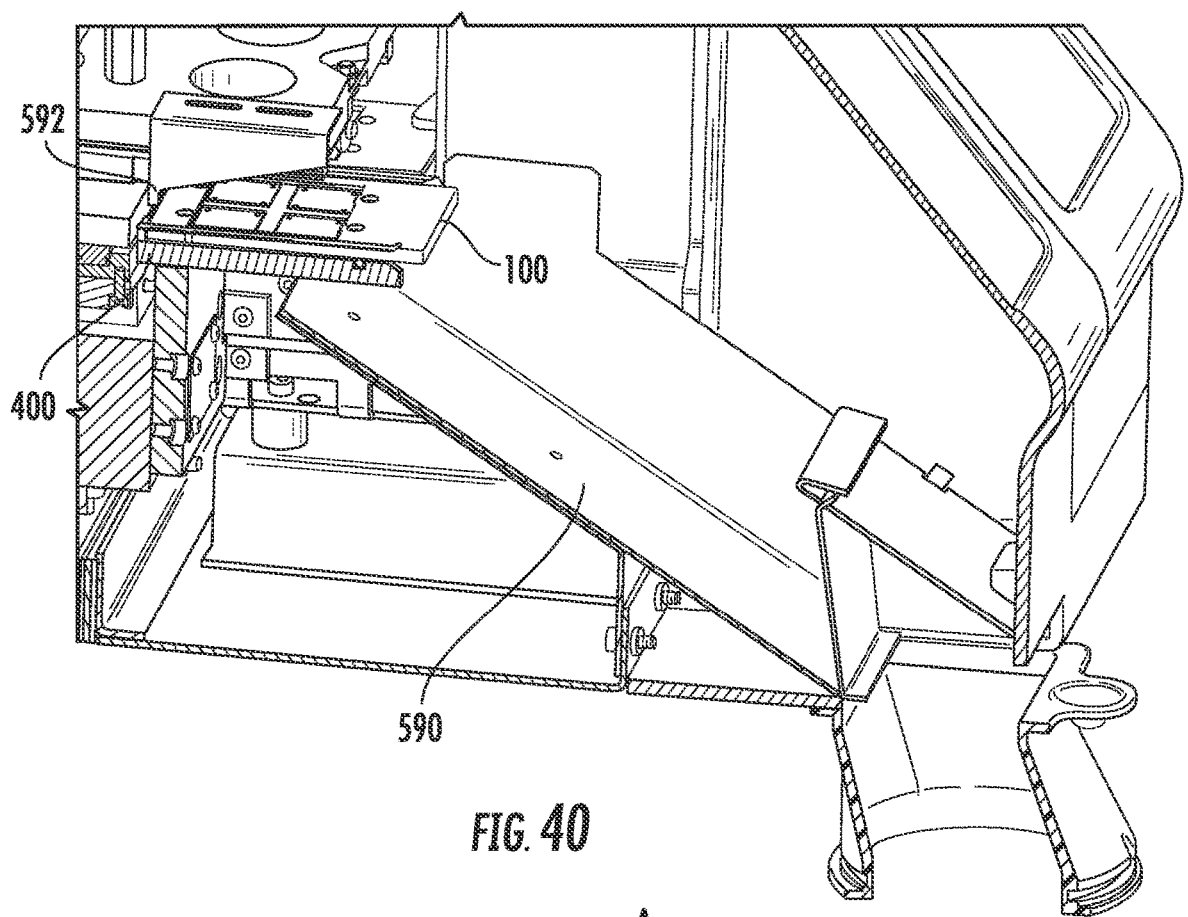
FIG. 40 is a partial perspective cutaway view of an apparatus, showing the exit ramp.
Figure 41:
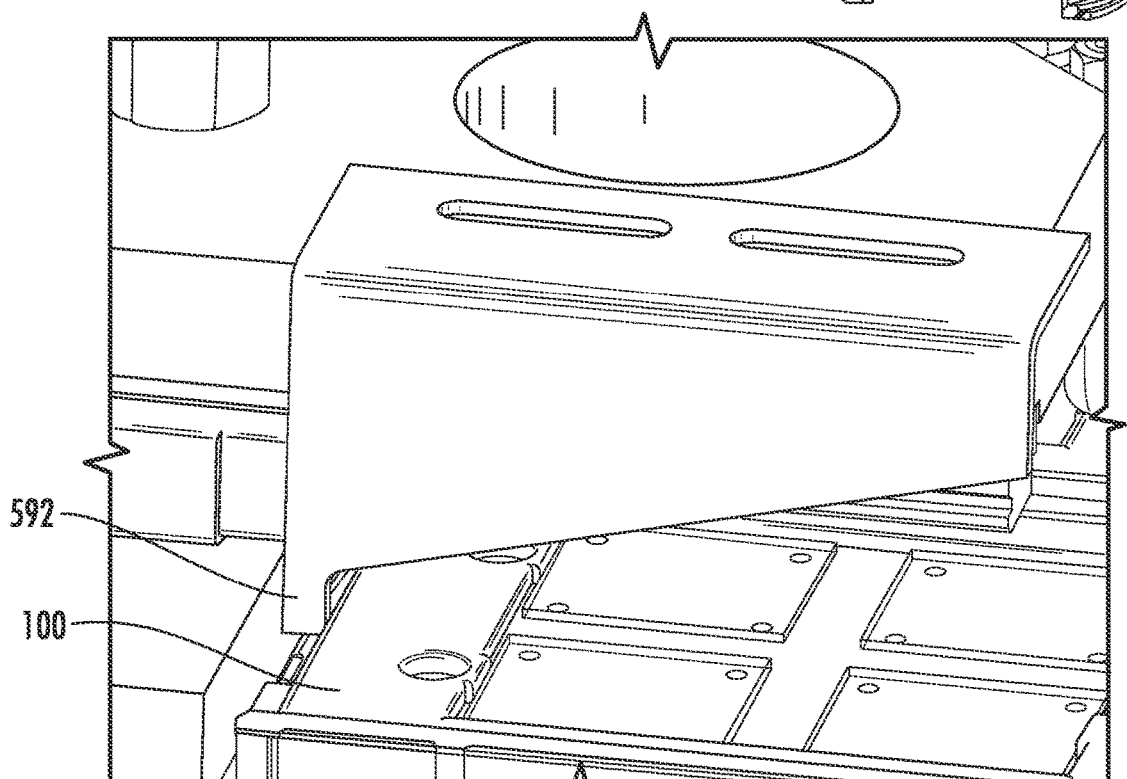
FIG. 41 is a partial perspective view of an apparatus showing the kicker tab.
Figure 42:
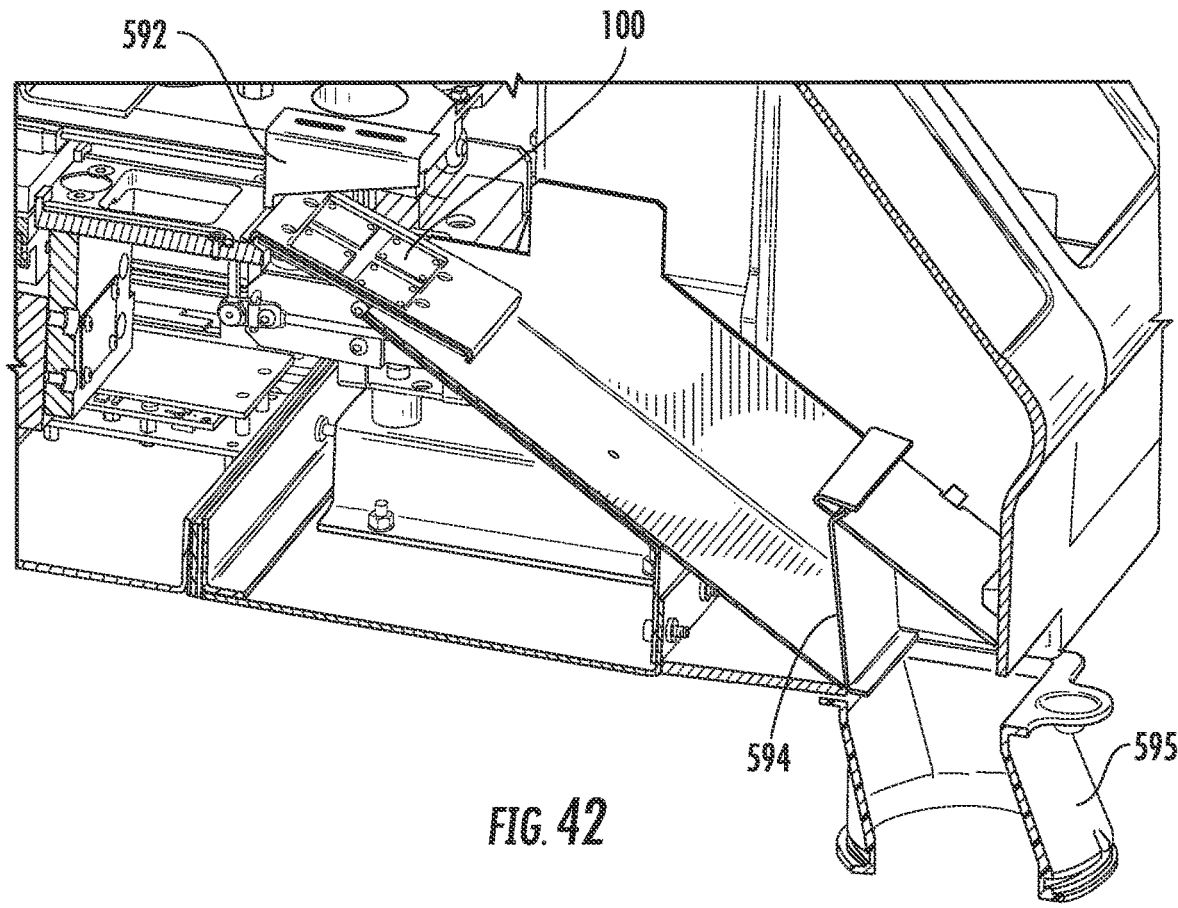
FIG. 42 is a partial side section view of an apparatus, showing the cartridge beginning travel down the exit ramp after ejection from the cartridge gripper by the kicker tab.
Figure 43:
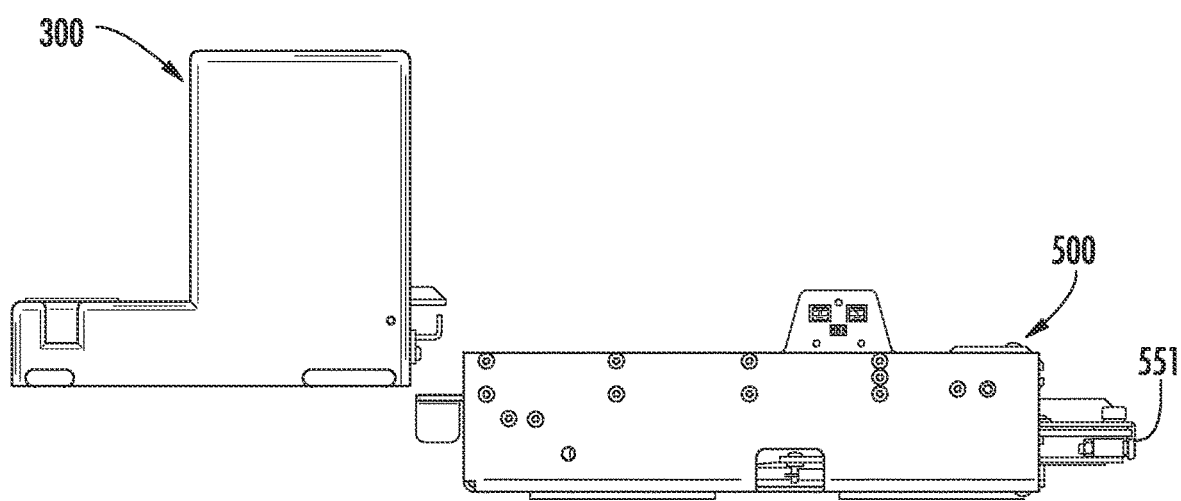
FIG. 43 is a side view of a cartridge magazine and magazine actuator, prior to engagement.
Figure 44:
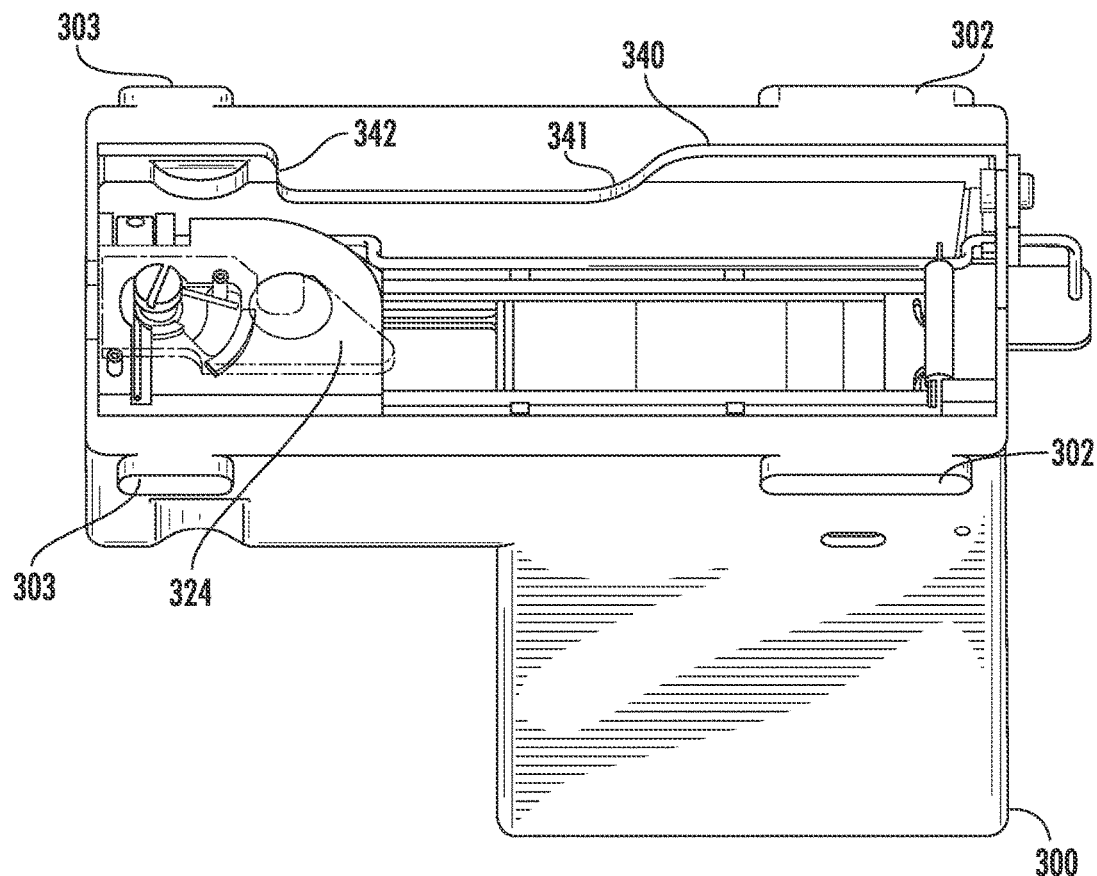
FIG. 44 is a bottom perspective view of a cartridge magazine.
Figure 45:
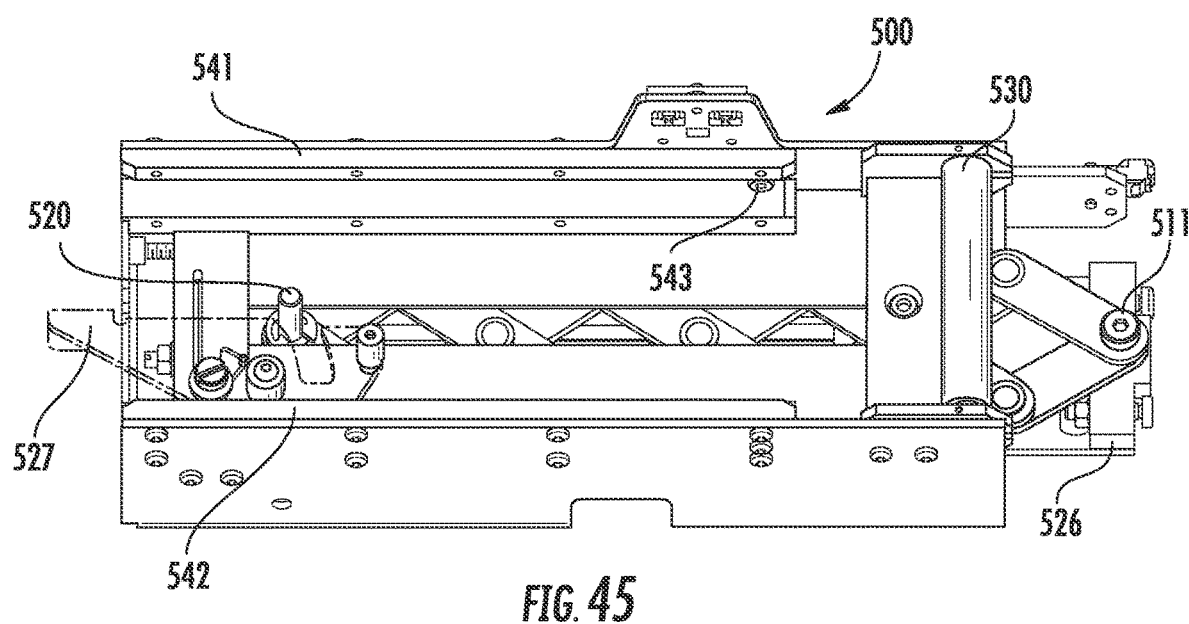
FIG. 45 is a top perspective view of a magazine actuator, for engaging the cartridge magazine elements shown in FIG. 44.

FIGS. 40-42 illustrate an embodiment of cartridge ejection components, including a chute system comprising a chute 590 and a kicker or kicker tab 592, for use in embodiments of the present invention.

The view of FIG. 40 shows the various components of the chute system. The gripper is also shown with a cartridge fully inserted, in the position of the cartridge where it would be just after the automated microscope has completed the examination portion of its processing. Additionally, the gripper is shown in the position where the robot would move it just prior to beginning the cartridge ejection process.

Of particular importance is the relative position of the kicker with respect the rear face or leading edge of the cartridge, as shown in FIG. 41. In the illustrated embodiment, the Robot has moved the gripper so that the kicker (connected to the subframe in the illustrated embodiment) is positioned just behind the rear face of the cartridge.

The kicker or kicker tab is rigidly fixed to the subframe. The cartridge is held by friction in the gripper. The robot is capable of moving the gripper in X, Y and Z coordinate directions. In some embodiments including the illustrated embodiment, all three movements may be required to position the cartridge with respect to the kicker tab 592 as shown above. To eject the cartridge from the gripper, the robot moves the gripper in the indicated rearward Y direction only. The cartridge would ordinarily travel rearward with the gripper, but its movement will be blocked by the kicker tab. As the gripper continues its indicated rearward movement, the kicker will strip or eject the cartridge from the gripper.

FIG. 42 shows the cartridge just as it emerges from the gripper, with the kicker tab 592 behind the rear face of the cartridge, preventing it from moving back with the gripper. Notice that as the cartridge is pushed from the gripper it rotates down toward the chute ramp. Note further that the flapper door is closed. This door is hinged and captivated by the door cover. Its center of mass is slightly offset from the hinge axis so that its rest position is closed lightly against the sides and bottom of the chute. This door serves to prevent insects from gaining entry to the machine when used in an outdoor, farm or barn environment, which, due to the biological content contained within the cartridges, may serve as an attraction.

As the cartridge falls from the gripper, it is caught on the chute ramp where it moves down under force of gravity toward the flapper door 594. As the cartridge passes through the door region of the chute, the momentum of the cartridge has kicked the door open momentarily and the cartridge travels towards, and then through, the chute funnel 595. At this point, the cartridge can be captured in a number of ways. For example, it can simply be allowed to fall into a trash can placed under the nose of the apparatus, or it can be captured in a bag or basket attached to the nose of the apparatus.

E. Latching Components for Removably Connecting Cartridge Magazine to Magazine Actuator.

FIGS. 43-51 illustrate the operative yet removable attachment of the cartridge magazine 300 to the magazine actuator assembly 500 by latching features incorporated into both.

The latching features accomplish two primary functions. First, they provide a means of locking the external case of the magazine to the magazine actuator assembly so that they will not separate while being operated. Second, they provide a means of locking the output post or element in the actuator to the cartridge stripper in the magazine. This permits the actuator to operate the stripper to eject cartridges in an automated fashion from the magazine.

The latch features or elements also provide a simple interface to the operator. Installation of the magazine into the actuator assembly requires only that an operator insert the magazine (pre-loaded with one or more cartridges, or into which cartridges will be inserted after magazine insertion) into notched support rails 541, 542 on the actuator assembly which engage magazine bosses, and push the magazine to stops 543 inside the actuator assembly. The latch itself, under load from a spring or other tensioning element, will then engage automatically. Removal of the magazine requires only that the actuator assembly catch 527 is depressed and the magazine pulled free of the rails. The insertion motion and relative positions of the magazine and magazine actuator assembly are shown as follows.

Figure 46:
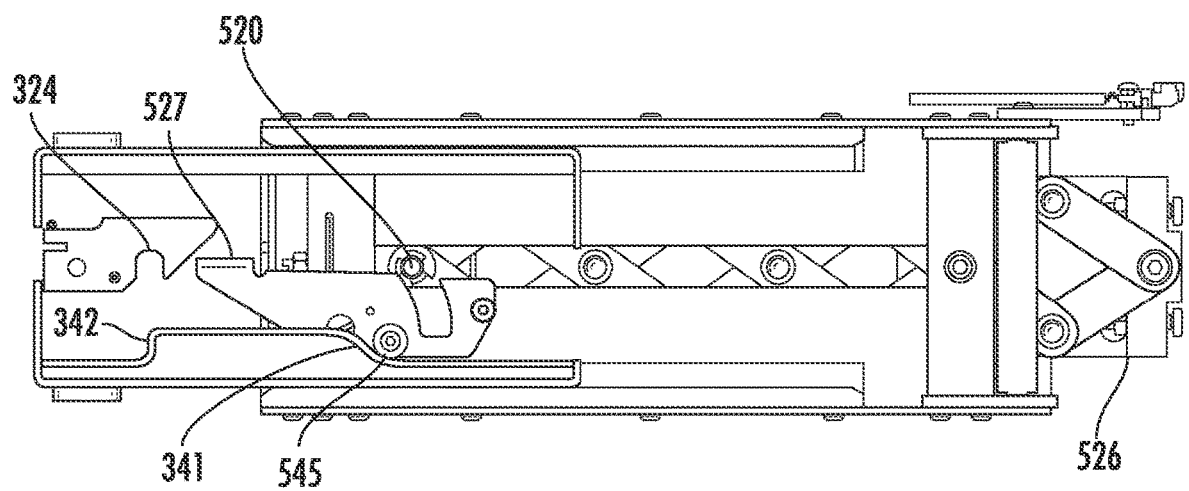
FIG. 46 is a top cutaway view of a cartridge magazine of FIGS. 43 and 45, beginning engagement with a magazine actuator of FIGS. 43 and 44.

As the magazine is inserted into the support rails the cam profile portion 340 on the magazine begins to engage the cam follower on the actuator (See FIG. 46).

Figure 47:
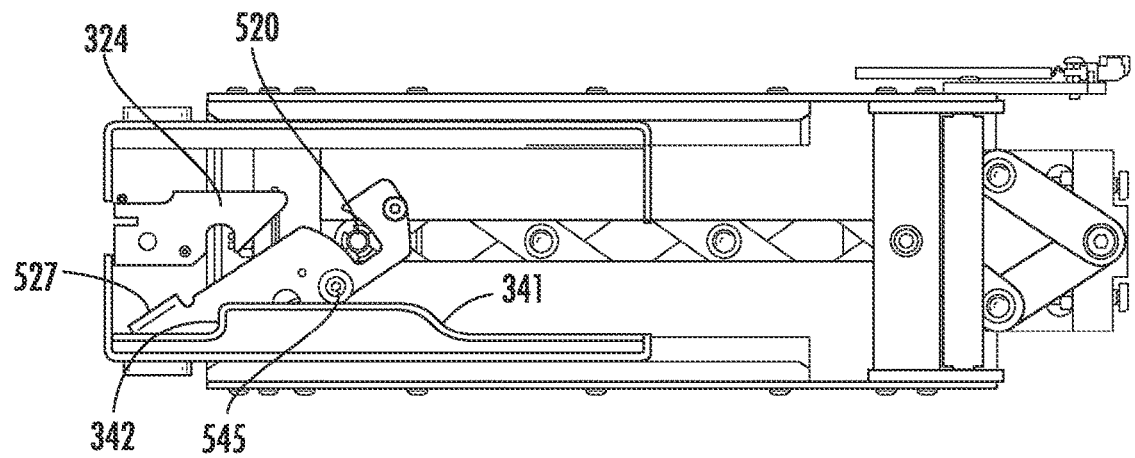
FIG. 47 is a top cutaway view of a cartridge magazine, partially engaged with a magazine actuator.

As the magazine is inserted further, the cam follower 545 rides up on the ramp segment 341 of the cam profile portion and causes the catch 527 to swing over the output post, captivating the post in the catch notch (see FIG. 47).

Figure 48:
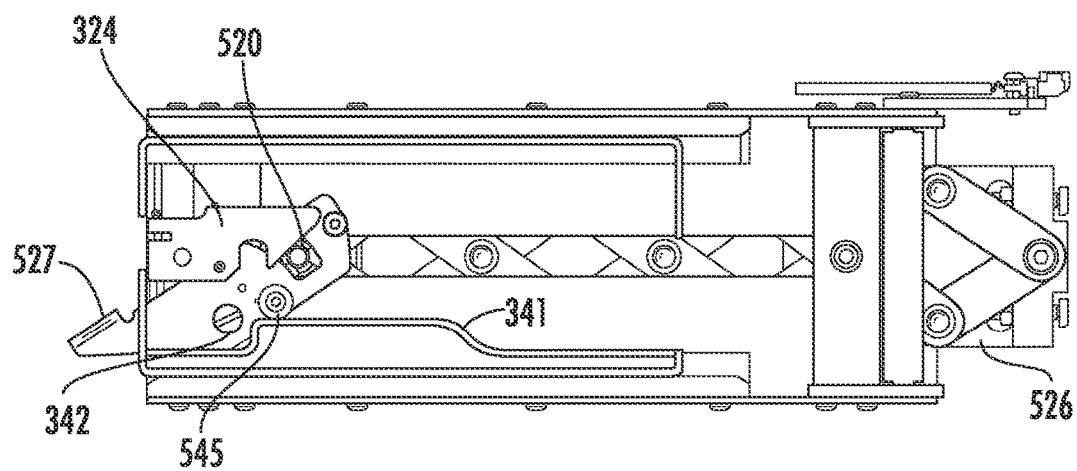
FIG. 48 is a top cutaway view of a cartridge magazine and magazine actuator, further engaged with one another.
Figure 49:
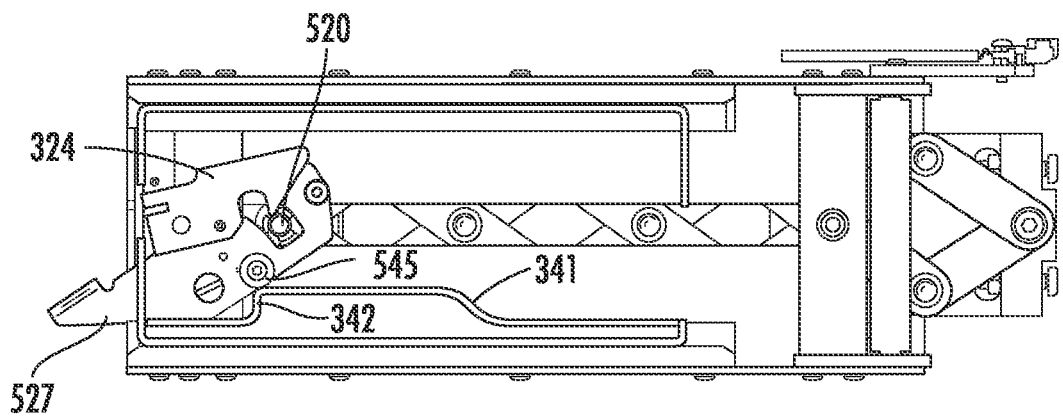
FIG. 49 is a top cutaway view of a cartridge magazine and magazine actuator, still further engaged with one another.

The magazine continues to be inserted as shown in FIG. 48 until the angled profile on the magazine catch begins to contact the output post.

As the magazine is pushed further to the right (see FIG. 49), the magazine catch deflects around the output post. The output post cannot move while the magazine catch is bearing on it because it is still captivated by the catch notch below.

Note that at this point the cam follower is nearing the point where it will abruptly change direction due to the fall-off segment 342 of the cam profile portion, and cause the catch to disengage from the output post.

Figure 50:
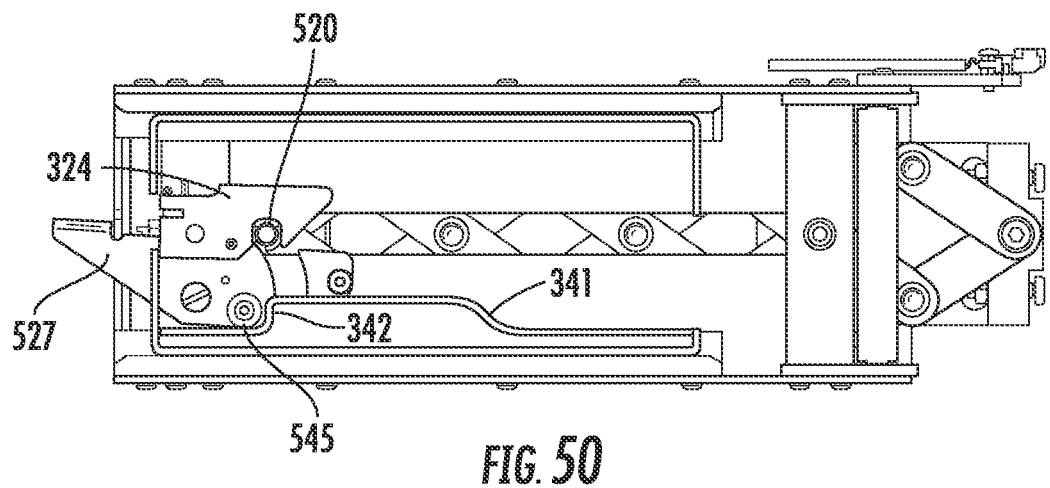
FIG. 50 is a top cutaway view of a cartridge magazine and magazine actuator, fully engaged with one another.

In FIG. 50 the magazine has been fully inserted into the actuator assembly rails. The cam follower has dropped down, allowing the catch notch to disengage from the output post. And the magazine catch notch is now fully engaged with the output post. This arrangement permits the output post or element in the actuator assembly to move the cartridge stripper Assembly, via its connection through the magazine catch, to the right and thereby operate the magazine as explained above.

Note further that the magazine is prevented from leftward movement by the contact between the cam profile portion and the cam follower. Further rightward movement is also prevented by a pair of stops mounted in the magazine rails which contact the forward location bosses on the magazine. (In this view the rails are semi-transparent to reveal stops inside of rail groove). Thus, the magazine is captivated while the actuator assembly is in operation.

Figure 51:
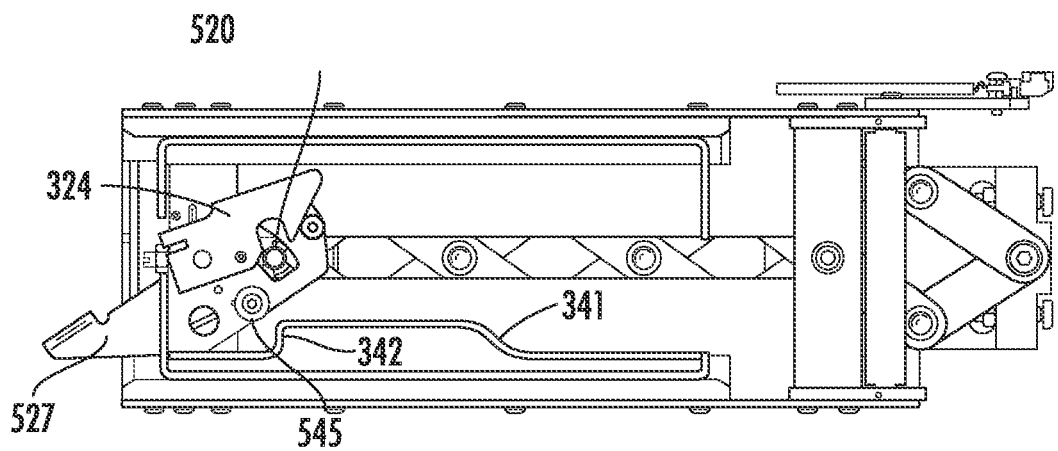
FIG. 51 is a top cutaway view of a cartridge magazine and magazine actuator, fully engaged with one another, and with the cartridge latch now lifted by a release lever.
Figure 52:
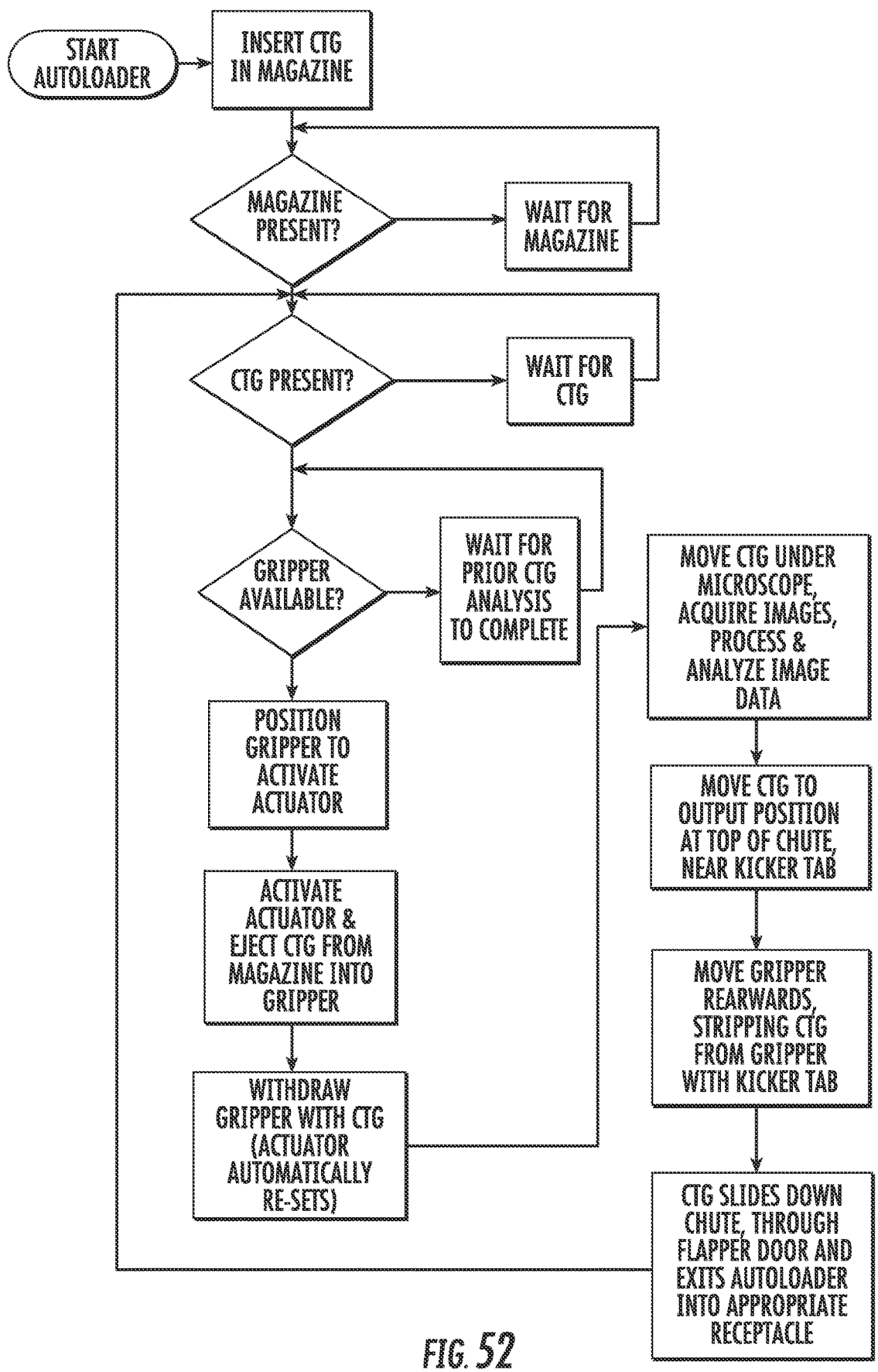
FIG. 52 is a flow chart illustrating one non-limiting example of a mode of operation of an apparatus as described herein.

Finally, removing the magazine requires the operator to manually exercise the Indexer Catch by pushing down on the catch as shown in FIG. 51. After pushing the magazine Catch lever, the magazine can simply be slid free of the rails.

Note that all the actions of the latching elements are again passive and require no active devices such as solenoids or motors.

Although the latching elements in the illustrated embodiment serve to join the magazine and actuator assembly together as a functional unit, it will be recognized by those skilled in the art that it could be used in a similar fashion to join other devices which differ substantially from those covered here. In general, where a mechanism A must be inserted and locked into a mechanism B, and where an actuator B in mechanism B must be automatically coupled to an actuator A in mechanism A, the general form of these elements could also be used.

F. Operation of Apparatus.

A non-limiting example of a manner of operating the apparatus described herein is schematically illustrated in FIG. 52. As illustrated, the controller is initialized and started at a start autoloader step and one or more cartridges is inserted into the cartridge magazine. The apparatus then senses whether a magazine is present and, if not, waits until a magazine is inserted. Once a magazine is present, the apparatus then senses whether a cartridge is present. If a cartridge is present, the apparatus then senses whether a gripper is available to receive a cartridge. If so, the gripper is then positioned to activate the actuator as described above and a cartridge ejected from the magazine and into the gripper. The gripper then withdraws (allowing the actuator and magazine to automatically re-set or return to a "home" position as described above, and the gripper, with cartridge, moved under the automated microscope to acquire images (and at that time or at a later time, process and analyze image data). Once image data from one or more chambers in the cartridge is acquired, the cartridge and gripper are then re-positioned via the robot so that the cartridge is ejected from the kicker tab and exits the autoloader. The process can then be repeated sequentially as many times as necessary to acquire data from all of the plurality of cartridges loaded into the magazine.

Other features and operation of the apparatus may be as described in commonly owned, copending International Application Nos. PCT/US2013/049112 and PCT/US2013/049247, the disclosures of which are incorporated herein by reference in their entirety.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

We claim:

1. A microscope assembly for use in an automated microscope apparatus, comprising:
    a support frame;
    a cartridge magazine actuator assembly connected to said support frame;
    a subframe;
    a plurality of vibration isolators connecting said support frame to said subframe;
    an XYZ drive connected to said subframe; and
    an optical stage connected to said subframe, wherein said cartridge magazine actuator assembly comprises:
    an input element,
    a output element, and
    a transfer assembly interconnecting said input element and said output element, wherein said transfer assembly further comprises a scissor assembly comprising said input element and said output element on opposite ends thereof, such that when said input element moves in a first direction, said scissor assembly moves said output element in a second direction opposite the first direction to thereby move said output element in the second direction and said output element contacts a cartridge in a cartridge magazine and moves the cartridge out of the cartridge magazine.

2. The microscope assembly of claim 1, further comprising a cartridge gripper connected to said XYZ drive.

3. The microscope assembly of claim 1, wherein when said input element moves a distance in the first direction, said transfer assembly is configured to move said output element at least twice the distance that said input element moves in the first direction.

4. The microscope assembly of claim 1, further comprising a cartridge magazine operatively associated with said actuator assembly.

5. The microscope assembly of claim 4, further comprising a magnetic catch operatively associating said actuator assembly input element and said cartridge gripper and configured to impart at least a partial pulling force from said gripper to said input element to aid in resetting said actuator assembly and magazine to a home position.

6. The microscope assembly of claim 1, further comprising a gripper support connected to said actuator assembly and configured to reduce deflection of said gripper upon said cartridge gripper contacting said input element.

7. The microscope assembly of claim 1, further comprising a cartridge kicker rigidly connected to either said support frame or said subframe, the cartridge kicker comprising a tab configured to contact a cartridge in the gripper when the gripper moves in a predetermined direction and to prevent the cartridge from moving with said gripper in the predetermined direction thereby ejecting the cartridge from said gripper.

8. The microscope assembly of claim 1, wherein said actuator assembly further comprises a tensioning element operatively associated with said transfer assembly and configured to aid in returning said transfer assembly to a home position.

9. The microscope assembly of claim 7, further comprising a chute operatively associated with said cartridge kicker and positioned for receiving a cartridge ejected by said kicker from said gripper.

10. An automated microscope system, comprising:
an XYZ drive;
a cartridge gripper connected to said XYZ drive;
said gripper configured to secure a sample cartridge; said sample cartridge comprising at least one chamber,
an imaging system operatively associated with said cartridge gripper and configured to image a sample in each of said at least one chamber;
a cartridge magazine configured to contain a plurality of said cartridges, said cartridge magazine comprising:
an upper magazine body portion having a cartridge insertion opening and a cartridge ejection opening formed therein, said upper magazine body configured to receive a plurality of cartridges therein;
a raised polarizing rib in said upper magazine body portion; said polarizing rib configured to engage a cartridge notch formed in a cartridge inserted through said insertion opening and into said upper magazine body portion; with said polarizing rib having an escape notch formed therein, and with said escape notch aligned with said cartridge ejection opening; a lower magazine body portion;
a magazine actuator assembly operatively associated with said cartridge magazine, said actuator assembly configured with said magazine to load a cartridge from said magazine to said cartridge gripper; and
a controller operatively associated with said XYZ drive and configured to activate said cartridge magazine actuator assembly by motion of said XYZ drive
a cartridge magazine actuator assembly operatively associated with said cartridge magazine, said cartridge magazine actuator assembly comprising:
an input element
an output element, and a transfer assembly interconnecting said input element and said output element;
wherein said transfer assembly further comprises a scissor assembly comprising said input element and said output element on opposite ends thereof, such that when said input element moves in the first direction, said scissor assembly moves said output element in the second direction opposite the first direction to thereby move said output
element in the second direction and said output element contacts a cartridge in a cartridge magazine and moves the cartridge out of the cartridge magazine.

11. The system of claim 10, wherein said cartridge magazine is configured so that a newly prepared cartridge is insertible into said magazine while a cartridge is concurrently being loaded from said magazine to said cartridge gripper.

12. The system of claim 10, further comprising a humidification element in said upper magazine body portion.

13. The system of claim 10, wherein:
said cartridge magazine is removably engaged to said cartridge magazine actuator; and
said cartridge magazine further comprises a latch element operatively associated with said cartridge stripper, said latch element configured to releasably engage said magazine actuator.

14. The system of claim 10, said cartridge stripper slidably translatable between a retracted position and a forward position,
said cartridge magazine further comprising a gate element operably associated with said cartridge stripper, said gate element configured to block ejection of a cartridge from said ejection opening when said cartridge stripper is in said retracted position and permit ejection of a cartridge from said ejection opening when said cartridge stripper is in said forward position.

15. The system of claim 10, said cartridge gripper configured to receive a sample cartridge having a leading end portion and a pair of generally parallel opposing side edge portions; said cartridge gripper comprising:
a base member having a planar stage surface portion, said surface portion including a forward surface portion and a rear surface portion; and
an optical alignment detection element on said stage rear portion, said detection element configured to at least partially underly said leading end portion of a cartridge inserted therein.

16. The system of claim 15, wherein said alignment detection element comprises (a) a fluorescent element positioned on a non-fluorescent rear surface portion, or (b) a non-fluorescent element positioned on a fluorescent rear surface portion.

17. The system of claim 15, said gripper further comprising a pair of parallel engagement elements configured to secure said sample cartridge side edge portions.

18. The system of claim 17, wherein at least one of said engagement elements is angled.

19. The system of claim 17, wherein at least one of said engagement elements is resilient.

20. The system of claim 10, further comprising a magnetic catch operatively associating said input element and said cartridge gripper and configured to impart at least a partial pulling force to said actuator assembly to aid in resetting said actuator and magazine to a home position; and/or
a gripper support connected to said actuator assembly and configured to reduce deflection of said gripper upon contacting said actuator assembly input element.

21. A method useful for sequentially loading a plurality of sample cartridges on an automated microscope, each of said sample cartridges comprising at least one chamber, each of said at least one chambers containing a biological sample; said method comprising the steps of:
(a) providing an automated microscope comprising (i) an XYZ drive; (ii) a cartridge gripper connected to said XYZ drive and configured to secure a sample cartridge; and (iii) an imaging system operatively associated with said cartridge gripper and configured to image said sample;
(b) providing (i) a cartridge magazine containing a plurality of said cartridges and (ii) a cartridge magazine actuator assembly operatively associated with said cartridge magazine and said cartridge gripper; said cartridge magazine actuator assembly comprising an input element, a output element, and a transfer assembly interconnecting said input element and said output element, said transfer assembly configured to linearly advance said output element upon linear depression of said input element, said transfer assembly further comprising a scissor assembly comprising said input element and said output element on opposite ends thereof;

(c) advancing said cartridge gripper into said input element so that force therefrom is transferred from said input element through said transfer assembly to said output element such that when said input element moves in a first direction, said scissor assembly moves said output element in a second direction opposite the first direction to thereby move said output element in the second direction, and said output element contacts a cartridge in the cartridge magazine and the cartridge is ejected from said magazine into said gripper; and (d) imaging a sample in at least one chamber of said cartridge with said imaging system; and (e) optionally repeating said imaging step for at least one additional chamber in said cartridge.

22. The method of claim 21, further comprising the steps of:

(f) retracting said cartridge gripper against a kicker element so that said cartridge is ejected therefrom.

23. The method of claim 22, further comprising the step of:

(g) sequentially repeating steps (c) through (f) for a plurality of cartridges in said magazine.

24. The method of claim 21, said transfer assembly configured to linearly advance said output element at least twice the distance of corresponding linear depression of said input element.

25. A cartridge magazine actuator assembly, comprising:
a frame having a cartridge engagement portion;
an input element,
an output element configured to operatively engage a cartridge stripper in said cartridge magazine, and
a transfer assembly connected to said frame and interconnecting said input element and said output element,
wherein said transfer assembly further comprises a scissor assembly comprising said input element and said output element on opposite ends thereof, such that when said input element moves in a first direction, said scissor assembly moves said output element in a second direction opposite the first direction to thereby move said output element in the second direction and said output element contacts a cartridge in a cartridge magazine and moves the cartridge out of the cartridge magazine.

26. The actuator assembly of claim 25, said actuator assembly further comprising a tensioning element operatively associated with said transfer assembly and configured to aid in returning said transfer assembly to a home position.

27. The assembly of claim 25, said transfer assembly configured to linearly advance said output element at least twice the distance of corresponding linear depression of said input element.

* * * * *